(12) United States Patent
Davis et al.

(10) Patent No.: US 12,358,800 B2
(45) Date of Patent: Jul. 15, 2025

(54) GERMANOSILICATE CIT-14/IST AND ITS PREPARATION FROM GERMANOSILICATE CIT-13/OH

(71) Applicants: CALIFORNIA INSTITUTE OF TECHNOLOGY, Pasadena, CA (US); CHEVRON USA INC., San Ramon, CA (US)

(72) Inventors: Mark E. Davis, Pasadena, CA (US); Jong Hun Kang, Seoul (KR); Dan Xie, El Cerrito, CA (US)

(73) Assignees: California Institute of Technology, Pasadena, CA (US); Chevron U.S.A., Inc., San Ramon, CA (US)

( * ) Notice: Subject to any disclaimer, the term of this patent is extended or adjusted under 35 U.S.C. 154(b) by 530 days.

(21) Appl. No.: 17/783,759

(22) PCT Filed: Dec. 11, 2020

(86) PCT No.: PCT/US2020/064421
§ 371 (c)(1),
(2) Date: Jun. 9, 2022

(87) PCT Pub. No.: WO2021/119380
PCT Pub. Date: Jun. 17, 2021

(65) Prior Publication Data
US 2023/0032494 A1    Feb. 2, 2023

Related U.S. Application Data

(60) Provisional application No. 62/947,434, filed on Dec. 12, 2019.

(51) Int. Cl.
| | | |
|---|---|---|
| *C01B 37/00* | (2006.01) | |
| *B01J 20/10* | (2006.01) | |
(Continued)

(52) U.S. Cl.
CPC ........... *C01B 37/005* (2013.01); *B01J 20/10* (2013.01); *B01J 20/2808* (2013.01);
(Continued)

(58) Field of Classification Search
CPC ............. C01P 2004/03; C01P 2002/89; C01P 2006/16; C01B 37/005
See application file for complete search history.

(56) References Cited

U.S. PATENT DOCUMENTS

| 4,544,538 A | 10/1985 | Zones |
|---|---|---|
| 6,508,860 B1 | 1/2003 | Kulkarni et al. |
(Continued)

FOREIGN PATENT DOCUMENTS

| CN | 106185976 A | 12/2016 |
|---|---|---|
| CN | 107873015 A | 4/2018 |
(Continued)

OTHER PUBLICATIONS

Kang et al, "Synthesis and Characterization of CIT-13, a Germanosilicate Molecular Sieve with Extra-Large Pore Openings", Chem. Mater. 2016, 28, 6250-6259 (Year: 2016).
(Continued)

*Primary Examiner* — Anthony J Zimmer
*Assistant Examiner* — Annette Phan
(74) *Attorney, Agent, or Firm* — BakerHostetler

(57) ABSTRACT

The present disclosure is directed to large-pore germanosilicate compositions designated CIT-13/OH and CIT-14/IST, the two large-pore germanosilicate each having a three-dimensional framework with 10- and 14-membered ring channels and 8- and 12-membered ring channels, respectively. The disclosure also sets forth methods for converting the former to the latter under conditions consistent with an inverse sigma transformation. Uses of the large-pore germanosilicate compositions are also disclosed.

17 Claims, 26 Drawing Sheets

14/10MR

Removal of Ge-4-ring

Inverse Sigma Transformation

12/8MR

(51) Int. Cl.
  *B01J 20/28*   (2006.01)
  *B01J 20/30*   (2006.01)
  *B01J 29/03*   (2006.01)
  *B01J 35/64*   (2024.01)
  *B01J 37/00*   (2006.01)
  *B01J 37/04*   (2006.01)
  *B01J 37/06*   (2006.01)

(52) U.S. Cl.
  CPC ....... *B01J 20/3057* (2013.01); *B01J 20/3071* (2013.01); *B01J 20/3085* (2013.01); *B01J 29/0308* (2013.01); *B01J 35/643* (2024.01); *B01J 37/0018* (2013.01); *B01J 37/04* (2013.01); *B01J 37/06* (2013.01); *C01P 2002/72* (2013.01); *C01P 2002/76* (2013.01); *C01P 2002/77* (2013.01); *C01P 2002/89* (2013.01); *C01P 2004/03* (2013.01); *C01P 2006/16* (2013.01)

(56) References Cited

U.S. PATENT DOCUMENTS

| | | | |
|---|---|---|---|
| 6,827,843 B2 | 12/2004 | Elomari | |
| 6,841,063 B2 | 1/2005 | Elomari | |
| 7,083,714 B2 | 8/2006 | Elomari | |
| 8,105,481 B2 | 1/2012 | Driver et al. | |
| 9,278,344 B2 | 3/2016 | Jothimurugesan et al. | |
| 9,821,297 B2 | 11/2017 | Boal et al. | |
| 10,293,330 B2 | 5/2019 | Schmidt et al. | |
| 10,828,625 B2 | 11/2020 | Schmidt et al. | |
| 2014/0339134 A1 | 11/2014 | Minoux et al. | |
| 2016/0346771 A1 | 12/2016 | Schmidt et al. | |
| 2017/0252729 A1* | 9/2017 | Schmidt | B01J 37/10 |
| 2018/0134571 A1 | 5/2018 | Zones | |
| 2021/0154648 A1 | 5/2021 | Schmidt et al. | |

FOREIGN PATENT DOCUMENTS

| | | |
|---|---|---|
| CN | 108698839 A | 10/2018 |
| EP | 3303221 A1 | 4/2018 |
| JP | 2018-521933 A | 8/2018 |
| WO | 99/08961 A1 | 2/1999 |
| WO | 2016/196533 A1 | 12/2016 |
| WO | 2018/093469 A1 | 5/2018 |
| WO | 2019/231595 A1 | 12/2019 |

OTHER PUBLICATIONS

Shvets et al., "The Role of Crystallization Parameters for the Synthesis of Germanosilicate with UTL Topology", Chemistry a European Journal, Sep. 2008, 14, 10134-10140.

Kang et al., "Fluoride-free Synthesis of Germanosilicate CIT-13 and Its Inverse Sigma Transformation To Form CIT-14", Chem. Mater. 2020, vol. 32, pp. 2014-2024.

Kang, "Shape Selectivity of Small-pore Molecular Sieves for the Methanol-to-Olefins Reaction and Synthesis and Topotactic Transformation of Germanosilicate CIT-13", May 22, 2019, pp. 291.

Verheyen et al., "Design of zeolite by inverse sigma transformation", Nature Materials, vol. 11, Dec. 2012, pp. 1059-1064.

* cited by examiner

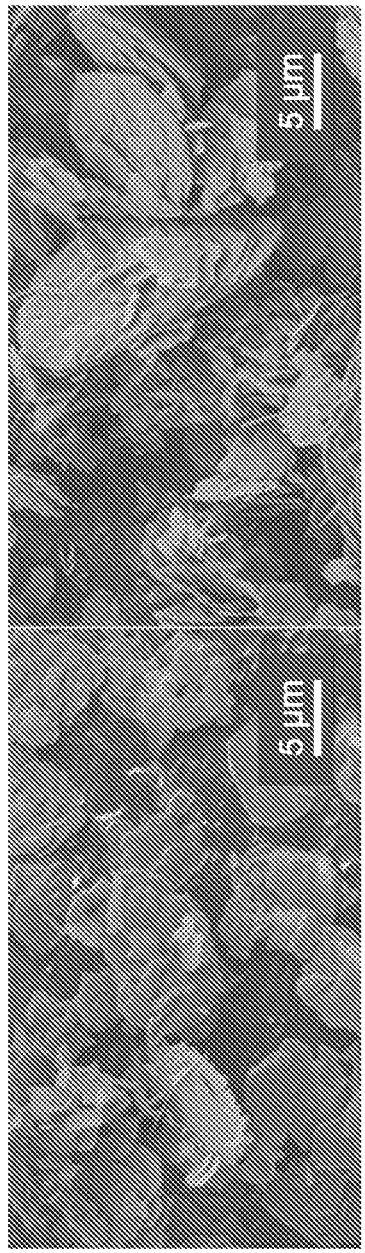

(*: spinning sidebands)

"Ortho-methylbenzyl"    "Meta-methylbenzyl"

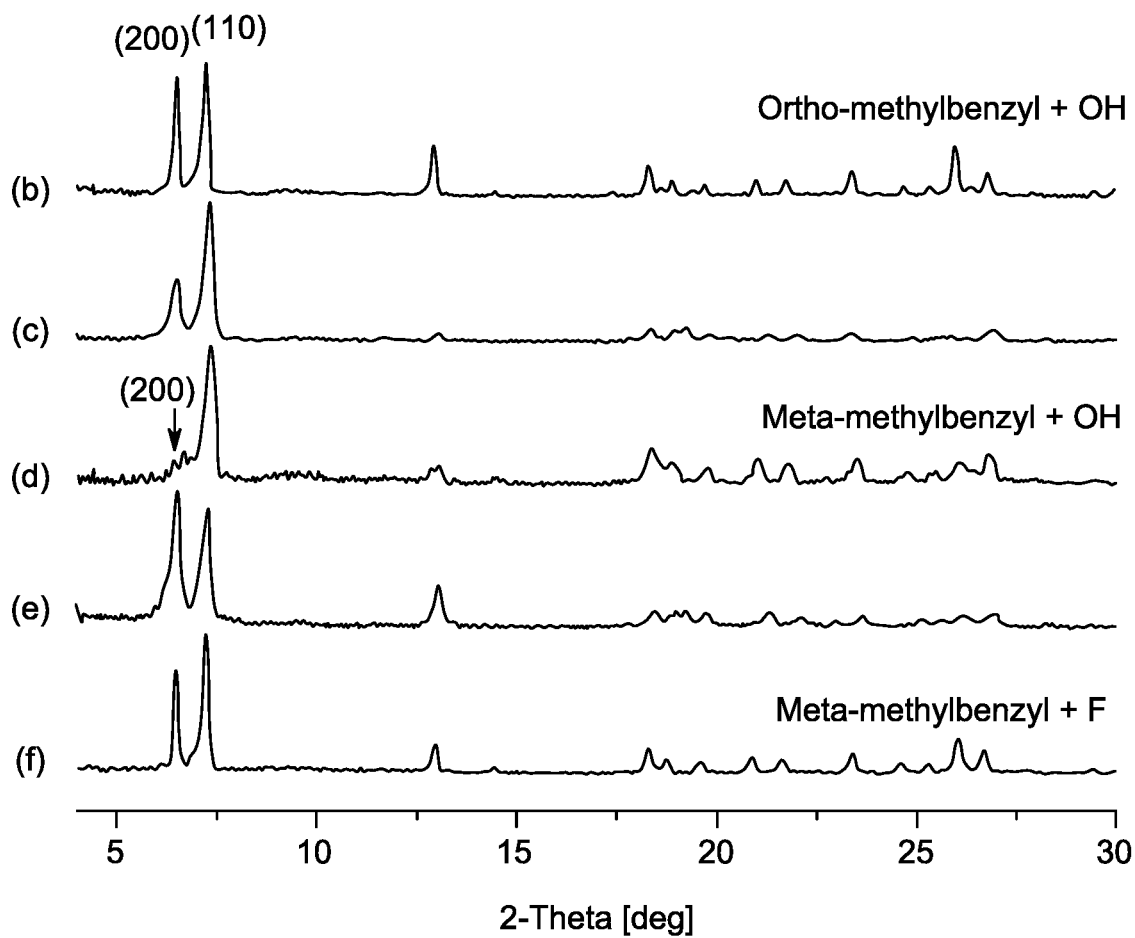
FIG. 8(B-F)

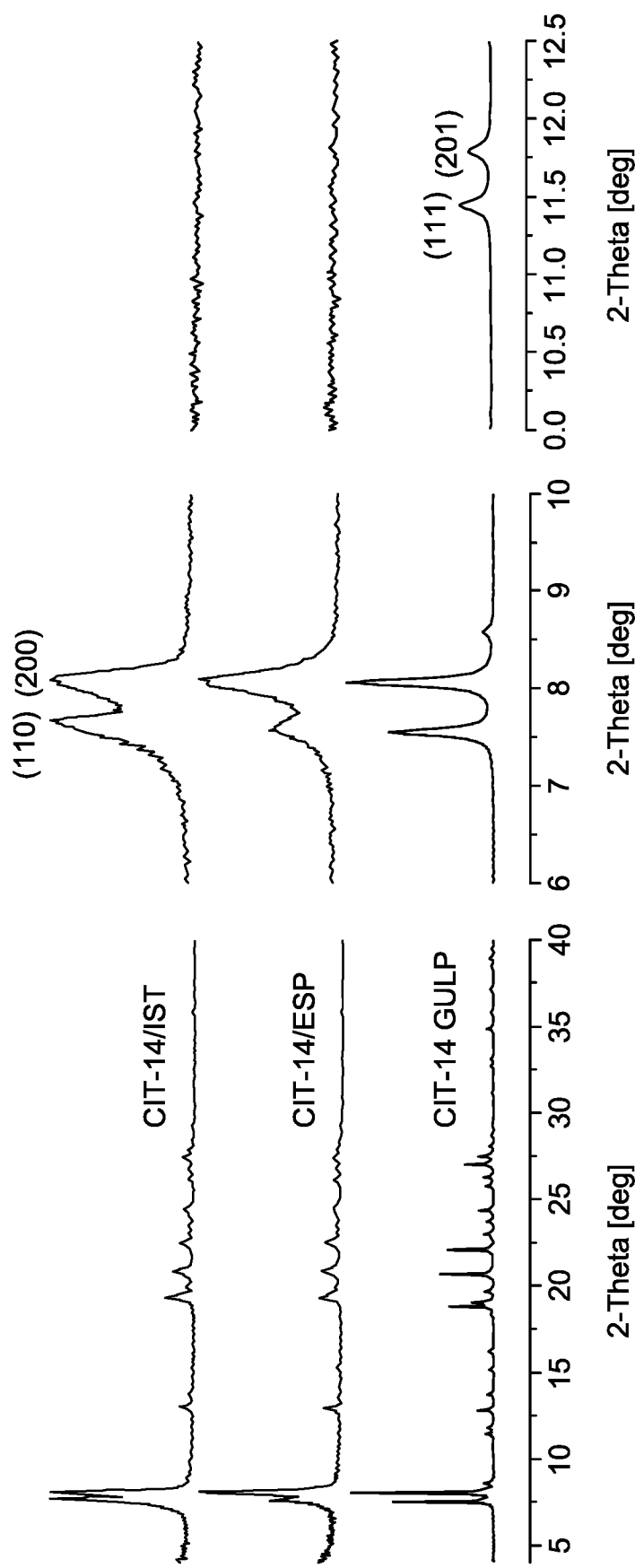

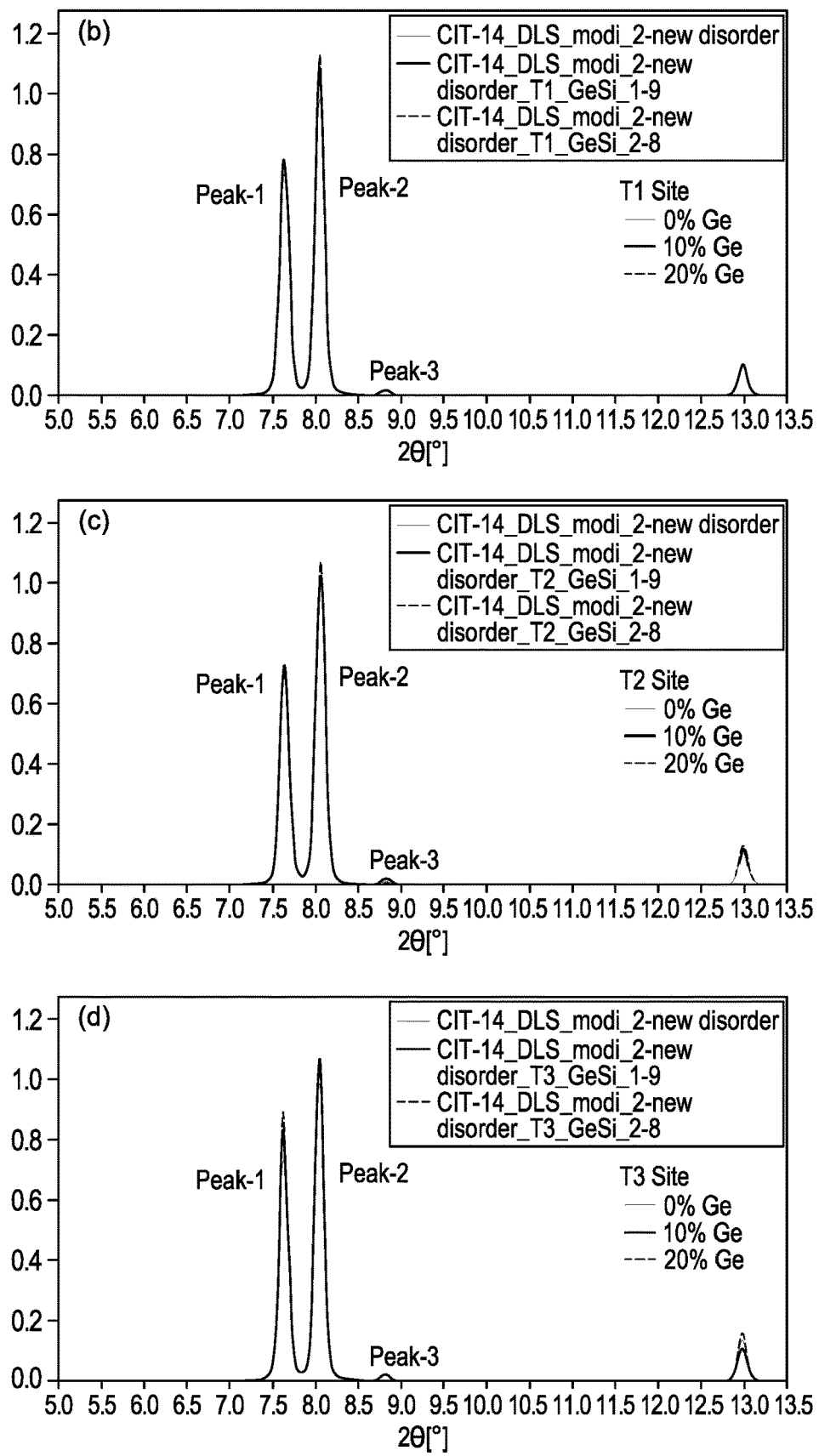
FIG. 16(B-D)

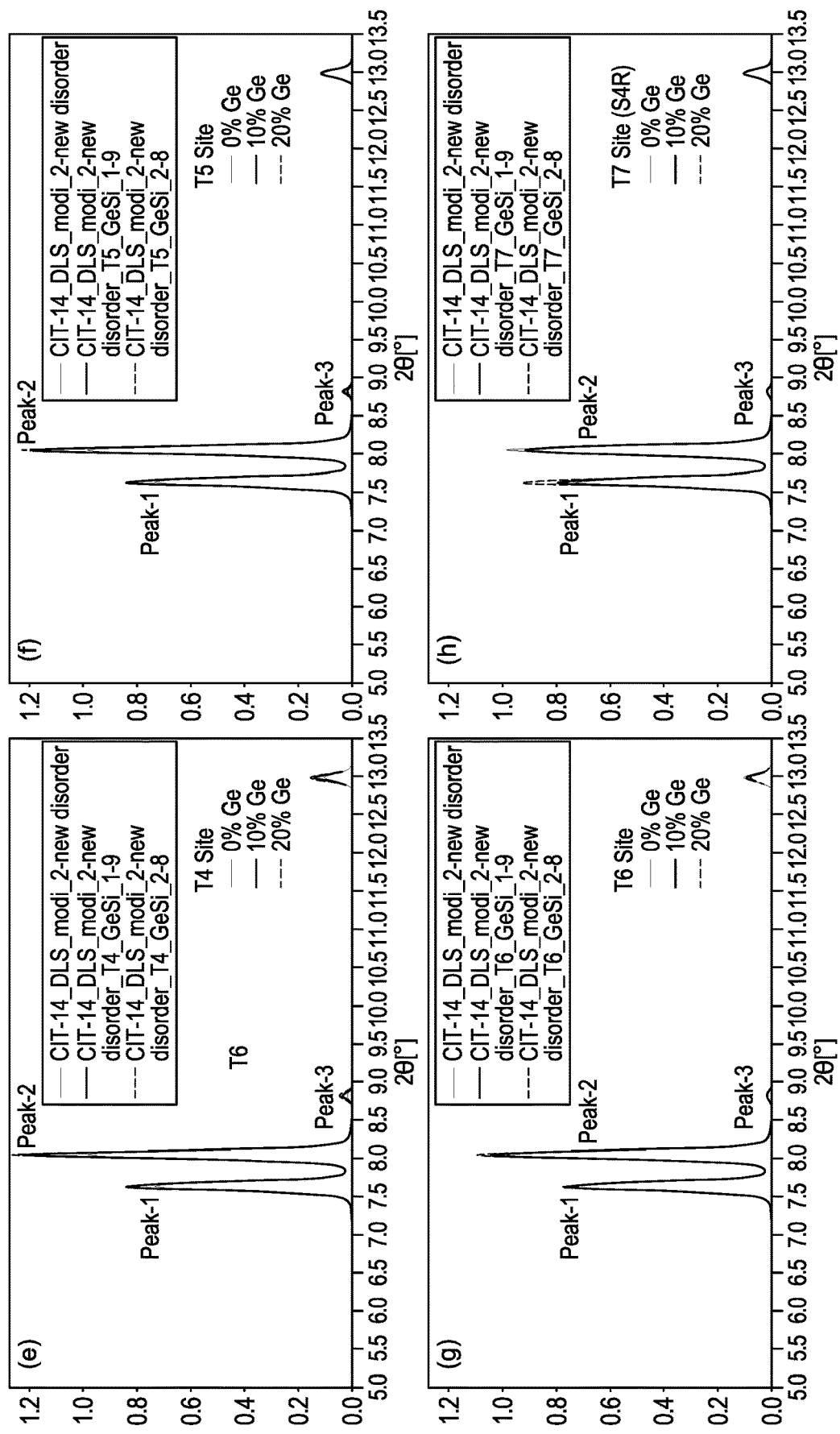
FIG. 16(E-H)

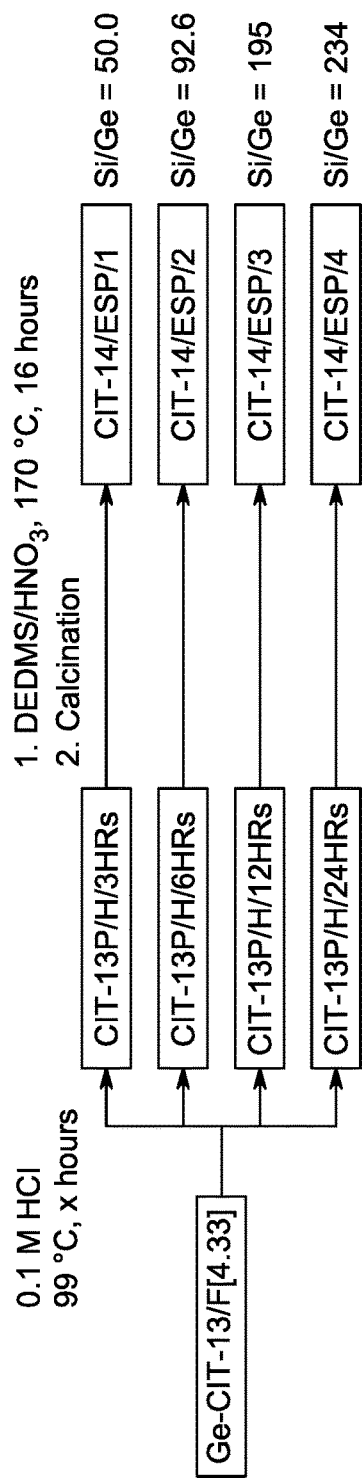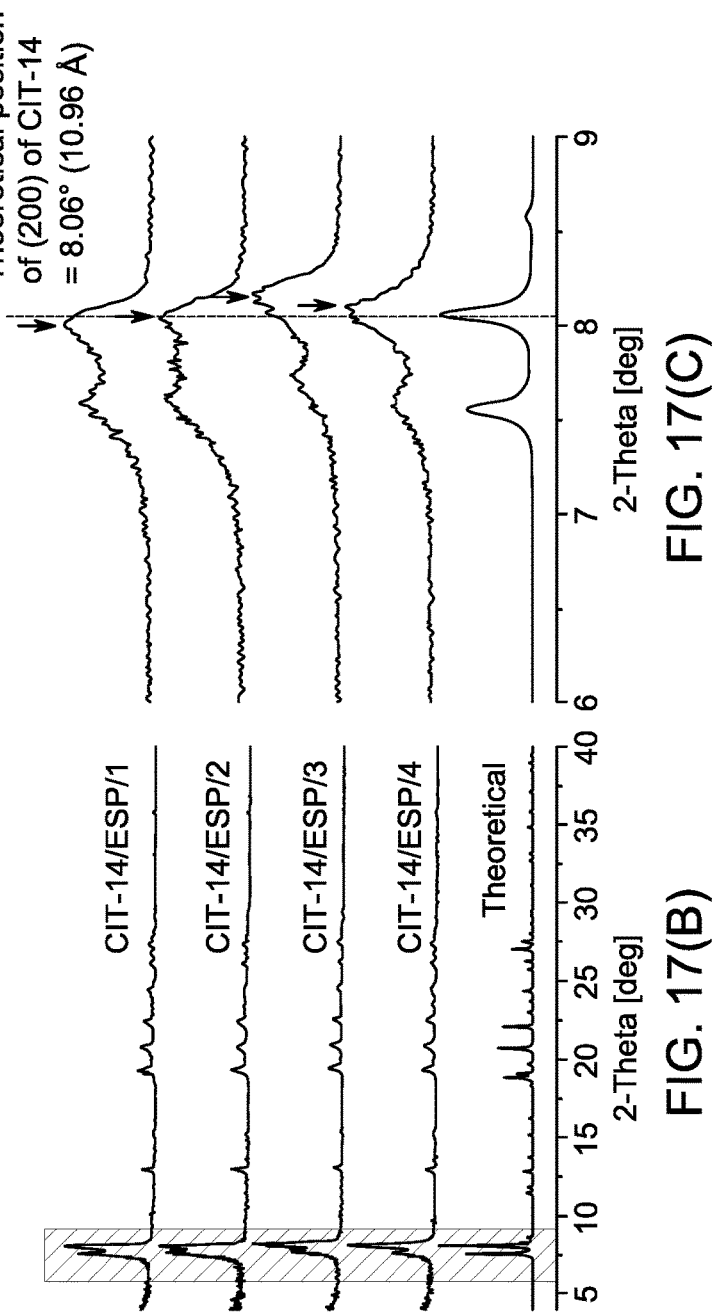
FIG. 17(A)
FIG. 17(B)
FIG. 17(C)

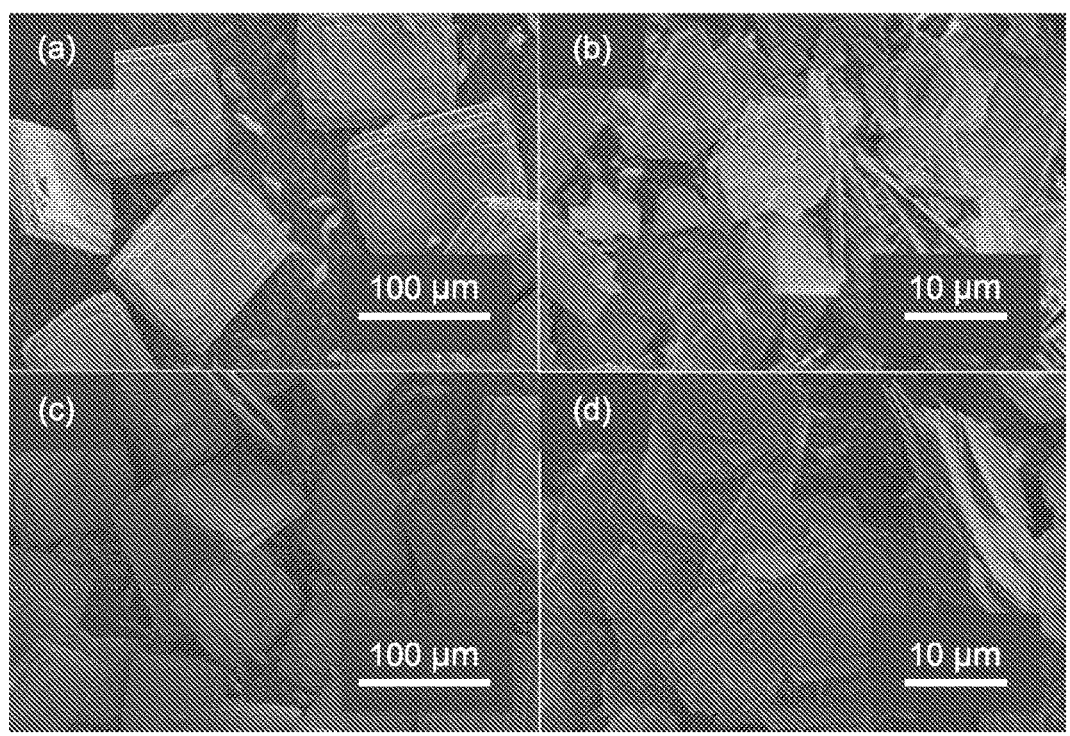
FIG. 18(A-D)
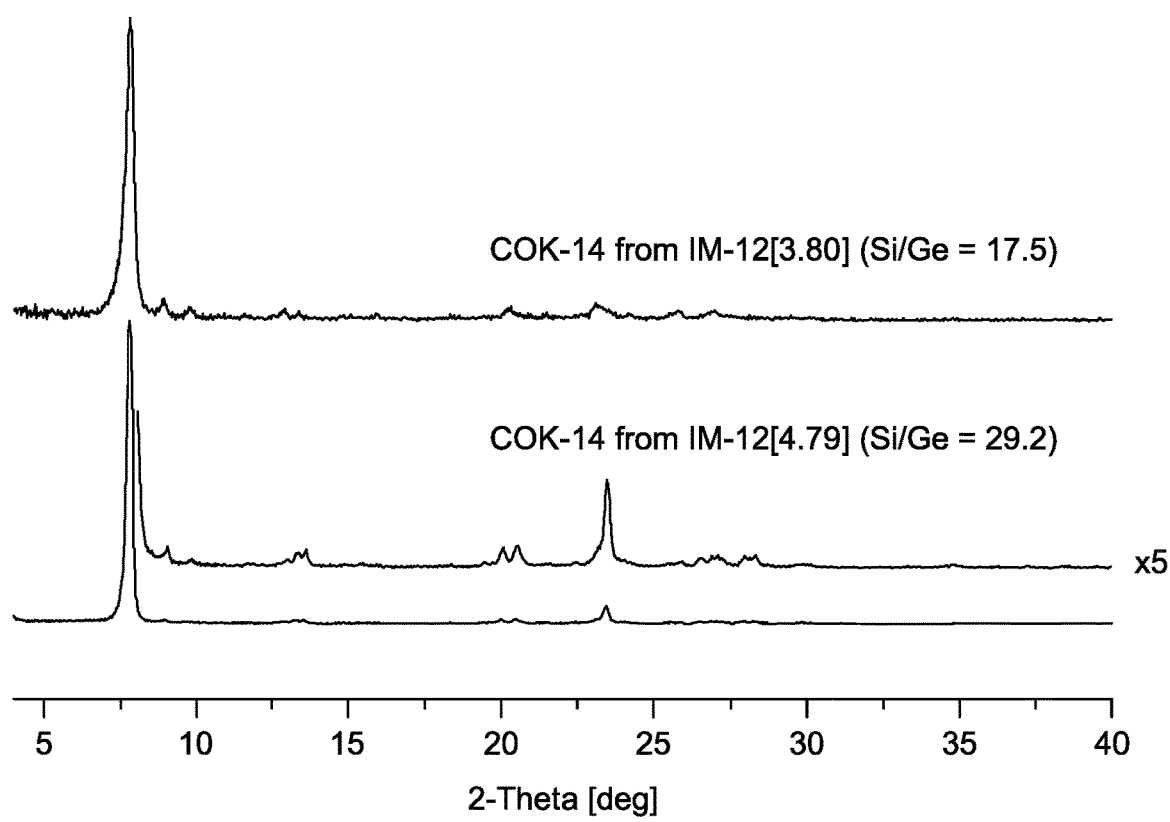
FIG. 19

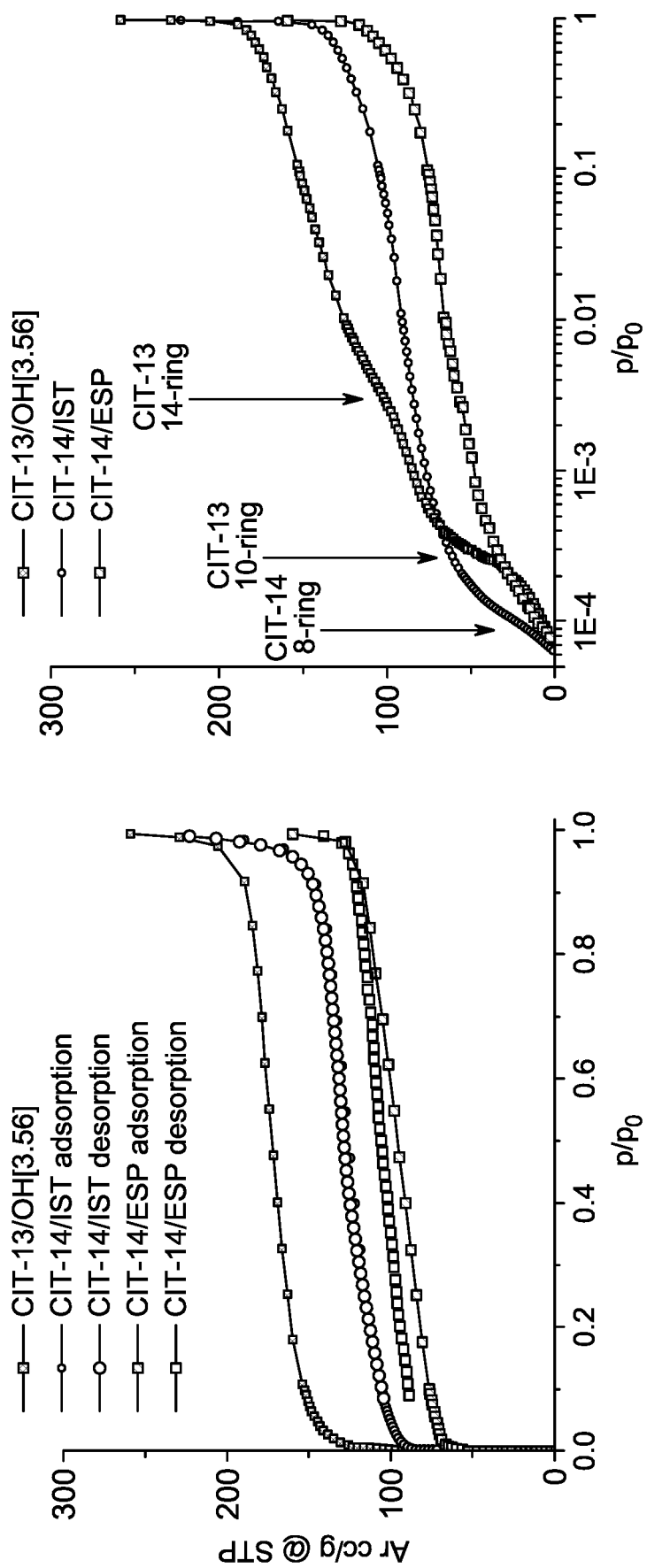

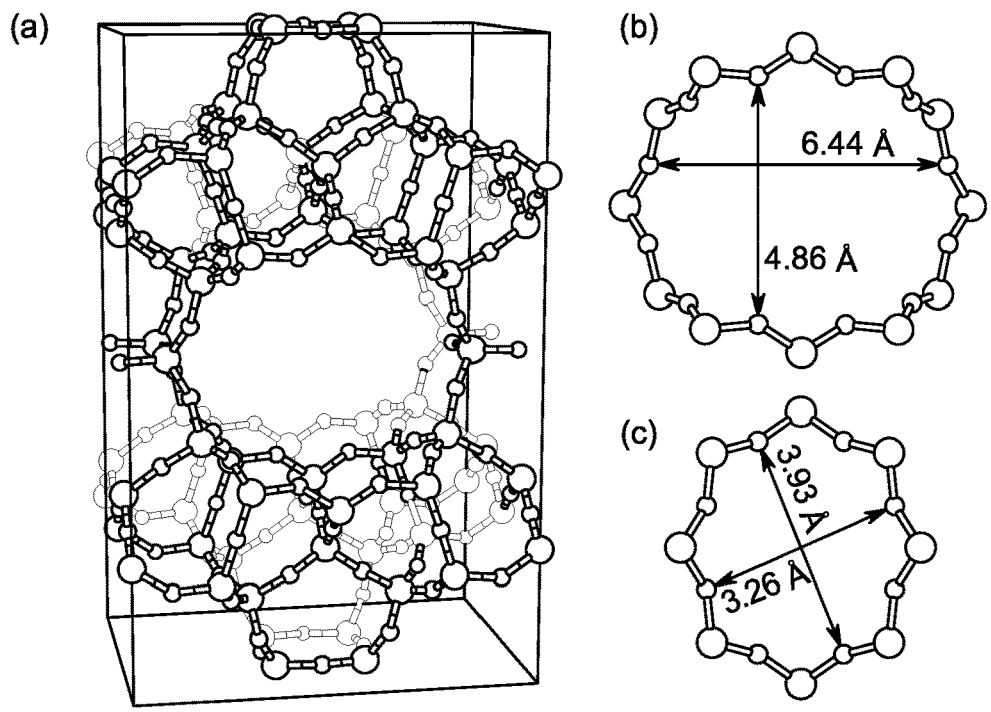
FIG. 22(A-C)
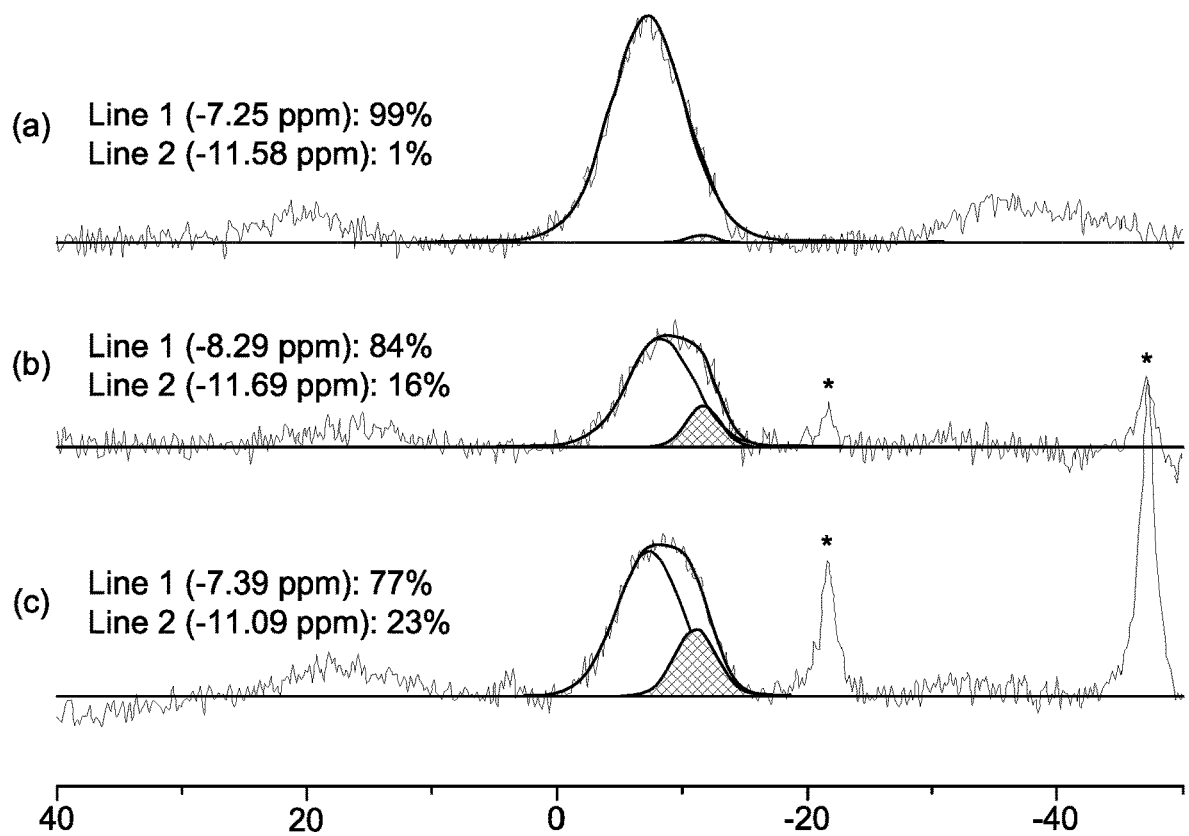
FIG. 23(A-C)

GERMANOSILICATE CIT-14/IST AND ITS PREPARATION FROM GERMANOSILICATE CIT-13/OH

CROSS REFERENCE TO RELATED APPLICATIONS

This application is the United States National Stage Application of International Patent Application No. PCT/US2020/064421, filed Dec. 11, 2020, which claims priority from U.S. Provisional Patent Application No. 62/947,434, filed: Dec. 12, 2019, the contents of which are incorporated by reference for all purposes.

GOVERNMENT RIGHTS

None

TECHNICAL FIELD

This disclosure is directed to germanosilicates designated CIT-13/OH and CIT-14 and the conversion of the former to the latter by an inverse sigma transformation.

BACKGROUND

Zeolites play an important role as heterogeneous catalysts and are used in a variety of industrial settings. Initially, these materials were largely developed to support the petroleum industry in the quest to create more selective, robust catalysts for making gasoline and other fuels. Currently, these solids have emerged as specialty materials, with properties that are based upon structure and chemical composition able to handle specific large-scale applications. While there is a considerable effort that must go into bringing a new material from the discovery phase into a commercially viable catalyst, there remains room for the discovery of new structures with the hope that one might emerge as superior to the existing materials.

One goal toward finding new materials has been the hope that increasingly large pores that retain some catalytic properties in their interior surfaces can be capable of handling larger feed molecules in the oil upgrade arena.

Hence, interest remains in the discovery of new crystalline phases for use in these applications. The present work is aimed at addressing the deficiencies in the art in this area.

Synthetic molecular sieves are typically prepared using hydrothermal synthesis that involves the use of inorganic (Na+, K+, etc.) and organic structure-directing agents (OSDAs), mineralizing agents (OH− or F−), heteroatoms (in addition to Si element such as Al, B, Ge, Ti, Sn, etc.), etc. The synthesis of a crystalline molecular sieve is complex. While progress is being made on designing certain portions of the recipes and assembly processes, the approach makes it difficult to predict outcomes.

The topotactic transformation of existing zeolites has played a role as a way to prepare new zeolitic frameworks that have never been synthesized by the conventional hydrothermal methods. An archetypal example is the assembly-disassembly-organization-reassembly (ADOR) strategy for germanosilicate transformation that makes use of the property of germanium sites that preferably occupy small composite building units (CBUs) such as double-4-rings (d4r's These transformations are schematically illustrated in FIGS. 1(A) and 1(B), respectively.

CIT-13 (*CTH: an asterisk (*) denotes the presence of crystallographic disorder in the structure), an extra-large pore framework possessing 14MR and 10MR channels, was discovered during the course of investigating the abilities of imidazolium-derived compounds having benzyl pendant groups to function as OSDAs. Isostructural germanosilicates, NUD-2 and SAZ-1, crystallized from imidazolium-based OSDAs and fluoride-based gels, have also been reported. CIT-13 is composed of Si-rich cfi-layers bridged by two-dimensional arrays of Ge-rich d4r units. The structure of cfi-layers provides two crystallographically equivalent positions for the d4r units. This equivalency is manifested by the positional disorder in d4r units in the CIT-13 framework and the *CTH-to-CFI transformation (FIG. 1(C)). Most importantly, the structure of CIT-13 resembles that of IM-12 that has shown a rich chemistry of germanosilicate transformations.

The present inventors previously reported the similarity between *CTH and UTL, and disclosed two novel frameworks, CIT-14 and CIT-15, having 2D 12/8MR and 1D 10MR channel system, respectively, prepared based on the ADOR transformation. However, ADOR products of sufficient quality for Rietveld refinement from powder X-ray diffraction (PXRD) have not been prepared. This is likely due to the potential presence of Si—O—Si connectivity within the interlayer region that can result in incomplete delamination. Liu et al. reported that weak base solutions, such as ammonium hydroxide, can dissociate interlayer Si—O—Si bonds that impede the complete delamination of the cfi-type layers of CIT-13, and the structure ECNU-21 (isostructural to CIT-15) was obtained. We also found that weak base solutions can delaminate cfi-type layers from germanosilicate Ge-CIT-5 that has double-zigzag chain (dzc) composite building units instead of d4r units. Very recently, the formation of ECNU-23 (isostructural to CIT-14) and its structural solution (based on the electron diffraction) were also reported from partial degermanation from d4r units of CIT-13. That synthesis resembled the inverse sigma transformation of IM-12. Nevertheless, the inverse sigma transformation of CIT-13 by leaching pure Ge-4-ring using strong acid has never been reported due to the inherent germanium arrangement within its d4r units.

SUMMARY

This disclosure is directed to new germanosilicates derived from the recently reported crystalline microporous germanosilicates with CIT-13 topology prepared by a fluoride-free hydroxide route, as described in U.S. Pat. No. 10,828,625. This reference is incorporated by reference herein in its entirety for all purposes, including the characterization and methods of making and using materials of the CIT-13 topology. These CIT-13 germanosilicates were prepared hydrothermally using benzyl-imidazolium organic structuring directing agents and were characterized as possessing a three-dimensional framework having pores defined by 10- and 14-membered rings (pore dimensions of 6.2×4.5 Å and 9.1×7.2 Å, respectively). These are the first known crystalline silicate with this architecture. These structures were characterized by their powder X-ray diffraction (PXRD) patterns, their unit cell parameters, SEM micrographs, $^{29}Si$ MAS NMR spectroscopy, and adsorption/desorption isotherms.

The present disclosure describes germanium-containing, extra-large pore molecular sieve CIT-13 synthesized without the use of fluoride. After removal of occluded organics, CIT-13 obtained from the fluoride-free preparation shows differences from CIT-13 samples prepared in the presence of fluoride. CIT-13 made using a fluoride-free method is able to undergo the inverse sigma transformation to yield mesopore-free CIT-14 and transforms into a CIT-5-type germanosilicate much faster than Ge-CIT-13 of similar Si/Ge ratios from a fluoride-containing synthesis. A Rietveld-refined structure solution for CIT-14 confirms that it possesses 12- and 8-membered ring channels but provides slightly different unit call parameters for this material than previously reported. Results from $^{19}$F magic-angle spinning (MAS) and $^{1}$H-$^{29}$Si cross-polarized (CP) MAS nuclear magnetic resonance (NMR) spectroscopy reveal that CIT-13 crystallized without fluoride has germanium siting that is different from CIT-13 synthesized in the presence of fluoride.

The present disclosure is further directed to methods of manipulating the structures of these CIT-13 germanosilicates, that have been prepared by a fluoride-free hydroxide route. Having a Si/Ge ratio in a range of from 3.8 to 10, by subjecting them to heat and steam under reaction conditions suitable for effecting inverse sigma transformations. This mechanism for this material is previously unknown. The present disclosure is also directed to the germanosilicate CIT-14 products derived from such manipulations. Previously, the germanosilicate CIT-14 was accessible by the ADOR transformation (Assembly-Disassembly-Organization-Re-assembly) of the phyllosilicate designated CIT-13P, as described in U.S. Pat. No. 10,293,330, the contents of which are incorporated by reference herein for all purposes or at least for the methods of preparing and characterization of CIT-14.

Certain embodiments of the present disclosure include those crystalline microporous germanosilicate compositions, designated CIT-14/IST, having 8- and 12-membered ring channels. The CIT-14/IST compositions are, in some embodiments, characterized by a powder X-ray diffraction (XRD) pattern having at least five, seven, or ten characteristic peaks at 7.59±0.5, 8.07±0.5, 12.88±0.5, 19.12±0.5, 19.32±0.5, 20.73±0.5, 22.33±0.5, 24.37±0.5, 27.19±0.5, and 27.69±0.5 degrees 2-θ. The disclosure further provides different uncertainties associated with peak, a full range of characteristic peaks, and a more complete disclosure of the relative intensities and selections of peaks that characterize these materials.

The CIT-14/IST compositions are, in some embodiments, characterized by their Si:Ge ratios as being in a range of from 12:1 to 20:1, or from 14:1 to 18:1, or sub-ranges within these ranges.

The CIT-14/IST compositions are, in some embodiments, characterized by claims 1 to 4, wherein the crystals are orthorhombic. In some embodiments, the CIT-14/IST crystals have a Cmmm space group, or a Cmcm space group, or an intracrystal mixture (disorder) of the two domains. In some embodiments, the crystalline microporous germanosilicate CIT-14/IST composition have unit cell parameters according to:

| Crystal system | Orthorhombic | |
| --- | --- | --- |
| a (Å) | 21.9 ± 0.2 | 21.9007(7) |
| b (Å) | 13.7 ± 0.2 | 13.7360(4) |
| c (Å) | 10.1 ± 0.2 | 10.1138(2) |
| α = β = γ | 90°. | |

In some embodiments, the 8-membered ring channels have pore dimensions of the CIT-14/IST compositions of about 3.3 Å×3.9 Å and the 12-membered ring channels have pore dimensions of about 4.9 Å×6.4 Å. Physical distortions (e.g., compression) or the ratio of Si:Ge may alter these values.

In some embodiments, the crystalline microporous germanosilicate CIT-14/IST compositions are derived from or are derivable from an inverse sigma transformation of a crystalline microporous germanosilicate designated CIT-13/OH. In some embodiments, the crystalline microporous germanosilicate CIT-14/IST composition are derived from or are derivable from a crystalline microporous germanosilicate designated CIT-13/OH by subjecting the CIT-13/OH germanosilicate to concentrated aqueous mineral or other strong aqueous acid conditions at elevated temperatures for times sufficient to degermanate the CIT-13/OH germanosilicate to form a "-CIT-14" composition, isolating and calcining this as-formed "-CIT-14" germanosilicate to form the crystalline microporous germanosilicate CIT-14/IST composition. Exemplary conditions for effecting these transformations are set forth elsewhere in this disclosure.

The specific form, characteristics, and conditions of making the crystalline microporous CIT-13/OH germanosilicate are more explicitly set forth in this disclosure, but these compositions need be made in the absence of fluoride ion and within certain Si:Ge ratios. The syntheses of these CIT-13/OH germanosilicate are conveniently made using specific substituted benzyl-imidazolium organic structure-directing agent (OSDA) cation set forth herein. In some preferred embodiments, the precursor CIT-13/OH germanosilicates are fluoride-free and have d4r units having an average of at least, preferably more than 4 Ge atoms, allowing for the presence of Ge-4-rings in the d4r unit.

In other embodiments, the crystalline microporous germanosilicate CIT-14/IST compositions contain micropores containing at least one alkali metal salt, alkaline earth metal cation salt, transition metal, transition metal oxide, transition metal salt, or combination thereof.

In other embodiments, the crystalline microporous germanosilicate CIT-14/IST, either in their acid or metal-containing forms are used as catalysts or adsorbents in a range of processes set forth elsewhere herein.

This disclosure also embraces other embodiments directed to the preparation of the crystalline microporous germanosilicate CIT-14/IST, including those methods comprising contacting a crystalline microporous CIT-13/OH germanosilicate with a concentrated strong aqueous mineral acid at an elevated temperature for a time sufficient to convert the crystalline microporous germanosilicate CIT-13/OH germanosilicate to an as-made "-CIT-14" composition. This disclosure also embraces the pre-calcined, as-made "-CIT-14" composition.

This disclosure also embraces those embodiments of the CIT-13/OH germanosilicate, prepared by the hydroxide route as described specifically herein. This disclosure also embraces those embodiments of the CIT-13/OH germanosilicate that are characterized as having d4r units that contain an average of at least, preferably more than 4 Ge atoms per d4r, allowing for the presence of Ge-4-rings in the d4r unit. This disclosure also embraces those embodiments of the CIT-13/OH germanosilicate that exhibit the reactivity features not previously observed before that are the consequence of the new and unique physical features set forth herein.

BRIEF DESCRIPTION OF THE DRAWINGS

The present application is further understood when read in conjunction with the appended drawings. For the purpose of illustrating the subject matter, there are shown in the drawings exemplary embodiments of the subject matter, however, the presently disclosed subject matter is not limited to the specific methods, devices, and systems disclosed. In addition, the drawings are not necessarily drawn to scale. In the drawings:

FIGS. 1(A-C) provide schematic descriptions of known germanosilicate transformations.

FIGS. 4(A-B) shows SEM images of CIT-14/IST samples derived from (a) CIT-13/OH[3.71] (FIG. 4(A)); and CIT-13/OH[3.56] (FIG. 4(B)).

FIGS. 5(A-C) shows SEM images of CIT-13/OH samples: CIT-13/OH[3.71] (FIG. 5(A)); CIT-13/OH[3.56] (FIG. 5(B)), and CIT-13/OH[4.33] (FIG. 5(C)).

FIGS. 8(A-G) shows characterizations of CIT-13. FIGS. 8(B-E): PXRD patterns of selected examples of CIT-13/OH samples: (b) as-made and FIG. 8(C): calcined CIT-13/OH[3.88], FIG. 8(D): as-made and FIG. 8(E): calcined CIT-13/OH[4.33]. FIG. 8(F): PXRD profile of the reference CIT-13/F having Si/Ge~5.

FIG. 9(A): the reference CIT-13/F, FIG. 9(B): batch #A, FIG. 9(C): batch #5, FIG. 9(D): batch #7, FIG. 9(E): batch #8, FIG. 9(F): batch #12, FIG. 9(G): batch #13, FIG. 9(H): batch #15, FIG. 9(I): batch #16, FIG. 9(J): batch #17, and FIG. 9(K): batch #18.

FIG. 17(A) shows the design of experiment and PXRD patterns of the resulting CIT-14/ESP samples within the range of 4-40° (FIG. 17(B)) and 6-9° (FIG. 17(C)).

FIGS. 18(A-D) shows SEM images of IM-12 [3.80] (FIG. 18(A)), IM-12 [4.79] (FIG. 18(B)), COK-14 from IM-12 [3.80] (FIG. 18(C)), and COK-14 from IM-12 [4.79] (FIG. 18(D)).

FIG. 19 shows PXRD profiles of COK-14 from IM-12 [3.80] and COK-14 from IM-12 [4.79].

FIGS. 20(A-B) shows Ar-adsorption and desorption isotherms of the parent CIT-13/OH, CIT-14/IST and CIT-14/ESP in: linear scale (FIG. 20(A)) and log-scale (FIG. 20(B)).

FIGS. 21(A-D) show the results of a structural analysis of CIT-14/IST.

FIG. 22(A) shows the idealized structure of CIT-14/IST. Silicon, germanium, and oxygen atoms are denoted blue, green, and red, respectively. FIGS. 22(B-C) show the pore dimensions of the 12-membered ring and the 8-membered ring of CIT-14/IST, respectively.

FIGS. 23(A-C) shows $^{19}$F 12 k MAS NMR spectra of: as-made CIT-13/F[4.33] (FIG. 23(A)), fluorinated CIT-13/OH[4.33] (FIG. 23(B)), and fluorinated CIT-13/OH[3.56] (FIG. 23(C)). (Asterisks (*) denote spinning sidebands of fluorinated silica (19F—Si) surfaces that were formed as a result of fluorination using ammonium fluoride.)

DETAILED DESCRIPTION OF ILLUSTRATIVE EMBODIMENTS

The present disclosure is directed to new compositions of matter, including those comprising crystalline microporous germanosilicates, and methods of making and using these compositions.

Figure 1A:
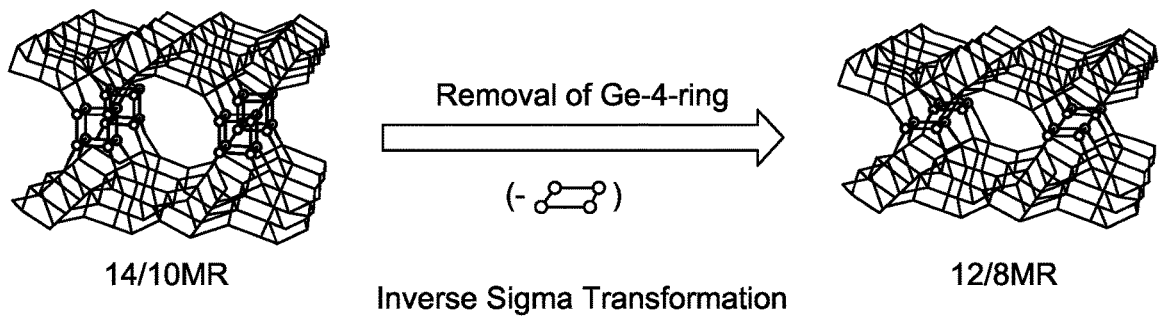
FIG. 1(A) inverse sigma transformation.
Figure 1B:
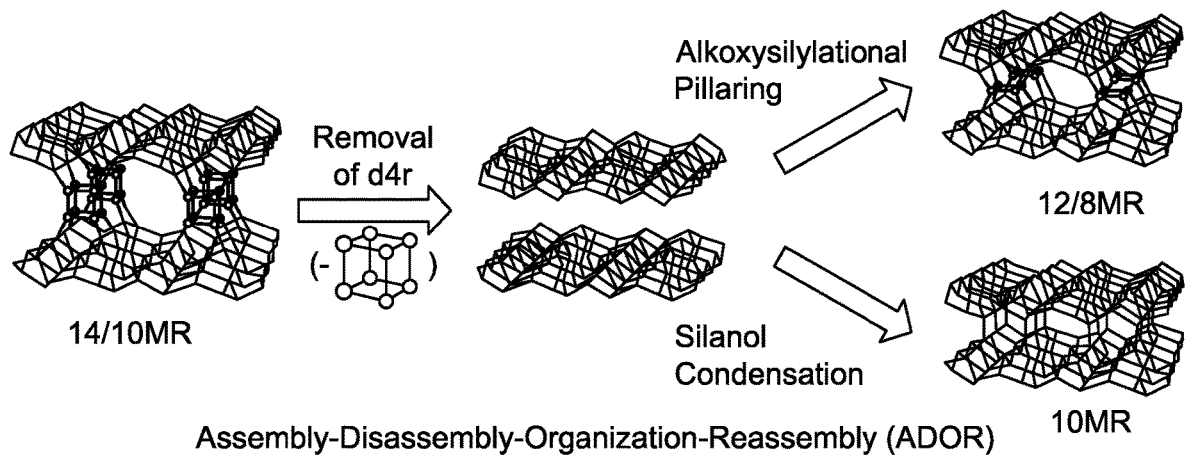
FIG. 1(B) ADOR transformation.
Figure 1C:
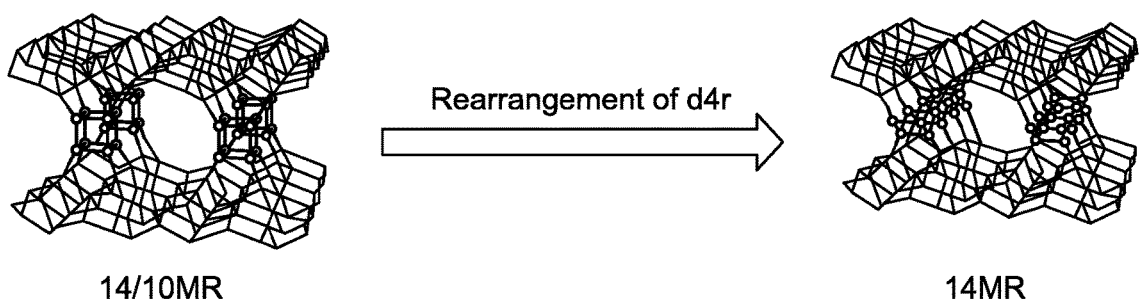
FIG. 1(C) diffusionless rearrangement of d4r arrays (*CTH-to-CFI transformation). *CTH-type framework is displayed as the model parent material
Figure 2:
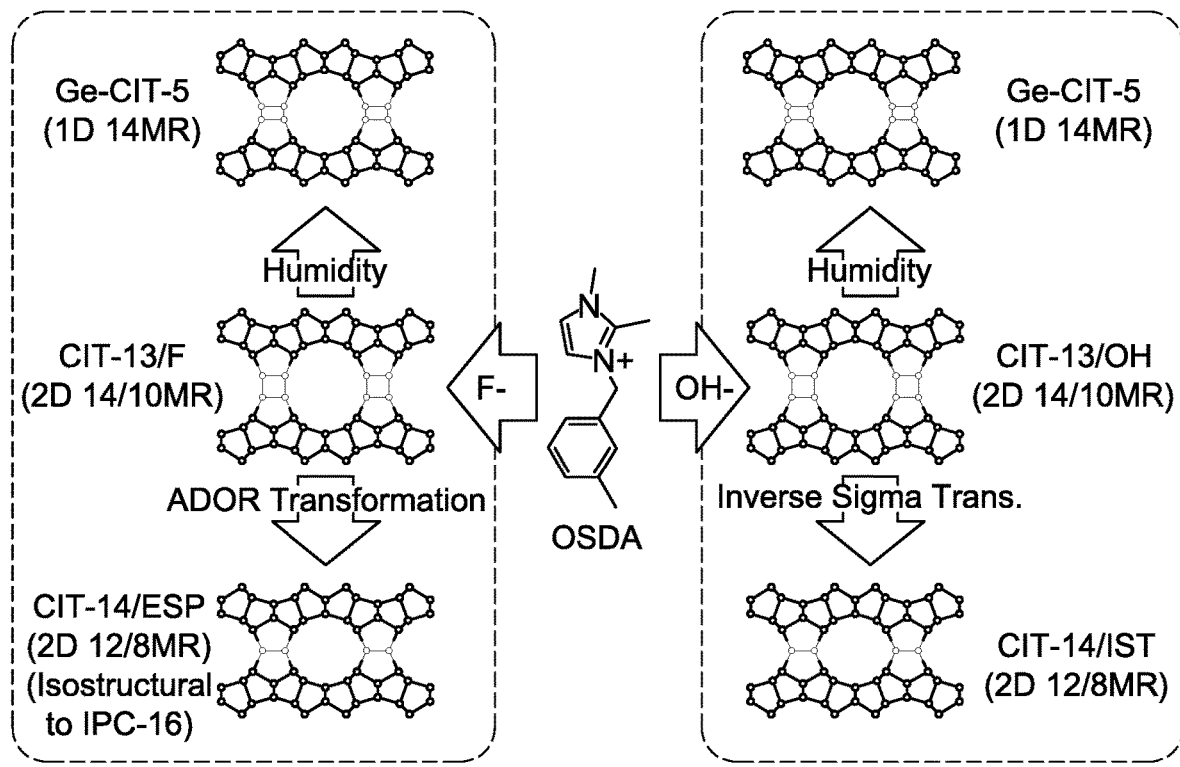
FIG. 2 shows a schematic representation of the studies performed and reported herein.

Herein is disclosed a new method of synthesizing *CTH-type germanosilicate molecular sieves that do not involve fluoride. Removal of fluoride from the synthesis narrows the compositional window previously reported for the CIT-13 crystallization to occur and slows down the crystallization time. However, CIT-13 prepared from hydroxide media (designated CIT-13/OH) shows interesting properties not achievable with CIT-13 samples synthesized in the presence of fluoride (designated CIT-13/F). After calcination, fluoride-free CIT-13/OH transforms into CFI-type germanosilicate (Ge-CIT-5) upon exposure to ambient humidity much faster than conventional CIT-13/F from fluoride-containing gels having similar Si/Ge ratios. Also, CIT-13/OH from the fluoride-free route is able to proceed through an inverse sigma transformation to another framework having 12MR and 8MR ring channels, CIT-14, by contact with strong acid. CIT-14 from the inverse sigma transformation (designated CIT-14/ist) did not show mesoporosity that exists in the isostructural analog obtained from an ADOR-type transformation. Given that these transformations are based on the presence and arrangement of germanium sites within the d4r units, it is concluded that the existence of fluoride anions in the synthesis mixture influences the elemental (Ge and Si) composition and/or arrangements within d4r units in CIT-13. Also, these results indirectly support the presence of Ge—O—Ge bonds and germanium 4-rings within the d4r units of CIT-13/OH synthesized from hydroxide-based gels, just as observed with IM-12. FIG. 2 summarizes studies reported in this disclosure.

The present disclosure may be understood more readily by reference to the following description taken in connection with the accompanying Figures and Examples, all of which form a part of this disclosure. It is to be understood that this disclosure is not limited to the specific products, methods, conditions, or parameters described or shown herein, and that the terminology used herein is for the purpose of describing particular embodiments by way of example only and is not intended to be limiting of any claimed disclosure. Similarly, unless specifically otherwise stated, any description as to a possible mechanism or mode of action or reason for improvement is meant to be illustrative only, and the disclosure herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using). Where methods of treatment are described, unless otherwise specifically excluded, additional embodiments provide that the product compositions are isolated and optionally post-treated in a manner consistent with molecular sieve or zeolite syntheses.

The present disclosure embraces compositions designated "CIT-13/OH," "-CIT-14," and "CIT-14/IST" as well as the methods of converting the former into the latter.

Crystalline Microporous Germanosilicate Compositions, Designated CIT-14/IST and "-CIT-14."

Certain embodiments include crystalline microporous germanosilicate compositions, designated CIT-4/IST, having 8- and 12-membered ring channels. These include those compositions derived from or derivable from CIT-13/OH through the use of concentrated strong acids.

In certain embodiments, the CIT-14/IST germanosilicate composition comprises a pure germanosilicate. In other independent embodiments, the CIT-14/IST germanosilicate composition comprises a framework including one or more oxides of aluminum, boron, gallium, hafnium, iron, tin, titanium, vanadium, zinc, or zirconium. These additional oxides may derive from the precursor CIT-13/OH used in the preparation of the CIT-14/IST germanosilicate compositions. Methods of incorporating these oxides in the precursor CIT-13/OH compositions are set forth elsewhere herein.

These crystalline microporous germanosilicate CIT-14/IST compositions may be characterized by their powder X-ray diffraction (XRD) pattern having at least five characteristic peaks at 7.59±0.5, 8.07±0.5, 12.88±0.5, 19.12±0.5, 19.32±0.5, 20.73±0.5, 22.33±0.5, 24.37±0.5, 27.19±0.5, and 27.69±0.5 degrees 2-θ. In certain independent embodiments, the powder X-ray diffraction (XRD) pattern exhibits at least five characteristic peaks at five, six, seven, eight, nine, or ten of these characteristic peaks set forth above. In certain independent embodiments, the uncertainties of the peak locations are independently (for each peak)±0.5 degrees 2-θ, ±0.4 degrees 2-θ, ±0.3 degrees 2-θ, ±0.2 degrees 2-θ, ±0.15 degrees 2-θ, or ±0.15 degrees 2-θ.

Figure 15D:
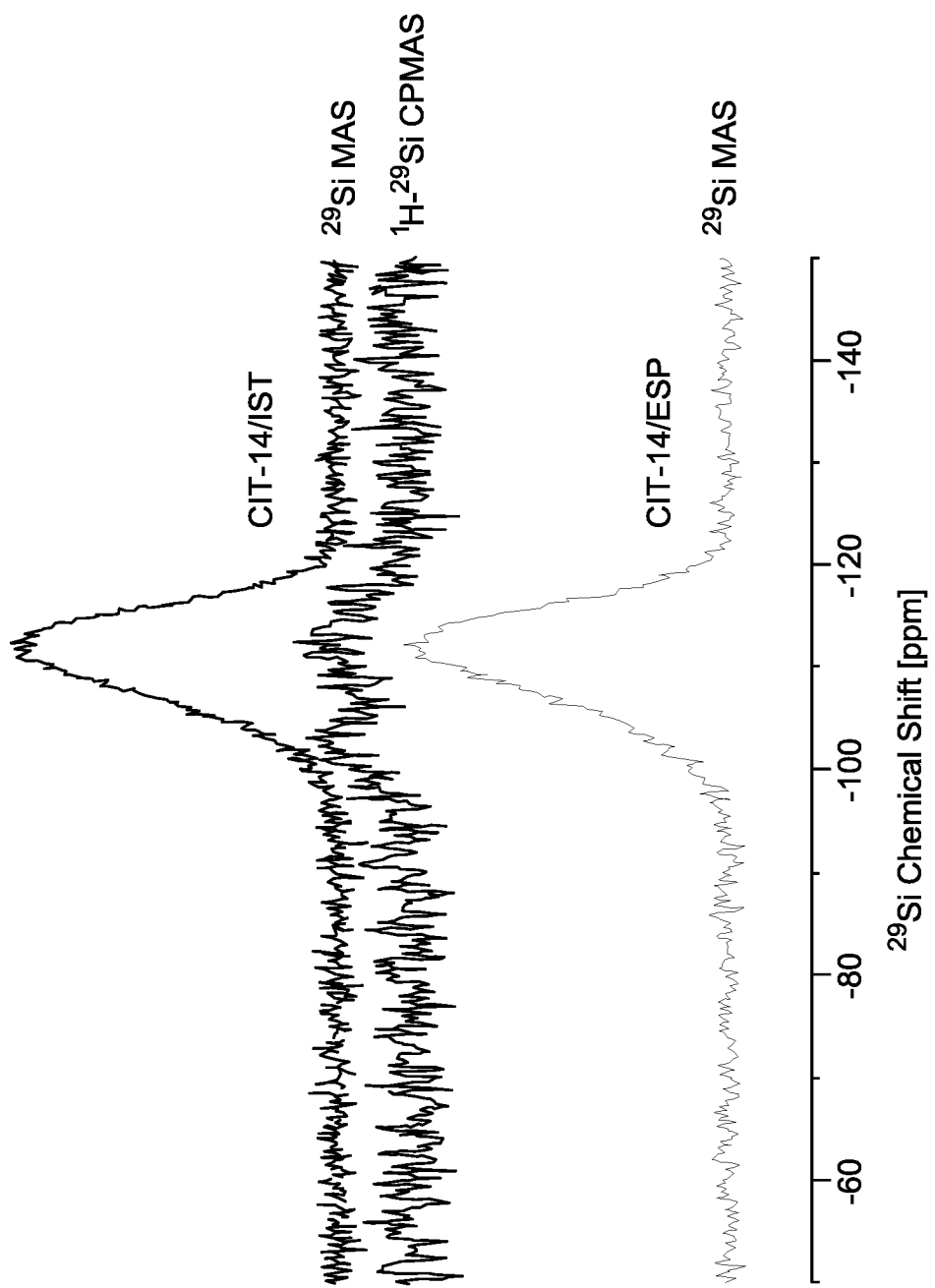
FIG. 15 shows PXRD profiles of CIT-14/IST from CIT-13/OH[3.56] (top), CIT-14/ESP from CIT-13/F[4.33] (middle), and a theoretical model of "disorder-free" CIT-14 optimized based on the GULP algorithm in the range of (a) 4-40°, (b) 6-10°, and (c) 10.0-12.5°. (d) $^{29}$Si NMR spectra of CIT-14/IST and CIT-14/ESP samples. ($^{29}$Si MAS spectrum of CIT-14/ESP was adapted from U.S. Patent Application Publ. No. 20170252729.)

Table 1 provides a listing of powder XRD data derived from a sample of the crystalline germanosilicate CIT-14/IST composition. These data are seen as representative of these materials. Various permutations of these data may be used to characterize these compositions, for example, by including multiple peaks selected by their relative intensities. Additionally, these crystalline microporous germanosilicate CIT-14/IST compositions may be characterized by comparison with the powder XRD pattern shown in FIG. 15.

TABLE 1

Powder X-ray diffraction data for CIT-14/IST

| Observed* | | Miller | Characterized |
|---|---|---|---|
| Peak, 2-θ | Intensity | Index | Intensity |
| 7.5910 (7.67) | 89 | 110 | vs |
| 8.0675 (8.08) | 100 | 200 | vs |
| 12.8794 (13.04) | 15 | 020 | m |
| 13.7257 | 8 | 310 | w |
| 19.1208 (19.31) | 34 | 112 | s |
| 19.318 (19.90) | 21 | 202 | m |
| 20.7307 (20.91) | 40 | 420 | s |
| 22.3261 (22.48) | 31 | 312 | s |
| 22.9088 | 4 | 222 | w |
| 23.2867 | 7 | 402 | w |
| 24.3658 (24.41) | 13 | 600 | m |
| 25.9252 | 6 | 040 | w |
| 26.5541 | 9 | 132 | w |
| 27.1934 (26.81) | 20 | 240 | m |
| 27.6931 (27.40) | 11 | 512 | m |

*Observed data acquired from sample described in Tables 5 and 7, using a 2-1 Powder Diffraction beamline at the Stanford Synchrotron Radiation Lightsource (SSRL) using a wavelength of 0.9998 A (see Experimental); parenthetical peak locations obtained using Rigaku Miniflex II diffractometer (Cu Kα radiation λ = 1.5418 A).

For example, in other certain embodiments, the crystalline microporous germanosilicate CIT-14/IST compositions are characterized by a powder X-ray diffraction (XRD) pattern that exhibits the characteristic peaks at 7.59±0.5, 8.07±0.5, 19.12±0.5, 20.73±0.5, and 22.33±0.5 degrees 2-θ and optionally at least three of the characteristic peaks at 12.88±0.5, 19.32±0.5, 24.37±0.5, 27.19±0.5, and 27.69±0.5 degrees 2-θ. The peaks at 7.59 and 8.07 deg 2-θ correspond to (110 and 200) Miller index, respectively and are the most intense peak in the pattern. Other individual weaker peaks may also be helpful in distinguishing these from other materials.

The intensity values in Table 1 as observed are believed to be based on a totally randomized orientations of crystallites, the perfect long-range order in all crystallographic directions, and the ideal connectivity of the CIT-14/IST framework. However, the crystallite morphology of CIT-14/IST is very flat, showing a high aspect ratio, which indicates the possibility of the intensity convolution by the preferred orientation of the sample, in practice. Furthermore, it appears that the intensity of the first peak (110) (at 7.67 increases as the crystallinity (quality) of the CIT-14 sample improves. It is because the long-range order of the connection unit (single-4-ring in CIT-14) in the diagonal direction contributes to the (110) diffraction. The Si-rich layers that are relatively chemically inert attribute to the (200) peak at 8.08°. (so it is generally strong)

In certain embodiments, the crystalline microporous germanosilicate CIT-14/IST compositions, as prepared from the CIT-13/OH as described herein have a Si:Ge ratio in a range of from 12:1 to 13:1, from 13:1 to 14:1, from 14:1 to 15:1, from 15:1 to 16:1, from 16:1 to 17:1, from 17:1 to 18:1, from 18:1 to 19:1, from 19:1 to 20:1, or any combination of two or more of these foregoing sub-ranges, for example from 14:1 to 18:1. Specific compositions set forth in the Examples are also considered within these ranges.

The crystals of the crystalline microporous germanosilicate CIT-14/IST are orthorhombic. As described in the Examples, the crystals may, in cases, be disordered, comprising crystals of a Cmmm space group, or a Cmcm space group, or intracrystal mixture (disorder) of the two domains.

Within this context, the crystals of the crystalline microporous germanosilicate CIT-14/IST composition have been found to exhibit unit cell parameters according to:

| Crystal system | Orthorhombic | |
| --- | --- | --- |
| a (Å) | 21.9 ± 0.2 | 21.9007(7) |
| b (Å) | 13.7 ± 0.2 | 13.7360(4) |
| c (Å) | 10.1 ± 0.2 | 10.1138(2) |
| $\alpha = \beta = \gamma$ | 90°. | |

The Å values provided in the right-most column are those actually determined (or estimated) based on the Rietveld refinement (see Examples); those provided in the middle column provided estimated variances that may occur as a function of specific composition (e.g., Si:Ge ratios, or optional metal oxide substitutions)

The channels within these crystalline microporous germanosilicate CIT-14/IST compositions are also characterized as follows: the 8-membered ring channels have pore dimensions of about 3.3 Å×3.9 Å and 12-membered ring channels have pore dimensions of about 4.9 Å×6.4 Å. The respective pore sizes have been experimentally determined to be 3.26 Å×3.93 Å and 4.86 Å×6.44 Å, respectively, but wider variances are warranted to accommodate, for example, physical distortions (e.g., compression) or the ratio of Si:Ge that may alter these values. Also within the framework, the mean metal-oxygen (T-O) bond length in the framework is in a range of from 1.55 to 1.65 Å, the average oxygen-metal-oxygen (O-T-O) in the framework is in a range of from 98° to 116°, and the average metal-oxygen-metal (T-O-T) in the framework is in a range of from 139° to 180°, where T is Si or Ge.

To this point, the crystalline microporous germanosilicate CIT-14/IST composition have been characterized by their physical attributes. But this disclosure also contemplates embodiments in which these compositions are characterized by their methods of making them from the reaction of the germanosilicate CIT-13/OH with concentrated strong acid. Such embodiments include those where the structures are considered independent of the recited physical parameters (i.e., pure product-by-process descriptions) and those where the structures are considered in tandem with one or more of the physical attributes.

In these embodiments, the crystalline microporous germanosilicate CIT-14/IST composition is one that has been prepared by contacting a crystalline microporous germanosilicate, designated CIT-13/OH with concentrated aqueous mineral acid at an elevated temperature and for a time sufficient to form the as-made microporous germanosilicate "-CIT-14." The compositions of both CIT-13/OH (as described and used herein) and "-CIT-14" are described elsewhere here. It should be appreciated that the following descriptions are also pertinent and associated with the methods of preparing the germanosilicate CIT-14/IST composition from the germanosilicate CIT-13/OH composition and that the methods of preparing germanosilicate CIT-14/IST composition by these methods constitute independent embodiments. The composition of this CIT-13/OH germanosilicate is also considered an independent embodiment of this disclosure, as is its use in the preparation of CIT-14/IST, as is the composition designated "-CIT-14."

For the preparation of CIT-14/IST composition from the germanosilicate CIT-13/OH composition, the methods include one or more of the following conditions:

(1) The CIT-13/OH composition is conveniently dispersed in the aqueous strong acid. The reaction mixture may then be left in a static state or is more efficiently mixed in a movable reactor, for example, a rotating reactor. As highlighted in the Examples, it may be useful to physically disperse the reaction media at intermediate times.

(2) The mineral acid is a strong acid; i.e., one which practically completely dissociates in an aqueous solution, as distinguished from a weak acid, which only partially ionizes in an aqueous solution. HCl or $HNO_3$ are prototypical acids used in this capacity, but other strong acids may also be used. These strong acids that have anions capable of incorporating into the framework lattice (e.g., phosphoric acid) are not be considered if such incorporation is seen as undesirable.

(3) The use of concentrated acid appears to be important. In preferred embodiments, the concentration of the mineral acid is in a range of from 6 to 12 M. Higher concentrations are preferred (e.g., 10 to 12 M) as these seem to improve the kinetics and yields of the reactions.

(4) The elevated temperature is a temperature in a range of from 80° C. to 120° C., preferably about 95° C. Given the volatility of the water at these temperatures, sealed reactors need to be used.

(5) The time sufficient to effect the transformation is in a range of from 4 to 96 hours, preferably from 6 to 24 hours. Obviously, there is a balance between the time, temperature, and acid type and concentration needed for the reaction to progress to an appropriate yield of the product; conditions equivalent to 95° C. for 6 hours using 12 M aqueous HCL have been found to be suitable.

(6) The contacting of the germanosilicate with the acid is followed by isolating the resulting degermanated germanosilicate designated "-CIT-14." This is conveniently done by centrifugation, those other separation methods may be used, (7) The isolated "-CIT-14" material is then repeatedly rinsed or washes with water (preferably distilled or deionized water) until the washes are pH neutral. The "-CIT-14"

material is also considered a separate embodiment of this disclosure, and representative features of this material are set forth in the Examples.

(8) The CIT-14/IST can be prepared from this as-made "-CIT-14" material by heating this isolated and washed "-CIT-14" material at a temperature in a range of from about 450° C. to 650° C. for a time in a range of from 2 to 12 hours, preferably at 580° C. for 6 hours, or conditions practically equivalent thereto. In preferred embodiments, the heating is done with a temperature ramp rate of 1-5° C./min, preferably 1° C./min.

The conversion of the CIT-13/OH to the CIT-14/IST is accompanied by a reduction of micropore volume on the order of 25 to 30 vol %.

The foregoing methods provide a CIT-14/IST germanosilicate that is consistent with a mechanism characterized as an inverse sigma transformation of a crystalline microporous CIT-13/OH germanosilicate, for reasons set forth in the discussion sections in the Examples. As such, the method and product may be characterized using that term.

Crystalline Microporous Germanosilicate Compositions, Designated CIT-13/OH

Compositions generally defined as CIT-13 and their reactivities under various processing conditions have previously been reported. See, e.g., U.S. Pat. Nos. 10,293,330 and 10,828,625 and U.S. Patent Application Publication No. 2017-0252729, each of which is incorporated by reference herein for all purposes, or at least for the information relevant to germanosilicate CIT-13.

U.S. Pat. No. 10,293,330 described CIT-13 as having a three-dimensional framework with pore channels defined by 10- and 14-membered rings and exhibiting a powder XRD pattern as presented in Table 2.

TABLE 2

Powder XRD peaks for CIT-13; estimated variances in 2-θ are ± 0.2°. Actual intensities often vary from theoretical values. From U.S. Patent No. 10,293,330

| No. | 2-θ, deg | Theoretical Intensity | Comment |
|---|---|---|---|
| 1 | 6.45 | 100 | Very strong (200) peak, from interlayer spacing |
| 2 | 7.18 | 97 | Very strong (110) |
| 3 | 8.56 | 14 | Almost invisible in practice |
| 4 | 10.73 | 10 | Almost invisible in practice |
| 5 | 11.18 | 15 | Almost invisible in practice |
| 6 | 12.85 | 5 | Generally 5-10 times stronger than theoretical |
| 7 | 18.26 | 18 | Indistinguishable in practice |
| 8 | 18.36 | 11 | |
| 9 | 18.63 | 13 | — |
| 10 | 19.60 | 4.30 | — |
| 11 | 20.78 | 16 | — |
| 12 | 21.55 | 10 | — |
| 13 | 23.36 | 9 | — |
| 14 | 24.55 | 8 | — |
| 15 | 25.7 | 5 | — |
| 16 | 25.30 | 4 | — |
| 17 | 25.87 | 4 | — |
| 18 | 26.01 | 5 | Generally 5-10 times stronger than theoretical |

TABLE 2-continued

Powder XRD peaks for CIT-13; estimated variances in 2-θ are ± 0.2°. Actual intensities often vary from theoretical values. From U.S. Patent No. 10,293,330

| No. | 2-θ, deg | Theoretical Intensity | Comment |
|---|---|---|---|
| 19 | 26.68 | 14 | — |
| 20 | 33.99 | 3.74 | — |

The CIT-13/OH germanosilicates, as described herein, also have a three-dimensional framework having pores defined by 10- and 14-membered rings but are fluoride-free. Consistent with other CIT-13 germanosilicates, they exhibit a powder X-ray diffraction (XRD) pattern having at least five peaks at 6.45±0.2, 7.18±0.2, 12.85±0.2, 20.78±0.2, 26.01±0.2, and 26.68±0.2 degrees 2-θ. See Table 2. These CIT-13/OH germanosilicates may also be characterized by powder XRD patterns having peaks at 6.45±0.2 and 7.18±0.2 degrees 2-θ and five, six, or seven of the other peaks set forth in Table 2.

As discussed in the Examples, the powder XRD patterns of the CIT-13/OH as described herein do show some differences from the data shown in Table 2, notably with respect to the intensity of the (200) peak of the as-made materials. This observation is elaborated further in the Examples. In some embodiments, the peak at 6.45±0.2 degrees 2-θ is reduced in intensity (weak) relative to the peak at 7.18±0.2 degrees 2-θ, making the latter peak the most intense in the pattern (see Examples). In other embodiments, the powder XRD pattern of the CIT-13/OH germanosilicate shows an additional peak at 11.58°±0.2 degrees 2-θ of medium to weak intensity attributable to a (310) index.

Figure 12:
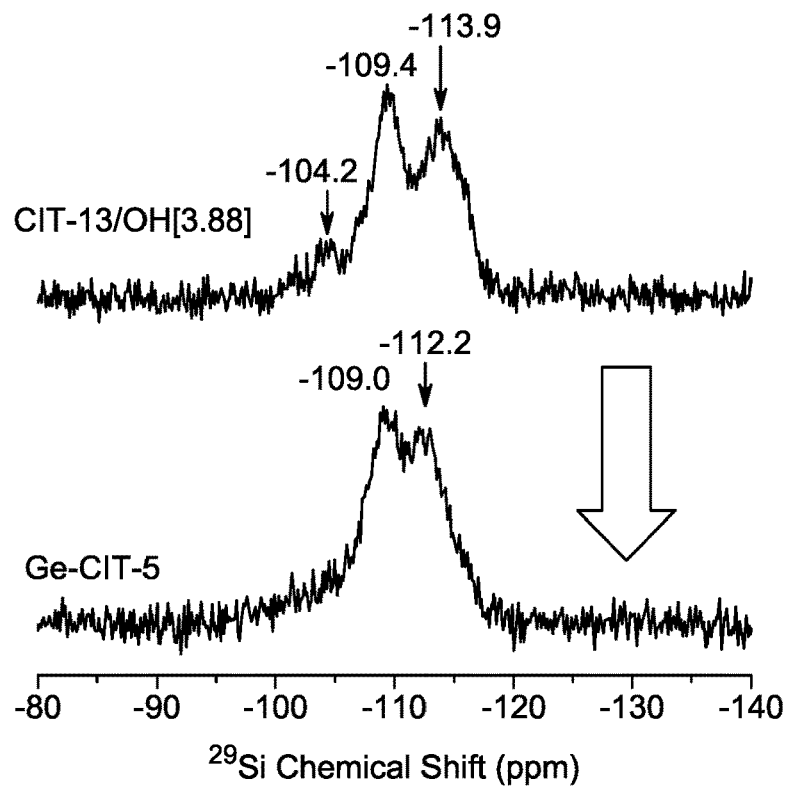
FIG. 12 shows $^{29}$Si 8 kHz MAS spectra of calcined CIT-13/OH[3.88] and the Ge-CIT-5 prepared from it. The $^{29}$Si MAS NMR is qualitatively the same as that of the CIT-14/ESP germanosilicate, prepared by ADOR synthesis described in U.S. Pat. No. 10,293,330, showing small amounts of $Q^3$ Si species and multiple $Q^4$ Si environments within the −108 to −120 chemical shift regions.

The CIT-13/OH germanosilicates also exhibit $^{29}$Si MAS-nmr spectra consistent with the spectrum shown in FIG. 12 (top). This is discussed further in the Examples.

The Si:Ge ratio of these CIT-13/OH germanosilicates is in a range of from 3.5 to 3.6, from 3.6 to 3.7, from 3.7 to 3.8, from 3.8 to 3.9, from 3.9 to 4.0, from 4.0 to 4.1, from 4.1 to 4.2, from 4.2 to 4.3, from 4.3 to 4.4, from 4.4 to 4.5, from 4.5 to 4.6, from 4.6 to 4.7, from 4.7 to 4.8, from 4.8 to 4.9, from 4.9 to 5.0, from 5.0 to 5.2, or in a range defined by any two or more of the foregoing ranges, for example, from 3.5 to 5.2 or from 3.5 to 3.9. These ranges are similar to those previously reported for CIT-13 materials.

But unlike those materials previously reported, the instant fluoride-free CIT-13/OH germanosilicates contain d4r structural units having an average of at least 4 and preferably more than 4 Ge atoms per d4r units, allowing for the presence of Ge-4-rings in the d4r unit. This feature allows for the unexpected transformations of these materials to the corresponding CIT-5 and "-CIT-14"/CIT-14/IST materials. Again, these features are described further in the Examples.

One such method for determining the average number of Ge atoms in the d4r units are set forth in the Examples, involving the addition of fluoride ions to the CIT-13/OH germanosilicates and measuring the $^{19}$F MAS-nmr spectra of the resulting doped materials.

Critical to the final structure of the CIT-13/OH materials is the manner in which they are made, in the complete absence of fluoride ions. As set forth herein, the crystalline microporous germanosilicate CIT-13/OH compositions are prepared by methods comprising hydrothermally treating an aqueous composition derived from the admixture of:

(a) a source of a silicon oxide ($SiO_2$);
(b) a source of a germanium oxide ($GeO_2$); and (c) an optional source of aluminum oxide, boron oxide, gallium oxide, hafnium oxide, iron oxide, tin oxide, titanium oxide, vanadium oxide, zinc oxide, zirconium oxide, or a combination or mixture thereof;
(d) at least one hydroxide salt of a substituted benzyl-imidazolium organic structure-directing agent (OSDA) cation having a structure:

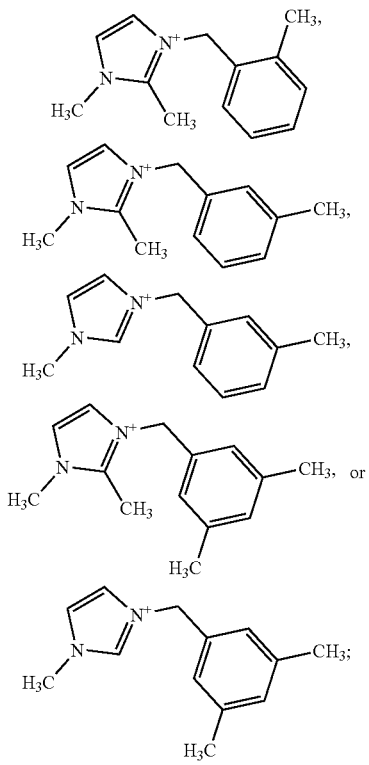

(e) optionally at least one compositionally consistent seed crystal; and
(f) water;
under conditions effective to crystallize the crystalline microporous germanosilicate composition designated CIT-13/OH; and wherein the aqueous composition contains
(a) a molar ratio of Si:Ge in a range of from 2 to 4, preferably from 2.5 to 3.0;
(b) water in a molar ratio of water:Si in a range of from 8:1 to 12:1;
(c) water in a molar ratio of water:($SiO_2$+$GeO_2$) in a range of from 6:1 to 7:1;
(c) hydroxide ions (OH) in a molar ratio of OH:($SiO_2$+$GeO_2$) in a range about 0.3:1 to 0.7:1;
and wherein the aqueous composition is essentially free of fluoride ions.

These ranges are tighter than have been previously reported. These tighter ranges are important for generating the Ge-rich d4r units.

Within this framework, the methods involve one or more of the following features:
(1) the source of the silicon oxide can be any source known to be suitable for molecular sieve syntheses, but in preferred embodiments comprises a silicate, silica hydrogel, silicic acid, fumed silica, colloidal silica, tetra-alkyl orthosilicate, a silica hydroxide, or combination (or equivalent source) thereof, preferably a sodium silicate or a tetraalkyl orthosilicate, and even more preferably tetraethyl orthosilicate (TEOS);
(2) the source of the germanium oxide can be any source known to be suitable for molecular sieve syntheses, the source of the germanium oxide comprises $GeO_2$, or a hydrated derivative thereof (or equivalent source thereof);
(3) the substituted benzyl-imidazolium organic structure-directing agent (OSDA) cation is present in a molar ratio of OSDA:($SiO_2$+$GeO_2$) in a range about 0.3:1 to 0.7:1, preferably in a range about 0.4:1 to 0.6:1;
(4) the aqueous composition is essentially free of alkali metal cations, alkaline earth metal cations or dications, or combinations thereof;
(5) the at least one substituted benzyl-imidazolium organic structure-directing agent (OSDA) cation preferably has a structure:

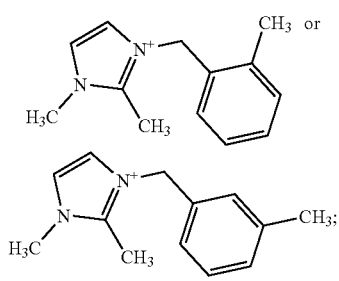

(6) the aqueous composition is a suspension or a gel;
(7) the effective crystallization conditions include subjecting the mixture to a temperature of from about 140° C. to about 180° C., and for a time of from about 4 days to about 4 weeks;
(7) the aqueous composition is hydrothermally treated in a rotating oven;
(8) the method further comprising isolating the crystalline microporous germanosilicate solid composition.

The CIT-14/IST described herein are compositionally different than the CIT-14/ESP (ESP stands for ethoxysilylational pillaring) structures previously reported in U.S. Patent Application Publ. No. 2017/0252729, which is incorporated by reference herein for all purposes or at least these disclosures. These previously reported CIT-14/ESP were prepared by treating the phyllosilicates of CIT-13P topology with a source of silica in the presence of a concentrated aqueous mineral acid (e.g., HCl, or preferably $HNO_3$) at one or more temperatures in a range of from about 165° C. to about 225° C. for a time in a range of from 12 to 48 hours to form an intermediate composition, then isolating and calcining the intermediate composition so as to form a crystalline microporous silicate composition of CIT-14/ESP topology.

In particular, the CIT-14/ESP germanosilicates were formed using the CIT-13P phyllosilicates having much higher Si:Ge ratios, albeit at much higher Si/Ge ratios than described by the instant methods, resulting in CIT-14/ESP germanosilicates with Si:Ge ratios ranging from about 25 to practically infinity, including embodiments where the Si:Ge ratio was about 25 to about 150, or from about 75 to about 150. The quality of the crystals formed by the ADOR process was lower than are reported herein.

Figure 3B:
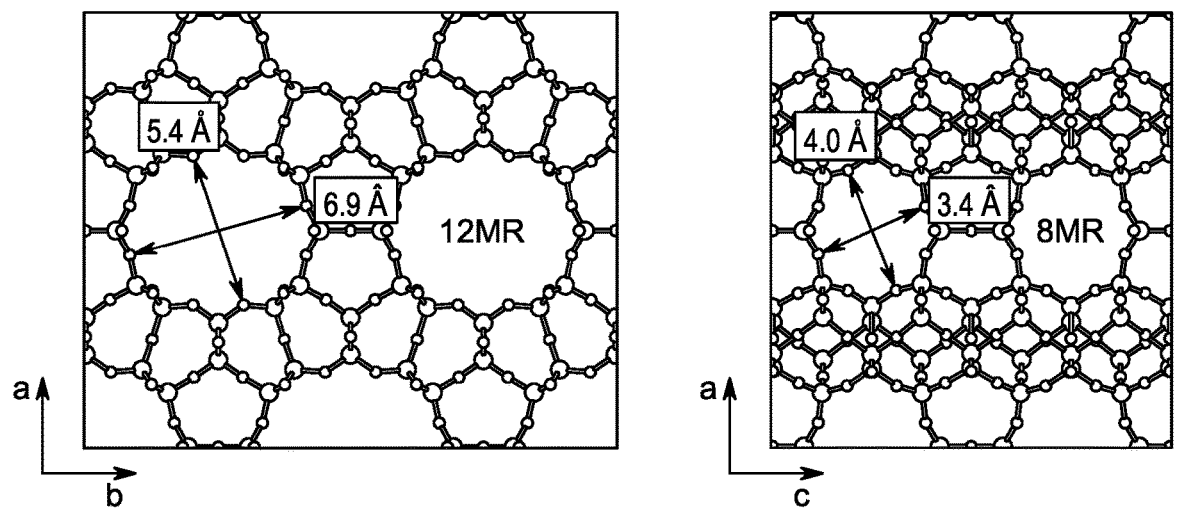
FIGS. 3(A-B) illustrate the structure of CIT-14/ESP (ESP stands for ethoxysilylational pillaring), including its theoretical PXRD data (FIG. 3(A)) and pore channel dimensions (FIG. 3(B)), as described in U.S. Pat. No. 10,293,330.
Figure 3A:
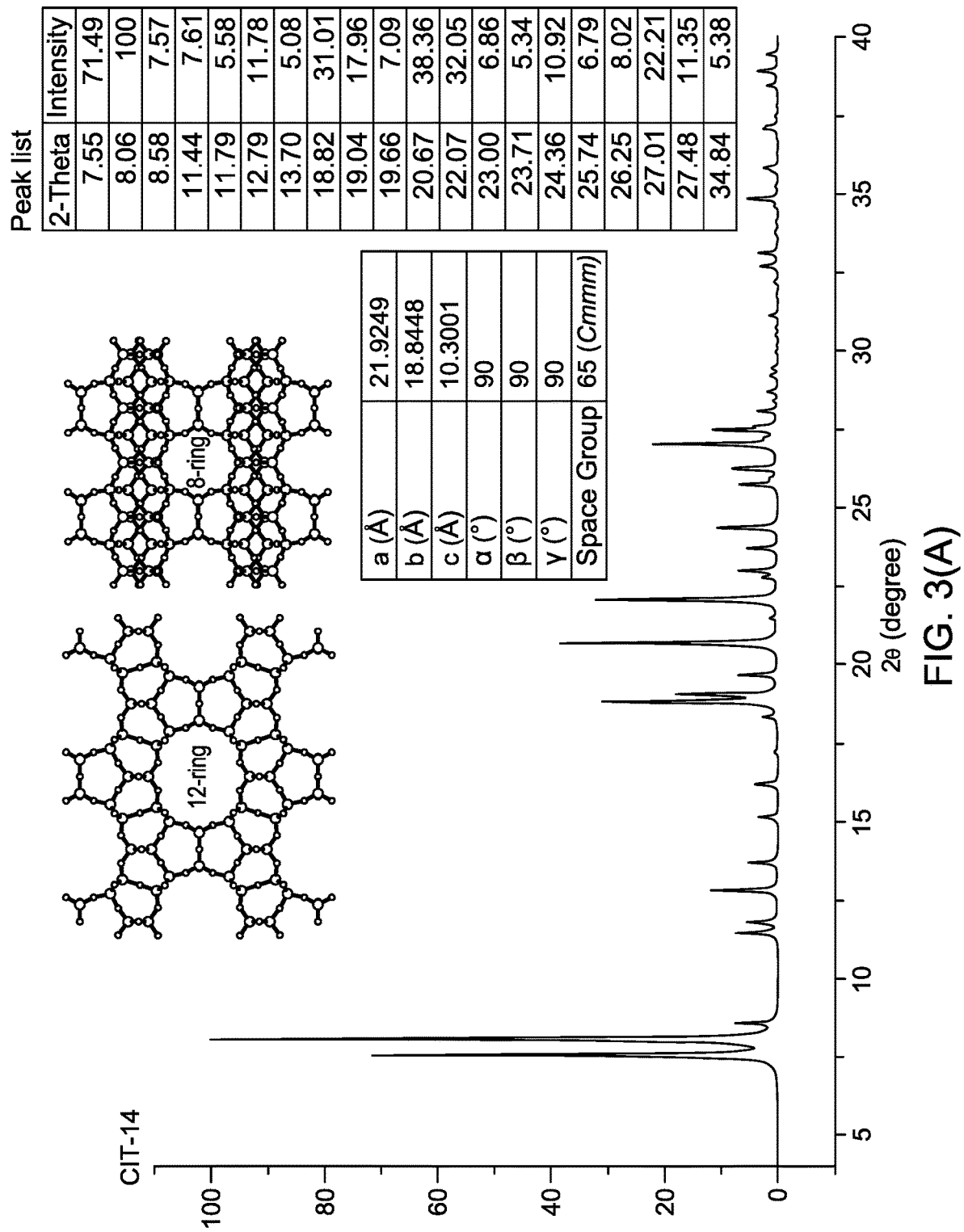

These CIT-14/ESP germanosilicates exhibited powder X-ray diffraction (XRD) patterns reportedly not too different than those reported for the CIT-14/IST germanosilicates, having at least five of the characteristic peaks at 7.7, 8.2, 13.1, 19.5, 21.1, 22.7, and 27.6 degrees 2-θ. Owing to the structural disorder of the material, the observed diffraction peaks were broad, and the errors assigned to these peaks were ±0.5 degrees 2-θ In other embodiments, the errors associated with these peaks were ±0.3 degrees 2-θ. Consistent with other structures prepared by pillaring, and with the methods by which they can be made, the structure of this new material was described in terms of a three-dimensional frameworks having pores defined by 8- and 12-membered rings. Based on the theoretical structure, the 8- and 12-membered rings were calculated to have dimensions of 4.0×3.4 Å and 6.9×5.4 Å, respectively (see FIGS. 3(A-B)). The PXRD patterns identified from isolated products are not identical but are consistent with the theoretical values associated with this structure (as predicted by the General Utility Lattice Program, GULP (Gale, 1997)), i.e., having silica pillars separating the silica-rich cfi-layers. Again, such differences in the patterns were thought to be explained by structural disorder and/or incomplete silica pillaring in the structure. In this case, versions of the CIT-14/ESP may also be described in terms of the crystallographic parameters shown in FIGS. 3(A) and 3(B).

TABLE 3

Comparison of Theoretical and actual values for PXRD patterns of CIT-14/ESP prepared by ADOR transformation. Data from U.S. patent application Pub. No. 2017/0252729.

| Theoretical [a] | | 2-Theta | | |
|---|---|---|---|---|
| 2-Theta | Relative Intensity | Example 1 DEDMS) | Example 2 DETDMS) | Example 3, DETDMS) |
| 7.55 | 71 | 7.72 | 7.68 | 7.76 |
| 8.06 | 100 | 8.24 | 8.24 | 8.24 |
| 12.79 | 12 | 13.08 | 13.04 | 13.12 |
| 18.82 | 31 | 19.4 | 19.4 | 19.5 |
| 19.04 | 18 | — | — | — |
| 20.67 | 38 | 21.1 | 21.1 | 21.2 |
| 22.07 | 32 | 22.7 | 22.7 | 22.7 |
| 27.01 | 22 | — | — | — |
| 27.48 | 11 | 27.6 | 27.6 | 27.6 |

[a] Based on structures shown in FIGS. 3(A-B).

Other Modifications to the Microcrystalline Compositions.

In certain embodiments, the crystalline microporous solids described in the present disclosure, including CIT-13/OH germanosilicate and the newly described microcrystalline CIT-14/IST germanosilicate, are present in their hydrogen form. In other embodiments, the crystalline microporous solids contain at least one metal cation salt or a transition metal or salt in their micropores. In other specific embodiments, the metal cation salt is a salt of $K^+$, $Li^+$, $Rb^+$, $Ca^{2+}$, $Cs^+$: $Co^{2+}$, $Cu^{2+}$, $Mg^{2+}$, $Sr^{2+}$, $Ba^{2+}$, $Ni^{2+}$, or $Fe^{2+}$, the copper salt may include, for example, Schweizer's reagent (tetraamminediaquacopper dihydroxide, $[Cu(NH_3)_4(H_2O)_2](OH)_2]$), copper(II) nitrate, or copper(II) carbonate. Such metal cations may be incorporated, for example, using techniques known to be suitable for this purpose (e.g., ion exchange).

In other embodiments, the micropores may contain a transition metal or transition metal oxide. The addition of such materials may be accomplished, for example, by chemical vapor deposition or chemical precipitation. In certain independent embodiments, the transition metal or transition metal oxide comprises an element of Groups 6, 7, 8, 9, 10, 11, or 12. In other independent embodiments, the transition metal or transition metal oxide comprises scandium, yttrium, titanium, zirconium, vanadium, manganese, chromium, molybdenum, tungsten, iron, ruthenium, osmium, cobalt, rhodium, iridium, nickel, palladium, platinum, copper, silver, gold, or mixtures. Fe, Ru, Os, Co, Rh, Ir, Ni, Pd, Pt, Cu, Ag, Au, and mixtures thereof are preferred. In independent embodiments, the aqueous ammonium or metal salt or chemically vapor deposited or precipitated materials independently include Li, Na, K, Rb, Cs, Be, Mg, Ca, Sr, Be, Al, Ga, In, Zn, Ag, Cd, Ru, Rh, Pd, Pt, Au, Hg, La, Ce, Pr, Nd, Pm, Sm, Eu, or $R_{4-n}N^+H_n$ cations, where R is alkyl, n=0-4 in at least some of its pores.

The term "transition metal" has been defined elsewhere herein, but in certain other independent embodiments, the transition metal or transition metal oxide comprises an element of Groups 6, 7, 8, 9, 10, 11, or 12. In still other independent embodiments, the transition metal or transition metal oxide comprises scandium, yttrium, titanium, zirconium, vanadium, manganese, chromium, molybdenum, tungsten, iron, ruthenium, osmium, cobalt, rhodium, iridium, nickel, palladium, platinum, copper, silver, gold, or mixtures. Fe, Ru, Os, Co, Rh, Ir, Ni, Pd, Pt, Cu, Ag, Au, and mixtures thereof are preferred dopants.

In other embodiments, the optionally doped crystalline solids are calcined in air a temperature defined as being in at least one range of from 400° C. to 500° C., from 500° C. to 600° C., from 600° C. to 700° C., from 700° C. to 800° C., from 800° C. to 900° C., from 900° C. to 1000° C., from 1000° C. to 1200° C., 500° C. to about 1200° C. The choice of any particular temperature may, in some cases, be limited by the stability of the particular solid, either with respect to decomposition or onward conversion to another crystal phase.

Other methods for modifying molecular sieves for use as catalysts are known by those skilled in the art, and any such additional modifications are considered within the scope of this disclosure Uses of the Inventive Compositions—Catalytic Transformations/Separations In various embodiments, the crystalline microporous germanosilicate solids as disclosed herein, calcined, doped, or treated as described herein, act as catalysts to mediate or catalyze an array of chemical transformations or separations. All such combinations of compositions and catalytic reactions are considered individual embodiments of this disclosure, as if they have been individually and separately delineated. The use of these germanosilicates for these purposes are also within the scope of this disclosure. Such transformations/separations may include carbonylating DME (dimethyl ether) with CO at low temperatures, reducing NOx with methane (e.g., in exhaust applications), cracking, hydrocracking, dehydrogenating, converting paraffins to aromatics, dewaxing a hydrocarbon feedstock, MTO (methanol to olefin), isomerizing aromatics (e.g., xylenes), disproportionating aromatics (e.g., toluene), alkylating aromatic hydrocarbons, oligomerizing alkenes, aminating lower alcohols, separating and sorbing lower alkanes, hydrocracking a hydrocarbon, dewaxing a hydrocarbon feedstock, isomerizing an olefin, producing a higher molecular weight hydrocarbon from lower molecular weight hydrocarbon, reforming a hydrocarbon, converting lower alcohol or other oxygenated hydrocarbons to produce olefin products, epoxiding olefins with hydrogen peroxide, reducing the content of an oxide of nitrogen contained in a gas stream in the presence of oxygen, or separating nitrogen from a nitrogen-containing gas mixture by contacting the respective feedstock with the a catalyst comprising the crystalline microporous solid of any one of materials described herein under conditions sufficient to affect the named transformation.

Particularly attractive applications include in which these germanosilicates are expected to be useful include catalytic cracking, hydrocracking, dewaxing, alkylation, and olefin and aromatics formation reactions. Additional applications include gas drying and separation.

Specific embodiments provide hydrocracking processes, each process comprising contacting a hydrocarbon feedstock under hydrocracking conditions with a catalyst comprising a crystalline microporous solid of this disclosure, preferably predominantly in the hydrogen form.

Still other embodiments provide processes for dewaxing hydrocarbon feedstocks, each process comprising contacting a hydrocarbon feedstock under dewaxing conditions with a catalyst comprising a crystalline microporous solid of this disclosure. Yet other embodiments provide processes for improving the viscosity index of a dewaxed product of waxy hydrocarbon feeds, each process comprising contacting the waxy hydrocarbon feed under isomerization dewaxing conditions with a catalyst comprising a crystalline microporous solid of this disclosure.

Additional embodiments include those processes for producing a C20+ lube oil from a C20+ olefin feed, each process comprising isomerizing said olefin feed under isomerization conditions over a catalyst comprising at least one transition metal catalyst and a crystalline microporous solid of this disclosure.

Also included in the present disclosure are processes for isomerization dewaxing a raffinate, each process comprising contacting said raffinate, for example a bright stock, in the presence of added hydrogen with a catalyst comprising at least one transition metal and a crystalline microporous solid of this disclosure.

Other embodiments provide for dewaxing a hydrocarbon oil feedstock boiling above about 350° F. and containing straight chain and slightly branched chain hydrocarbons comprising contacting said hydrocarbon oil feedstock in the presence of added hydrogen gas at a hydrogen pressure of about 15-3000 psi with a catalyst comprising at least one transition metal and a crystalline microporous solid of this disclosure, preferably predominantly in the hydrogen form.

Also included in the present disclosure is a process for preparing a lubricating oil which comprises hydrocracking in a hydrocracking zone a hydrocarbonaceous feedstock to obtain an effluent comprising a hydrocracked oil, and catalytically dewaxing said effluent comprising hydrocracked oil at a temperature of at least about 400° F. and at a pressure of from about 15 psig to about 3000 psig in the presence of added hydrogen gas with a catalyst comprising at least one transition metal and a crystalline microporous solid of this disclosure.

Also included in this disclosure is a process for increasing the octane of a hydrocarbon feedstock to produce a product having an increased aromatics content, each process comprising contacting a hydrocarbonaceous feedstock which comprises normal and slightly branched hydrocarbons having a boiling range above about 40° C. and less than about 200° C., under aromatic conversion conditions with a catalyst comprising a crystalline microporous solid of this disclosure. In these embodiments, the crystalline microporous solid is preferably made substantially free of acidity by neutralizing said solid with a basic metal. Also provided in this disclosure is such a process wherein the crystalline microporous solid contains a transition metal component.

Also provided by the present disclosure are catalytic cracking processes, each process comprising contacting a hydrocarbon feedstock in a reaction zone under catalytic cracking conditions in the absence of added hydrogen with a catalyst comprising a crystalline microporous solid of this disclosure. Also included in this disclosure is such a catalytic cracking process wherein the catalyst additionally comprises an additional large pore crystalline cracking component.

This disclosure further provides isomerization processes for isomerizing C4 to C7 hydrocarbons, each process comprising contacting a feed having normal and slightly branched C4 to C hydrocarbons under isomerizing conditions with a catalyst comprising a crystalline microporous solid of this disclosure, preferably predominantly in the hydrogen form. The crystalline microporous solid may be impregnated with at least one transition metal, preferably platinum. The catalyst may be calcined in a steam/air mixture at an elevated temperature after impregnation of the transition metal.

Also provided by the present disclosure are processes for alkylating an aromatic hydrocarbon, each process comprising contacting under alkylation conditions at least a molar excess of an aromatic hydrocarbon with a C2 to C20 olefin under at least partial liquid phase conditions and in the presence of a catalyst comprising a crystalline microporous solid of this disclosure, preferably predominantly in the hydrogen form. The olefin may be a C2 to C4 olefin, and the aromatic hydrocarbon and olefin may be present in a molar ratio of about 4:1 to about 20:1, respectively. The aromatic hydrocarbon may be selected from the group consisting of benzene, toluene, ethylbenzene, xylene, or mixtures thereof.

Further provided in accordance with this disclosure are processes for transalkylating an aromatic hydrocarbon, each of which process comprises contacting under transalkylating conditions an aromatic hydrocarbon with a polyalkyl aromatic hydrocarbon under at least partial liquid phase conditions and in the presence of a catalyst comprising a crystalline microporous solid of this disclosure, preferably predominantly in the hydrogen form. The aromatic hydrocarbon and the polyalkyl aromatic hydrocarbon may be present in a molar ratio of from about 1:1 to about 25:1, respectively. The aromatic hydrocarbon may be selected from the group consisting of benzene, toluene, ethylbenzene, xylene, or mixtures thereof, and the polyalkyl aromatic hydrocarbon may be a dialkylbenzene.

Further provided by this disclosure are processes to convert paraffins to aromatics, each of which process comprises contacting paraffins under conditions which cause paraffins to convert to aromatics with a catalyst comprising a crystalline microporous solid of this disclosure, said catalyst comprising gallium, zinc, or a compound of gallium or zinc.

In accordance with this disclosure, there are also provided processes for isomerizing olefins, each process comprising contacting said olefin under conditions which cause isomerization of the olefin with a catalyst comprising a crystalline microporous solid of this disclosure.

Further provided in accordance with this disclosure are processes for isomerizing an isomerization feed, each process comprising an aromatic C8 stream of xylene isomers or mixtures of xylene isomers and ethylbenzene, wherein a more nearly equilibrium ratio of ortho-, meta- and para-xylenes is obtained, said process comprising contacting said feed under isomerization conditions with a catalyst comprising a crystalline microporous solid of this disclosure.

The present disclosure further provides processes for oligomerizing olefins, each process comprising contacting an olefin feed under oligomerization conditions with a catalyst comprising a crystalline microporous solid of this disclosure.

This disclosure also provides processes for converting lower alcohols and other oxygenated hydrocarbons, each process comprising contacting said lower alcohol (for example, methanol, ethanol, or propanol) or other oxygenated hydrocarbon with a catalyst comprising a crystalline microporous solid of this disclosure under conditions to produce liquid products.

Also provided by the present disclosure are processes for reducing oxides of nitrogen contained in a gas stream in the presence of oxygen wherein each process comprises contacting the gas stream with a crystalline microporous solid of this disclosure. The crystalline microporous solid may contain a metal or metal ions (such as cobalt, copper, or mixtures thereof) capable of catalyzing the reduction of the oxides of nitrogen and may be conducted in the presence of a stoichiometric excess of oxygen. In a preferred embodiment, the gas stream is the exhaust stream of an internal combustion engine.

Also provided are processes for converting synthesis gas containing hydrogen and carbon monoxide, also referred to as syngas or synthesis gas, to liquid hydrocarbon fuels, using a catalyst comprising any of the germanosilicates described herein, including those having CIT-13 frameworks, and Fischer-Tropsch catalysts. Such catalysts are described in U.S. Pat. No. 9,278,344, which is incorporated by reference for its teaching of the catalysts and methods of using the catalysts. The Fischer-Tropsch component includes a transition metal component of groups 8-10 (i.e., Fe, Ru, Os, Co, Rh, Ir, Ni, Pd, Pt), preferably cobalt, iron and/or ruthenium. The optimum amount of catalytically active metal present depends inter alia on the specific catalytically active metal. Typically, the amount of cobalt present in the catalyst may range from 1 to 100 parts by weight per 100 parts by weight of support material, preferably from 10 to 50 parts by weight per 100 parts by weight of support material. In one embodiment, from 15 to 45 wt % cobalt is deposited on the hybrid support as the Fischer-Tropsch component. In another embodiment from 20 to 45 wt % cobalt is deposited on the hybrid support. The catalytically active Fischer-Tropsch component may be present in the catalyst together with one or more metal promoters or co-catalysts. The promoters may be present as metals or as metal oxide, depending upon the particular promoter concerned. Suitable promoters include metals or oxides of transition metals, including lanthanides and/or the actinides or oxides of the lanthanides and/or the actinides. As an alternative or in addition to the metal oxide promoter, the catalyst may comprise a metal promoter selected from Groups 7 (Mn, Tc, Re) and/or Groups 8-10. In some embodiments, the Fischer-Tropsch component further comprises a cobalt reduction promoter selected from the group consisting of platinum, ruthenium, rhenium, silver and combinations thereof. The method employed to deposit the Fischer-Tropsch component on the hybrid support involves an impregnation technique using an aqueous or non-aqueous solution containing a soluble cobalt salt and, if desired, a soluble promoter metal salt, e.g., platinum salt, in order to achieve the necessary metal loading and distribution required to provide a highly selective and active hybrid synthesis gas conversion catalyst.

Still further process embodiments include those for reducing halide concentration in an initial hydrocarbon product comprising undesirable levels of an organic halide, the process comprising contacting at least a portion of the hydrocarbon product with a composition comprising any of the germanosilicate structures described herein, including CIT-13, under organic halide absorption conditions to reduce the halogen concentration in the hydrocarbon. The initial hydrocarbon product may be made by a hydrocarbon conversion process using an ionic liquid catalyst comprising a halogen-containing acidic ionic liquid. In some embodiments, the organic halide content in the initial hydrocarbon product is in a range of from 50 to 4000 ppm; in other embodiments, the halogen concentrations are reduced to provide a product having less than 40 ppm. In other embodiments, the production may realize a reduction of 85%, 90%, 95%, 97%, or more. The initial hydrocarbon stream may comprise an alkylate or gasoline alkylate. Preferably the hydrocarbon alkylate or alkylate gasoline product is not degraded during the contacting. Any of the materials or process conditions described in U.S. Pat. No. 8,105,481 are considered to describe the range of materials and process conditions of the present disclosure. U.S. Pat. No. 8,105,481 is incorporated by reference at least for its teachings of the methods and materials used to effect such transformations (both alkylations and halogen reductions).

Still further process embodiments include those processes for increasing the octane of a hydrocarbon feedstock to produce a product having an increased aromatics content comprising contacting a hydrocarbonaceous feedstock which comprises normal and slightly branched hydrocarbons having a boiling range above about 40 C and less than about 200 C under aromatic conversion conditions with the catalyst.

Specific conditions for many of these transformations are known to those of ordinary skill in the art. Exemplary conditions for such reactions/transformations may also be found in WO/1999/008961, U.S. Pat. Nos. 4,544,538, 7,083,714, 6,841,063, and 6,827,843, each of which are incorporated by reference herein in its entirety for at least these purposes.

Depending upon the type of reaction that is catalyzed, the microporous solid may be predominantly in the hydrogen form, partially acidic, or substantially free of acidity. The skilled artisan would be able to define these conditions without undue effort. As used herein, "predominantly in the hydrogen form" means that, after calcination (which may also include the exchange of the pre-calcined material with $NH_4^+$ prior to calcination), at least 80% of the cation sites are occupied by hydrogen ions and/or rare earth ions.

The germanosilicates of the present disclosure may also be used as adsorbents for gas separations. For example, these germanosilicates can also be used as hydrocarbon traps, for example, as a cold start hydrocarbon trap in combustion engine pollution control systems. In particular, such germanosilicate may be particularly useful for trapping $C_3$ fragments. Such embodiments may comprise processes and devices for trapping low molecular weight hydrocarbons from an incoming gas stream, the process comprising passing the gas stream across or through a composition comprising any one of the crystalline microporous germanosilicate compositions described herein, so as to provide an outgoing gas stream having a reduced concentration of low molecular weight hydrocarbons relative to the incoming gas stream. In this context, the term "low molecular weight hydrocarbons" refers to C1-C6 hydrocarbons or hydrocarbon fragments.

The germanosilicates of the present disclosure may also be used in a process for treating a cold-start engine exhaust gas stream containing hydrocarbons and other pollutants, wherein the process comprises or consist of flowing the engine exhaust gas stream over one of the germanosilicate compositions of the present disclosure which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere.

The germanosilicates of the present disclosure can also be used to separate gases. For example, these can be used to separate water, carbon dioxide, and sulfur dioxide from fluid streams, such as low-grade natural gas streams, and carbon dioxide from natural gas. Typically, the molecular sieve is used as a component in a membrane that is used to separate the gases. Examples of such membranes are disclosed in U.S. Pat. No. 6,508,860.

For each of the preceding processes described, additional corresponding embodiments include those comprising a device or system comprising or containing the materials described for each process. For example, in the gas of the gas trapping, additional embodiments include those devices known in the art as hydrocarbon traps which may be positioned in the exhaust gas passage of a vehicle. In such devices, hydrocarbons are adsorbed on the trap and stored until the engine and exhaust reach a sufficient temperature for desorption. The devices may also comprise membranes comprising the germanosilicate compositions, useful in the processes described.

TERMS

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and/or equivalents thereof known to those skilled in the art, and so forth.

When a value is expressed as an approximation by use of the descriptor "about," it will be understood that the particular value forms another embodiment. In general, the use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the disclosure which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the disclosure that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally accepted meanings in the patent vernacular, that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed disclosure. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) is the facile operability of the methods or compositions/systems to provide the germanosilicate compositions at meaningful yields or the ability of the systems using only those ingredients listed.

The term "meaningful product yields" is intended to reflect product yields such as described herein, but also including greater than 20%, but when specified, this term may also refer to yields of 10%, 20%, 30%, 40%, 50%, 60%, 700%, 80%, or 90% or more, relative to the amount of original substrate.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments.

Throughout this specification, words are to be afforded their normal meaning, as would be understood by those skilled in the relevant art. However, so as to avoid misunderstanding, the meanings of certain terms will be specifically defined or clarified.

The term "alkyl" as used herein refers to a linear, branched, or cyclic saturated hydrocarbon group typically although not necessarily containing 1 to about 6 carbon atoms, such as methyl, ethyl, n-propyl, isopropyl, n-butyl, isobutyl, tert-butyl, and the like.

The term "aromatic" refers to the ring moieties which satisfy the Hückel 4n+2 rule for aromaticity, and includes both aryl (i.e., carbocyclic) and heteroaryl structures.

The term "halide" is used in the conventional sense to refer to a chloride, bromide, fluoride, or iodide.

"Lower alcohols" or lower alkanes refer to alcohols or alkanes, respectively, having 1-10 carbons, linear or branched, preferably 1-6 carbon atoms and preferably linear. Methanol, ethanol, propanol, butanol, pentanol, and hexanol are examples of lower alcohols. Methane, ethane, propane, butane, pentane, and hexane are examples of lower alkanes.

As used herein, unless otherwise specified, the term "elevated temperatures" typically refers to at least one temperature in a range of from about 170° C. to about 230° C. The term "calcining" is reserved for higher temperatures. Unless otherwise specified, it refers to one or more temperatures in a range of from about 450° C. to about 800° C.

As used herein, the terms "metals or metalloids," as in "sources of metals or metalloids" or "oxides of metals or metalloids," refers to those Group 4, 5, 8, 13, 14, and 15 elements of the Periodic Table. These elements are typically found as oxides in molecular sieves, including for example, aluminum, boron, gallium, hafnium, iron, silicon, tin, titanium, vanadium, zinc, zirconium, or combinations thereof.

Typical sources of silicon oxide for the reaction mixtures include alkoxides, hydroxides, or oxides of silicon, or a combination thereof. Exemplary compounds also include silicates (including sodium silicate), silica hydrogel, silicic acid, fumed silica, colloidal silica, tetra-alkyl orthosilicates, silica hydroxides, or a combination thereof. Sodium silicate or tetraorthosilicates, for example tetraethyl orthosilicate (TEOS), diethoxydimethylsilane (DEDMS) and/or 1,3-diethoxy-1,1,3,3-tetramethyldisiloxane (DETMDS) are preferred sources.

Sources of germanium oxide can include alkali metal orthogermanates, $M_4GeO_4$, containing discrete $GeO_4^{4-}$ ions, $GeO(OH)_3^-$, $GeO_2(OH)_2^{2-}$, $[(Ge(OH)_4)_8(OH)_3]^{3-}$ or neutral solutions of germanium dioxide contain $Ge(OH)_4$, or alkoxide or carboxylate derivatives thereof.

Typical sources of aluminum oxide for the reaction mixture include aluminates, alumina, aluminum colloids, aluminum alkoxides, aluminum oxide coated on silica sol, hydrated alumina gels such as $Al(OH)_3$ and a sodium aluminate. Sources of aluminum oxide may also comprise an alkoxide, hydroxide, or oxide of aluminum, or a combination thereof. Additionally, the sources of alumina may also comprise other ligands as well, for example acetylacetonate, carboxylates, and oxalates; such compounds are well known as useful in hydrothermal or sol-gel syntheses. Additional sources of aluminum oxide can include aluminum salts, such as $AlCl_3$, $Al(OH)_3$, $Al(NO_3)_3$, and $Al_2(SO_4)_3$.

Sources of boron oxide, gallium oxide, hafnium oxide, iron oxide, tin oxide, titanium oxide, indium oxide, vanadium oxide, and/or zirconium oxide can be added in forms corresponding to their aluminum and silicon counterparts.

As used herein, the term "mineral acids" refers to mineralizing acids conventionally used in molecular sieve zeolite syntheses, for example HCl, HBr, HF, $HNO_3$, or $H_2SO_4$. Oxalic acid and other strong organic acids may also be employed in lieu of mineral acids. Generally, HCl and $HNO_3$ are preferred mineral acids. As used herein throughout, the terms "concentrated" and "dilute" with respect to mineral acids refer to concentrations in excess and less than 0.5 M, respectively. In some embodiments, the term "concentrated" refers to concentrations in one or more of a range from 0.5 to 0.6, from 0.6 to 0.7, from 0.7 to 0.8, from 0.8 to 0.9, from 0.9 to 1.0, from 1.0 to 1.1, from 1.1 to 1.2, from 1.2 to 1.3, from 1.3 to 1.4, from 1.4 to 1.5, from 1.5 to 1.6, from 1.6 to 1.7, from 1.7 to 1.8, from 1.8 to 1.9, and from 1.9 to 2.0 or higher. In experiments described herein, and in preferred embodiments, concentrated acids refer to those in a composition range of from 0.9 to 1.1 M. Similarly, the term "dilute" refers to concentrations in one or more of a range from 0.5 to 0.4, from 0.4 to 0.3, from 0.3 to 0.2, from 0.2 to 0.15, from 0.15 to 0.1, and from 0.1 to 0.05. In experiments described herein, and in preferred embodiments, dilute acids refer to those in a composition range of from 0.5 to 0.15 M.

The term "CIT-13" topology describes a crystalline microporous composition analogous to that described in U.S. Pat. No. 10,293,330, having a set of orthogonally oriented 14-membered pores. The term "phyllosilicate" refers to a 2-dimensional layered structure of silica-containing oxides, as described in U.S. Patent Application Publication No. 2017/0252729.

The terms "oxygenated hydrocarbons" or "oxygenates" as known in the art of hydrocarbon processing to refer to components which include alcohols, aldehydes, carboxylic acids, ethers, and/or ketones which are known to be present in hydrocarbon streams or derived from biomass streams other sources (e.g., ethanol from fermenting sugar).

The terms "separating" or "separated" carry their ordinary meaning as would be understood by the skilled artisan, insofar as they connote physically partitioning or isolating solid product materials from other starting materials or co-products or side-products (impurities) associated with the reaction conditions yielding the material. As such, it infers that the skilled artisan at least recognizes the existence of the product and takes specific action to separate or isolate it from starting materials and/or side- or byproducts. Absolute purity is not required, though it is preferred. In the case where the terms are used in the context of gas processing, the terms "separating" or "separated" connote a partitioning of the gases by adsorption or by permeation based on size or physical or chemical properties, as would be understood by those skilled in the art.

Unless otherwise indicated, the term "isolated" means physically separated from the other components so as to be free of at least solvents or other impurities, such as starting materials, co-products, or byproducts. In some embodiments, the isolated crystalline materials, for example, may be considered isolated when separated from the reaction mixture giving rise to their preparation, from mixed phase co-products, or both. In some of these embodiments, pure germanosilicates (including structures with or without incorporated OSDAs) can be made directly from the described methods. In some cases, it may not be possible to separate crystalline phases from one another, in which case, the term "isolated" can refer to separation from their source compositions.

The term "microporous," according to IUPAC notation, refers to a material having pore diameters of less than 2 nm. Similarly, the term "macroporous" refers to materials having pore diameters of greater than 50 nm. And the term "mesoporous" refers to materials whose pore sizes are intermediate between microporous and macroporous. Within the context of the present disclosure, the material properties and applications depend on the properties of the framework such as pore size and dimensionality, cage dimensions and material composition. Due to this there is often only a single framework and composition that gives optimal performance in a desired application.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The terms "method(s)" and "process(es)" are considered interchangeable within this disclosure.

As used herein, the term "crystalline microporous solids" or "crystalline microporous germanosilicate" are crystalline structures having very regular pore structures of molecular dimensions, i.e., under 2 nm. The maximum size of the species that can enter the pores of a crystalline microporous solid is controlled by the dimensions of the channels. These terms may also refer specifically to CIT-13 compositions.

As used herein, the term "pillaring" refers generally to a process that introduces stable metal oxide structures ("so-called "pillars") between substantially parallel crystalline silicate layers. The metal oxide structures keep the silicate layers separated, creating by interlayer spacings of molecular dimensions. The term is generally used in the context of clay chemistry and is well understood by those skilled in the art of clays and zeolites, especially as applied to catalysts.

The term "germanosilicate" refers to any composition including silicon and germanium oxides within its framework. The term "pure," "pure germanosilicate," connote that these compositions contain, as far as practicably possible, only germania and silica, respectively, and any other metal oxides within the framework are present as inevitable, unintended, impurities. The germanosilicate may be "pure-germanosilicate" or optionally substituted with other metal or metalloid oxides. Likewise, the terms aluminosilicate, borosilicate, ferrosilicate, stannosilicate, titanosilicate, or zincosilicate structures are those containing silicon oxides and oxides of aluminum, boron, iron, tin, titanium, and zinc, respectively. When described as "optionally substituted," the respective framework may contain aluminum, boron, gallium, germanium, hafnium, iron, tin, titanium, indium, vanadium, zinc, zirconium, or other atoms or oxides substituted for one or more of the atoms or oxides not already contained in the parent framework.

As used herein, the term "transition metal" refers to any element in the d-block of the Periodic Table, which includes groups 3 to 12 on the Periodic Table. In actual practice, the f-block lanthanide and actinide series are also considered transition metals and are called "inner transition metals. This definition of transition metals also encompasses Group 3 to Group 12 elements. In certain other independent embodiments, the transition metal or transition metal oxide comprises an element of Groups 6, 7, 8, 9, 10, 11, or 12. In still other independent embodiments, the transition metal or transition metal oxide comprises scandium, yttrium, titanium, zirconium, vanadium, manganese, chromium, molybdenum, tungsten, iron, ruthenium, osmium, cobalt, rhodium, iridium, nickel, palladium, platinum, copper, silver, gold, or mixtures. Fe, Ru, Os, Co, Rh, Ir, Ni, Pd, Pt, Cu, Ag, Au, and mixtures thereof are preferred dopants.

The following listing of Embodiments is intended to complement, rather than displace or supersede, the previous descriptions.

Embodiment 1. A crystalline microporous germanosilicate composition, designated CIT-14/IST, having 8- and 12-membered ring channels Embodiment 2. The crystalline microporous germanosilicate CIT-14/IST composition of Embodiment 1, characterized by a powder X-ray diffraction (XRD) pattern having at least five characteristic peaks at 7.59±0.5, 8.07±0.5, 12.88±0.5, 19.12±0.5, 19.32±0.5, 20.73±0.5, 22.33±0.5, 24.37±0.5, 27.19±0.5, and 27.69±0.5 degrees 2-θ. In certain Aspects of this Embodiment, the CIT-14/IST germanosilicate composition comprises a pure germanosilicate. In other independent Aspects of this Embodiment, the CIT-14/IST germanosilicate composition comprises a framework including one or more oxides of aluminum, boron, gallium, hafnium, iron, tin, titanium, vanadium, zinc, or zirconium. In certain independent Aspects of this Embodiment, the powder X-ray diffraction (XRD) pattern exhibits at least five characteristic peaks at five, six, seven, eight, nine, or ten of these characteristic peaks set forth above. In certain independent Aspects of this Embodiment, the uncertainties of the peak locations are independently (for each peak)±0.5 degrees 2-θ, ±0.4 degrees 2-θ, ±0.3 degrees 2-θ, ±0.2 degrees 2-θ, ±0.15 degrees 2-θ, or ±0.15 degrees 2-θ.

Embodiment 3. The crystalline microporous germanosilicate CIT-14/IST composition of Embodiment 1 or 2, characterized by a powder X-ray diffraction (XRD) pattern that exhibits the characteristic peaks at 7.59±0.5, 8.07±0.5, 19.12±0.5, 20.73±0.5, and 22.33±0.5 degrees 2-θ and optionally at least three of the characteristic peaks at 12.88±0.5, 19.32±0.5, 24.37±0.5, 27.19±0.5, and 27.69±0.5 degrees 2-θ. The data in Table 1, and the comments associated with that table, set forth above, as seen as independent Aspects of this Embodiment.

Embodiment 4. The crystalline microporous germanosilicate CIT-14/IST composition of any one of Embodiments 1 to 3, having a Si:Ge ratio in a range of from 12:1 to 13:1, from 13:1 to 14:1, from 14:1 to 15:1, from 15:1 to 16:1, from 16:1 to 17:1, from 17:1 to 18:1, from 18:1 to 19:1, from 19:1 to 20:1, or any combination of two or more of these foregoing subranges, for example from 14:1 to 18:1. Each of these ranges is considered an independent Aspect within this Embodiment.

Embodiment 5. The crystalline microporous germanosilicate CIT-14/IST composition of any one of Embodiments 1 to 4, wherein the crystals are orthorhombic and have a Cmmm space group, or a Cmcm space group, or intracrystal mixture (disorder) of the two domains.

Embodiment 6. The crystalline microporous germanosilicate CIT-14/IST composition of any one of Embodiments 1 to 5, having unit cell parameters according to:

| Crystal system | Orthorhombic | |
| --- | --- | --- |
| a (Å) | 21.9 ± 0.2 | 21.9007(7) |
| b (Å) | 13.7 ± 0.2 | 13.7360(4) |
| c (Å) | 10.1 ± 0.2 | 10.1138(2) |
| α = β = γ | | 90°. |

Embodiment 7. The crystalline microporous germanosilicate CIT-14/IST composition of any one of Embodiments 1 to 6, wherein the 8-membered ring channels have pore dimensions of about 3.3 Å×3.9 Å and 12-membered ring channels have pore dimensions of about 4.9 Å×6.4 Å. In certain Aspects of this Embodiment, the respective pore sizes are 3.26 Å×3.93 Å and 4.86 Å×6.44 Å. Physical distortions (e.g., compression) or the ratio of Si:Ge may alter these values. In certain Aspects of this Embodiment, the mean metal-oxygen (T-O) bond length in the framework is in a range of from 1.55 to 1.65 Å, the average oxygen-metal-oxygen (O-T-O) in the framework is in a range of from 98° to 116°, and the average metal-oxygen-metal (T-O-T) in the framework is in a range of from 139° to 180°]

Embodiment 8. The crystalline microporous germanosilicate CIT-14/IST composition of any one of Embodiments 1 to 7 that is derived or derivable from a reaction characterized as an inverse sigma transformation of a crystalline microporous germanosilicate, designated CIT-13/OH. The specific characteristics of CIT-13/OH are described in greater detail elsewhere herein and these descriptions are incorporated herein as if bodily incorporated.

Embodiment 9. The crystalline microporous germanosilicate CIT-14/IST composition of any one of Embodiments 1 to 8 that has been prepared by contacting a crystalline microporous germanosilicate, designated CIT-13/OH (described elsewhere herein) with concentrated aqueous mineral acid (for example, as a dispersion of the germanosilicate in the aqueous acid) at an elevated temperature and for a time sufficient to form the as-made microporous germanosilicate "-CIT-14" (also described elsewhere here, those descriptions also are incorporated into this Embodiment).

In certain Aspects of this Embodiment: (a) the mineral acid is aqueous HCl or HNO$_3$ or an equivalent strong acid; (b) the concentration of the mineral acid is in a range of from 6 to 12 M; (c) the elevated temperature is a temperature in a range of from 80° C. to 120° C., preferably about 95° C.; (d) the time sufficient is in a range of from 4 to 96 hours, preferably from 4 to 24 hours; conditions equivalent to 95° C. for 6 hours is suitable; (e) the contacting with the acid is followed by isolating the resulting degermanated germanosilicate is a material designated "-CIT-14;" (f) the "-CIT-14" material is rinsed with water (preferably distilled or deionized water) until the washes are pH neutral; (g) the conditions further comprise heating this isolated and washed "-CIT-14" material at a temperature in a range of from about 450° C. to 650° C. for a time in a range of from 2 to 12 hours, preferably at 580° C. for 6 hours, more preferably with a temperature ramp rate of 1° C./min.

Embodiment 10. A crystalline microporous germanosilicate designated CIT-13/OH that is fluoride-free, has a three-dimensional framework having pores defined by 10- and 14-membered rings, and exhibits a powder X-ray diffraction (XRD) pattern having at least five peaks at 6.45±0.2, 7.18±0.2, 12.85±0.2, 20.78±0.2, 26.01±0.2, and 26.68±0.2 degrees 2-θ. In some Aspects of this Embodiment, the peak at 6.45±0.2 degrees 2-θ is reduced in intensity (weak) relative to the peak at 7.18±0.2 degrees 2-θ, making the latter peak the most intense in the pattern (see Examples). In other Aspects of this Embodiment, the powder XRD pattern shows an additional peak at 11.58°±0.2 degrees 2-θ. The data in Table 2, and the comments associated therewith are considered independent Aspects of this Embodiment.

The composition of this CIT-13/OH germanosilicate is considered an independent Embodiment of this disclosure, as is its use in the preparation of CIT-14/IST.

Embodiment 11. The crystalline microporous germanosilicate CIT-14/IST composition of Embodiment 8 or 9 or the crystalline microporous germanosilicate CIT-13/OH of Embodiment 10, wherein the crystalline microporous germanosilicate designated CIT-13/OH is prepared by a method comprising hydrothermally treating an aqueous composition derived from the admixture of:
(a) a source of a silicon oxide ($SiO_2$);
(b) a source of a germanium oxide ($GeO_2$); and
(c) an optional source of aluminum oxide, boron oxide, gallium oxide, hafnium oxide, iron oxide, tin oxide, titanium oxide, vanadium oxide, zinc oxide, zirconium oxide, or a combination or mixture thereof;
(d) at least one hydroxide salt of a substituted benzyl-imidazolium organic structure-directing agent (OSDA) cation having a structure:

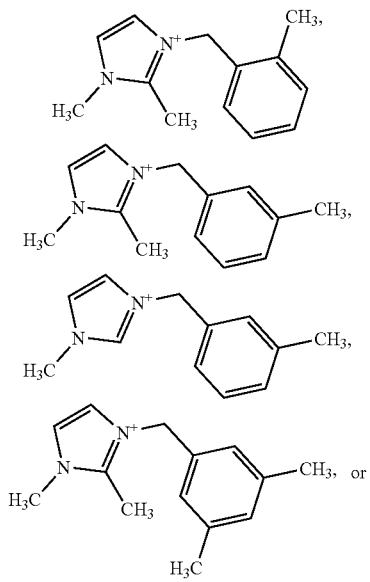

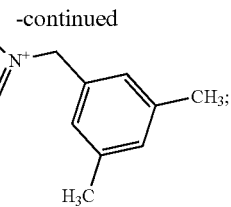

(e) optionally at least one compositionally consistent seed crystal; and
(f) water;

under conditions effective to crystallize the crystalline microporous germanosilicate composition designated CIT-13/OH; and wherein the aqueous composition contains
(a) a molar ratio of Si:Ge in a range of from 2 to 4, preferably from 2.5 to 3.0;
(b) water in a molar ratio of water:Si in a range of from 8:1 to 12:1;
(c) water in a molar ratio of water:($SiO_2$+$GeO_2$) in a range of from 6:1 to 7:1;
(c) hydroxide ions (OH) in a molar ratio of OH:($SiO_2$+$GeO_2$) in a range about 0.3:1 to 0.7:1;
and wherein the aqueous composition is essentially free of fluoride ions.

In independent Aspects of this Embodiment:
(1) the source of the silicon oxide comprises a silicate, silica hydrogel, silicic acid, fumed silica, colloidal silica, tetra-alkyl orthosilicate, a silica hydroxide or combination (or equivalent source) thereof, preferably a sodium silicate or a tetraalkyl orthosilicate, more preferably tetraethyl orthosilicate (TEOS);
(2) the source of the germanium oxide comprises $GeO_2$, or a hydrated derivative thereof (or equivalent source thereof);
(3) the substituted benzyl-imidazolium organic structure-directing agent (OSDA) cation is present in a molar ratio of OSDA:($SiO_2$+$GeO_2$) in a range about 0.3:1 to 0.7:1, preferably in a range about 0.4:1 to 0.6:1;
(4) the aqueous composition is essentially free of alkali metal cations, alkaline earth metal cations or dications, or combinations thereof;
(5) the at least one substituted benzyl-imidazolium organic structure-directing agent (OSDA) cation has a structure:

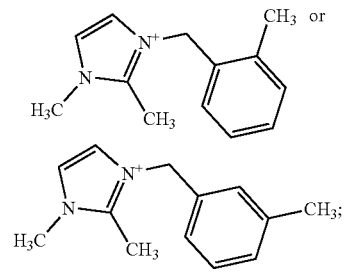

(6) the aqueous composition is a suspension or a gel;
(7) the effective crystallization conditions include subjecting the mixture to a temperature of from about 140° C. to about 180° C., and for a time of from about 4 days to about 4 weeks;
(7) the aqueous composition is hydrothermally treated in a rotating oven;

(8) the method further comprising isolating the crystalline microporous germanosilicate solid composition.

Embodiment 12. The crystalline microporous germanosilicate CIT-14/IST composition of Embodiment 8, 9, or 11 or the crystalline microporous germanosilicate CIT-13/OH of Embodiment 10 or 11, wherein the crystalline microporous germanosilicate designated CIT-13/OH is fluoride-free and has d4r units having an average of at least and preferably more than 4 Ge atoms per d4r units, allowing for the presence of Ge-4-rings in the d4r unit. The methods for determining the average number of Ge atoms in the d4r units are set forth elsewhere and incorporated within this Embodiment. In some independent Aspects of this Embodiment, the Si:Ge ratio is in a range of from 3.5 to 3.6, from 3.6 to 3.7, from 3.7 to 3.8, from 3.8 to 3.9, from 3.9 to 4.0, from 4.0 to 4.1, from 4.1 to 4.2, from 4.2 to 4.3, from 4.3 to 4.4, from 4.4 to 4.5, from 4.5 to 4.6, from 4.6 to 4.7, from 4.7 to 4.8, from 4.8 to 4.9, from 4.9 to 5.0, from 5.0 to 5.2, or in a range defined by any two or more of the foregoing ranges, for example, from 3.5 to 3.9. Each of these ranges is considered an independent Aspect within this Embodiment.

Embodiment 13. The crystalline microporous germanosilicate CIT-14/IST composition of Embodiment 8, 9, 11, or 12 or the crystalline microporous germanosilicate CIT-13/OH of any one of Embodiment 10 to 12, containing micropores that optionally contain an alkali metal cation salt, an alkaline earth metal salt, a transition metal, a transition metal oxide, a transition metal salt, or a combination thereof. The nature of the salts, metals, and metal oxides are considered elsewhere in this specification and incorporated in this Embodiment. In certain Aspects of this Embodiment, the respective germanosilicate is in its hydrogen form. In other Aspects of this Embodiment, the respective germanosilicate contains one or more of the salts, metals, or metal oxides within its micropores.

Embodiment 14. A catalyst comprising the crystalline microporous germanosilicate CIT-14/IST composition of any one of Embodiment 1 to 9 or 11 to 13 or the crystalline microporous germanosilicate CIT-13/OH of any one of Embodiment 10 to 13.

Embodiment 15. A process for affecting an organic transformation or separating materials, the process comprising:
(a) carbonylating DME with CO at low temperatures;
(b) reducing NOx with methane:
(c) cracking, hydrocracking, or dehydrogenating a hydrocarbon;
(d) dewaxing a hydrocarbon feedstock;
(e) converting paraffins to aromatics:
(f) isomerizing or disproportionating an aromatic feedstock;
(g) alkylating an aromatic hydrocarbon;
(h) oligomerizing an alkene;
(i) aminating a lower alcohol;
(j) separating and sorbing a lower alkane from a hydrocarbon feedstock;
(k) isomerizing an olefin;
(l) producing a higher molecular weight hydrocarbon from lower molecular weight hydrocarbon;
(m) reforming a hydrocarbon
(n) converting a lower alcohol or other oxygenated hydrocarbon to produce an olefin product (including MTO);
(o) epoxidizing olefins with hydrogen peroxide;
(p) reducing the content of an oxide of nitrogen contained in a gas stream in the presence of oxygen;
(q) separating nitrogen from a nitrogen-containing gas mixture; or
(r) converting synthesis gas containing hydrogen and carbon monoxide to a hydrocarbon stream; or
(s) reducing the concentration of an organic halide in an initial hydrocarbon product; by contacting the respective feedstock with a catalyst of Embodiment 14, under conditions sufficient to affect the named transformation.

Embodiment 16. A method of preparing the crystalline microporous germanosilicate CIT-14/IST composition of any one of Embodiments 1 to 9 or 11 to 13 (or any of the compositions designated CIT-14/IST elsewhere herein), the method comprising a contacting a crystalline microporous germanosilicate, designated CIT-13/OH as set forth at least in any one of Embodiments 10 to 12 (or otherwise described elsewhere herein) with concentrated aqueous mineral acid (for example, as a dispersion of the germanosilicate in the aqueous acid) at an elevated temperature and for a time sufficient to form the as-made microporous germanosilicate "-CIT-14" (also described elsewhere here, those descriptions are also incorporated into this Embodiment).

In certain Aspects of this Embodiment: (a) the mineral acid is aqueous HCl or $HNO_3$ or an equivalent strong acid; (b) the concentration of the mineral acid is in a range of from 6 to 12 M; (c) the elevated temperature is a temperature in a range of from 80° C. to 120° C., preferably about 95° C.; (d) the time sufficient is in a range of from 4 to 96 hours, preferably from 4 to 24 hours; conditions equivalent to 95° C. for 6 hours is suitable; (e) the contacting with the acid is followed by isolating the resulting degermanated germanosilicate is a material designated "-CIT-14;" (f) the "-CIT-14" material is rinsed with water (preferably distilled or deionized water) until the washes are pH neutral.

Embodiment 17. The method of Embodiment 16 further comprising calcining the as-made and washed "-CIT-14" composition at a time and temperature sufficient to form the crystalline microporous germanosilicate CIT-14/IST composition. In certain independent Aspects, these conditions further comprise heating this isolated and washed "-CIT-14" material at a temperature in a range of from about 450° C. to 650° C. for a time in a range of from 2 to 12 hours, preferably at 580° C. for 6 hours, more preferably with a temperature ramp rate of 1° C./min.

This disclosure also embraces those embodiments of the CIT-13/OH germanosilicate, prepared by the hydroxide route as described specifically herein. This disclosure also embraces those embodiments of the CIT-13/OH germanosilicate that am characterized as having d4r units that contain an average of at least, preferably more than 4 Ge atoms per d4r, allowing for the presence of Ge-4-rings in the d4r unit. This disclosure also embraces those embodiments of the CIT-13/OH germanosilicate that exhibit the reactivity features not previously observed before that are the consequence of the new and unique physical features set forth herein.

EXAMPLES

The following Examples provide the experimental methods used to characterize these novel materials and their transformations as well as illustrate some of the concepts described within this disclosure. While each Example, both provided here and elsewhere in the body of the specification, is considered to provide specific individual embodiments of composition, methods of preparation and use, none of the Examples should be considered to limit the more general embodiments described herein.

Unless otherwise specified, the powder XRD patterns, nmr-spectra, or other representations of the structures presented herein for specific compositions are believed to be representative of those attributable to the general structures to which they are associated.

In the following examples, efforts have been made to ensure accuracy with respect to numbers used (e.g., amounts, temperature, etc.), but some experimental error and deviation should be accounted for. Unless indicated otherwise, temperature is in degrees C, pressure is at or near atmospheric.

Example 1. Experimental

Example 1.1. Material Preparation

CIT-13 from fluoride-free gels (denoted CIT-13/OH) was crystallized using 1,2-dimethyl-3-(2-methylbenzyl)imidazolium hydroxide (denoted "orthomethylbenzyl") or 1,2-dimethyl-3-(3-methylbenzyl)imidazolium hydroxide (denoted "metamethylbenzyl") as the OSDAs, those are identical to those that yield CIT-13 in fluoride media. The synthesis protocols for the two OSDAs are provided elsewhere. The gel compositional ratio was $x/(x+1)$ $SiO_2$:$1/(x+1)$ $GeO_2$:0.5 ROH:y $H_2O$, where x is the gel Si/Ge ratio and y is the gel $H_2O/(Si+Ge)$ ratio. The preferred values for x and y are provided below. Detailed procedures and gel compositions are provided below. CIT-13/OH samples are denoted CIT-13/OH[z], where z is the Si/Ge ratio of CIT-13 crystals measured using the energy dispersive spectroscopy (EDS).

CIT-13 from conventional fluoride-containing gels (denoted CIT-13/F) were also prepared for comparative analyses to CIT-13/OH, and was based on the method reported previously. Similar to the case of CIT-13/OH samples, CIT-13/F samples were denoted CIT-13/F[z] where z is the crystal Si/Ge ratio measured using EDS.

IM-12 samples were also prepared to make comparisons with CIT-13, based on the protocols previously reported in the literature. Similar to CIT-13, IM-12 samples were also denoted IM-12[z] (z=EDS Si/Ge ratio).

Example 1.2. Detailed Synthesis of CIT-13/OH

Dry weights of the liner and stirring bar must be characterized since the desired water level should be adjusted on the basis of the total weight (liner+stirring bar+gel) at the last step of the gel preparation.

Germanium dioxide (99.999%, Strem) was fully dissolved in OSDA solution in a 23-mL PTFE liner for Parr steel autoclave. 1,2-dimethyl-3-(2-methylbenzyl)imidazolium hydroxide and 1,2-dimethyl-3-(3-methylbenzyl)imidazolium hydroxide were used as the OSDAs for CIT-13/OH. The methods used to prepare these OSDAs are known. A desired amount of TEOS was added to the solution, and the mixture was stirred overnight until the TEOS phase was fully hydrolyzed. Excess water and ethanol were evaporated under an air flow at room temperature until the gel became thick and viscous. Ethanol, which is a hydrolysis product of TEOS, seems to have negative effects on both rate of crystallization and purity of products. To maximize the extent of ethanol removal, additional purified water (ca. 10 mL) was added to the viscous gel and evaporated again while stirring until the gel became viscous. This water addition-evaporation step was repeated 5 times in total. (Note: In case fumed silica was used as the Si-source, this ethanol removal step was not necessary.) Lastly, the desired water content was adjusted on the basis of the total weight (liner+stirring bar+gel) as mentioned above. The final gel composition was $x/(x+1)$ $SiO_2$:$1/(x+1)$ $GeO_2$: 0.5 ROH:y $H_2O$, where x is the gel Si/Ge ratio and y is the gel H2O/(Si+Ge) ratio. The values of x and y can be found in Table 4. The optimized ranges for x and y are given in the main text. CIT-13 seed crystal (5 wt. % with respect to the total $SiO_2+GeO_2$ weight) was added if necessary. The gel was tightly sealed in a steel autoclave and placed in an oven that had been pre-heated to the desired temperature, After one week of crystallization, the gel was taken out. Normally, the gel turned dark brown and became solidified after the initial one week of crystallization. Using a clean and stiff PTFE rod, the solidified gel was thoroughly crushed into a powdery form. The ground gel was placed in the oven again and the crystallization was resumed. Aliquots were taken weekly to monitor the extent of crystallization. The final product was repeatedly washed using distilled water and acetone, and dried in a convection oven at 100° C.

The gel compositions, crystallization conditions, and corresponding results are summarized in Table 4.

TABLE 4

Summary of fluoride-free CIT-13/OH synthesis conditions and results

| Batch # | x* | y* | Temp./ ° C. | Oven Type† | CIT-13 seed | Time/ week(s) | Results | EDS Si/Ge Ratio | In-text Name |
|---|---|---|---|---|---|---|---|---|---|
| A | 3.0 | 7.0 | 175 | Rotating | X | 2 | CIT-13 | 3.88 ± 026 | CIT-13/OH[3.88] |
| B | 3.0 | 10.0 | 175 | Rotating | X | 3 | Impure CIT-13 | — | |
| C | 4.0 | 7.0 | 175 | Rotating | X | 3 | Unknown | — | |
| D | 3.0 | 5.0 | 175 | Rotating | X | 2 | Dense phase | — | |
| 1 | 2.0 | 7.0 | 175 | Rotating | X | 2 | Impure CIT-13 | — | — |
| 2 | 2.0 | 10.0 | 175 | Rotating | X | 2 | amorphous | — | — |
| 3 | 2.0 | 5.0 | 175 | Rotating | X | 2 | Dense Phase | — | — |
| 4 | 2.0 | 7.0 | 175 | Rotating | O | 2 | Impure CIT-13 | — | — |
| 5 | 2.0 | 7.0 | 175 | Rotating/Static | O | 2 | CIT-13 | N/A | — |
| 6 | 2.0 | 7.0 | 175 | Static | O | 2 | Impure CIT-13 | — | — |
| 7 | 2.5 | 6.5 | 160 | Rotating | X | 5 | CIT-13 | 3.64 ± 0.18 | — |
| 8 | 2.5 | 6.0 | 160 | Rotating | X | 5 | CIT-13 | 3.89 ± 0.21 | — |
| 9 | 3.0 | 7.0 | 175 | Rotating | O | 2 | Impure CIT-13 | — | — |
| 10 | 3.0 | 7.0 | 175 | Rotating/Static | O | 2 | Impure CIT-13 | — | — |
| 11 | 3.0 | 7.0 | 175 | Static | O | 2 | amorphous | — | — |

TABLE 4-continued

Summary of fluoride-free CIT-13/OH synthesis conditions and results

| Batch # | x* | y* | Temp./ °C. | Oven Type† | CIT-13 seed | Time/ week(s) | Results | EDS Si/Ge Ratio | In-text Name |
|---|---|---|---|---|---|---|---|---|---|
| 12 | 3.0 | 6.0 | 160 | Rotating | X | 6 | CIT-13 | 3.71 ± 0.17 | CIT-13/OH[3.71] |
| 13 | 3.0 | 6.5 | 160 | Rotating | X | 6 | CIT-13 | 3.56 ± 0.18 | CIT-13/OH[3.56] |
| 14 | 3.0 | 7.5 | 160 | Rotating | X | 6 | Impure CIT-13 | — | — |
| 15‡ | 3.0 | 7.0 | 160 | Rotating | X | 3 | CIT-13 | 4.33 ± 0.11 | CIT-13/OH[4.33] |
| 16 | 3.0 | 6.5 | 160 | Rotating | X | 5 | CIT-13 | 4.12 ± 0.24 | — |
| 17 | 3.0 | 6.0 | 160 | Rotating | X | 5 | CIT-13 | 3.93 ± 0.21 | — |
| 18 | 4.0 | 7.0 | 175 | Rotating | X | 2 | CIT-13 | 5.13 ± 0.28 | — |

Example 1.2. Germanosilicate Transformation and Post-Synthetic Modification of CIT-13/OH to CIT-14/IST The *CTH-to-CFI transformations were performed by exposing freshly calcined CIT-13/OH samples to ambient air possessing moisture. Only one condition (30% relative humidity (pH$_2$O=7.1 Torr) at 25° C.) was used here to ensure consistency with the results from the previous work. The extent of transformation was monitored based on PXRD. CIT-14/ESP (ESP stands for ethoxysilylational pillaring) and CIT-14/IST (IST denotes inverse sigma transformation) were prepared on the basis of the weak acid ADOR-type transformation of CIT-13/F and the inverse sigma transformation of CIT-13/OH, respectively. The inverse sigma transformation of CIT-13/OH was conducted by treating freshly calcined CIT-13/OH with 12 M HCl at 95° C. for 48 h. The resultant solid ("-CIT-14") was recovered using a centrifuge and repeatedly washed with distilled water until the pH became neutral. The final material, CIT-14/IST where IST stands for inverse sigma transformation, was obtained by heating "-CIT-14" to 580° C. for 6 hours with a temperature ramping rate of 1° C. min$^{-1}$. For comparison, the UTL-to-OKO inverse sigma transformations were also carried out using the prepared IM-12 samples. The SEM images of CIT-14/IST samples are shown in FIGS. 4(A-B).

For $^{19}$F magic-angle spinning (MAS) and $^1$H-$^{29}$Si cross-polarization (CP) MAS NMR studies, degermanation and fluorination of germanosilicates were conducted. Cold water degermanation of calcined germanosilicate was performed as follows: 100 mg of freshly calcined germanosilicate was soaked in 100 mL of distilled water at room temperature and stirred overnight. The resultant solid was recovered using a centrifuge and repeatedly washed with distilled water. The degermanated samples were dried at room temperature in a vacuum. Postsynthetic fluorination of germanosilicates that were crystallized in fluoride-free media was carried out as follows: 100 mg of as-prepared CIT-13/OH was finely ground with 20-25 mg of ammonium fluoride and heated at 150° C. for 24 hours. Excess ammonium fluoride was removed by washing with cold distilled water, and the recovered solid was dried at 100° C.

Example 1.3. Characterization

Powder X-ray diffraction (PXRD) profiles were collected using a Rigaku Miniflex II diffractometer (Cu Kα radiation λ=1.5418 Å). High-resolution PXRD data were collected on the 2-1 Powder Diffraction beamline at the Stanford Synchrotron Radiation Lightsource (SSRL) using a wavelength of 0.9998 Å. For high-resolution PXRD experiment, calcined CIT-14 powder sample was packed into a 1.0 mm glass capillary and sealed.

Scanning electron microscopy (SEM) images and elemental analysis data were collected with a ZEISS 1550VP field emission (FE)-SEM microscope with an Oxford X-max SDD EDS system. Ar-adsorption isotherms were acquired using a Quantachrome Autosorb iQ analyzer at 87.45 K. Solid-state magic-angle spinning (MAS) nuclear magnetic resonance (NMR) spectra were obtained on a Bruker Avance 500 MHz spectrometer (magnetic field=11.2 T). Molecular sieve samples were charged into a 4-mm diameter zirconia rotor with a Kel-FR cap. $^1$H-$^{13}$C cross-polarization (CP) MAS spectra, $^{29}$Si MAS spectra, and $^1$H-$^{29}$Si CPMAS spectra were collected at a MAS spinning rate of 8 kHz, and $^{19}$F MAS spectra were collected at 12 kHz.

Example 2. Results and Discussions

Example 2.1 Discussion of Synthesis

Figure 6:
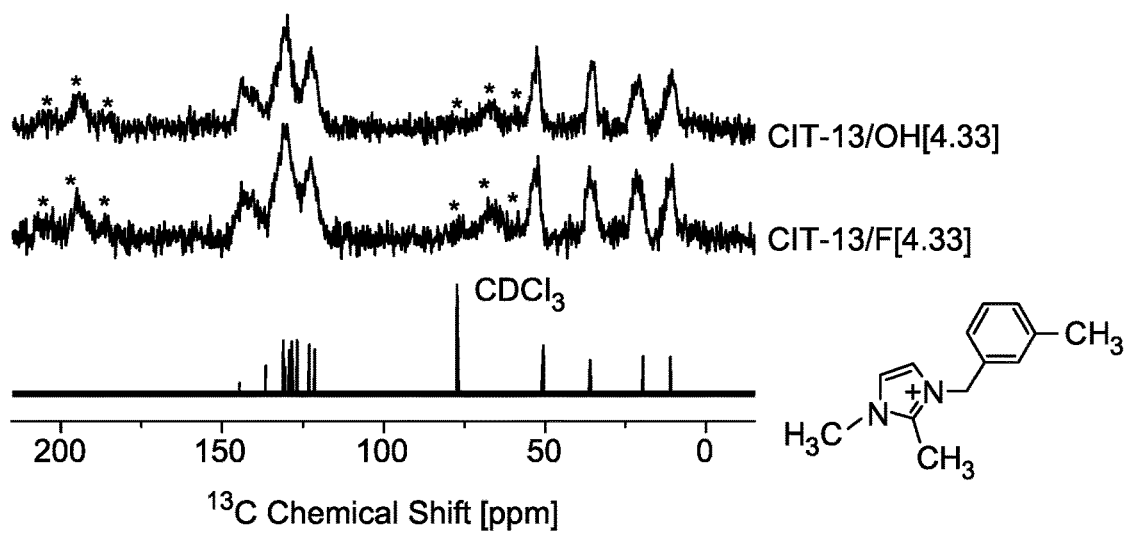
FIG. 6 shows $^1$H-$^{13}$C 8 kHz CPMAS spectra of as-made versions of CIT-13/OH[4.33], CIT-13/F[4.33], and $^{13}$C solution spectrum of 1,2-dimethyl-3-(3-methylbenzyl)imidazolium chloride in chloroform-d.
Figure 7:
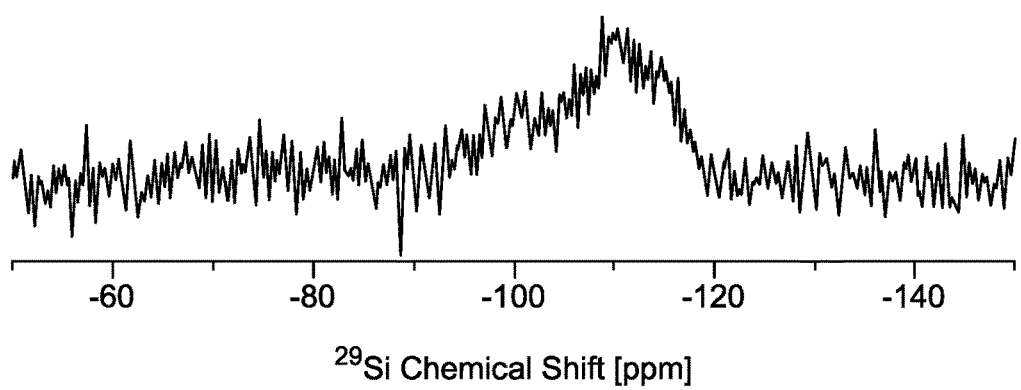
FIG. 7 shows $^1$H-$^{29}$Si 8 kHz CPMAS spectra of as-made versions of CIT-13/OH[4.33].

CIT-13 can be crystallized in hydroxide media by omitting fluoride and further modifying other gel compositions from those of the fluoride-route for CIT-13. Unlike the CIT-13/F that could be crystallized in a moderately high range of gel compositions, CIT-13/OH is obtained in a much narrower gel compositional range. The ranges of gel Si/Ge ratios and gel H$_2$O/(Si+Ge) ratios were 2<Si/Ge<4 and 6<H$_2$O/(Si+Ge)<7, preferably 2.5<Si/Ge<3.0 and 6.0<H$_2$O/(Si+Ge)<6.5, respectively, when OSDA/(Si+Ge) =0.5. Gel compositions outside this compositional range yielded amorphous germanosilicates or unknown dense phases. Crystallizations of pure CIT-13 phases were observed at 160° C. and 175° C. The synthetic details (e.g., gel compositions, etc.) are provided in Table 4. CIT-13/OH had a plate-like crystal morphology, as shown in FIG. 5(A-C), similar to CIT-13 obtained from fluoride-containing preparations and their isostructural germanosilicates. The $^1$H-$^{13}$C CPMAS spectra of as-made CIT-13/OH[4.33], and solution phase $^{13}$C NMR of the OSDA (FIG. 6) confirmed that the structure of the OSDA was preserved during the crystallization of CIT-13/OH. The $^1$H-$^{29}$Si CPMAS spectrum of the same as-made material also revealed the presence of connectivity defects that compensate for the absence of fluoride. (FIG. 7)

Figure 8A:
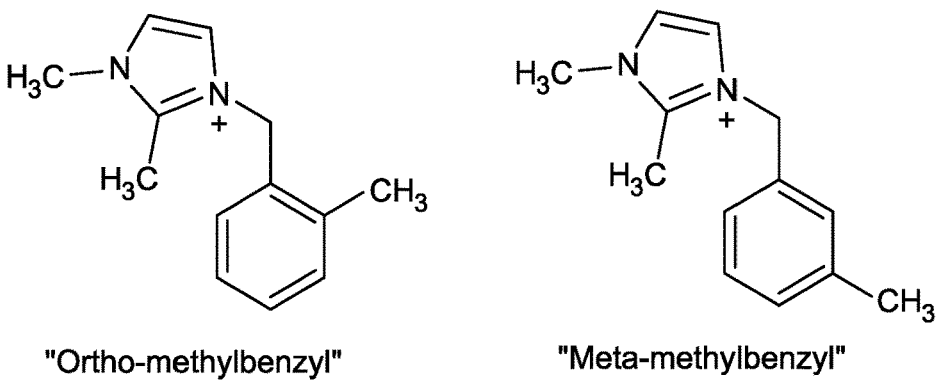
FIG. 8(A): Two OSDAs that can crystallize CIT-13 without fluoride mineralizer.

PXRD profiles of as-prepared and calcined CIT-13/OH [3.88] and CIT-13/OH[4.33] are displayed in FIG. 8(B-E). Other PXRD patterns are provided in FIG. 9. All PXRD profiles were obtained under ambient conditions. The positions of diffraction peaks matched well with those of a reference CIT-13/F shown in FIG. 8(F). However, there were differences between CIT-13/F and CIT-13/OH noted in peak intensities. Except for CIT-13/OH[3.88] that was the only CIT-13/OH crystallized using ortho-methylbenzyl OSDA (FIG. 8(A) and FIG. 9(B)), all the other as-prepared CIT-13/OH synthesized from meta-methylbenzyl OSDA display very weak (200) peaks at 2θ=6.44°, as shown in FIG. 8(D) and FIGS. 9(C-K). These weak (200) peaks from as-made CIT-13/OH became strong after removal of OSDA by calcination. (FIG. 8(E)) Furthermore, some of CIT-13/OH samples show clearly discernible (310) peaks at 2θ=11.58°, as illustrated in FIGS. 9(D-G) and 9(I-J). These (310) diffractions are attenuated by post-synthetic insertion of fluoride using ammonium fluoride. The fluorination of CIT-13/OH also increased the intensity of the (200) peaks. (FIG. 10) Thus, the absence of fluoride and the presence of meta-methylbenzyl OSDA cations within the CIT-13 framework appeared to be responsible for the weak intensity of the (200) peaks and the occasional advent of the (310) peaks.

Figure 8G:
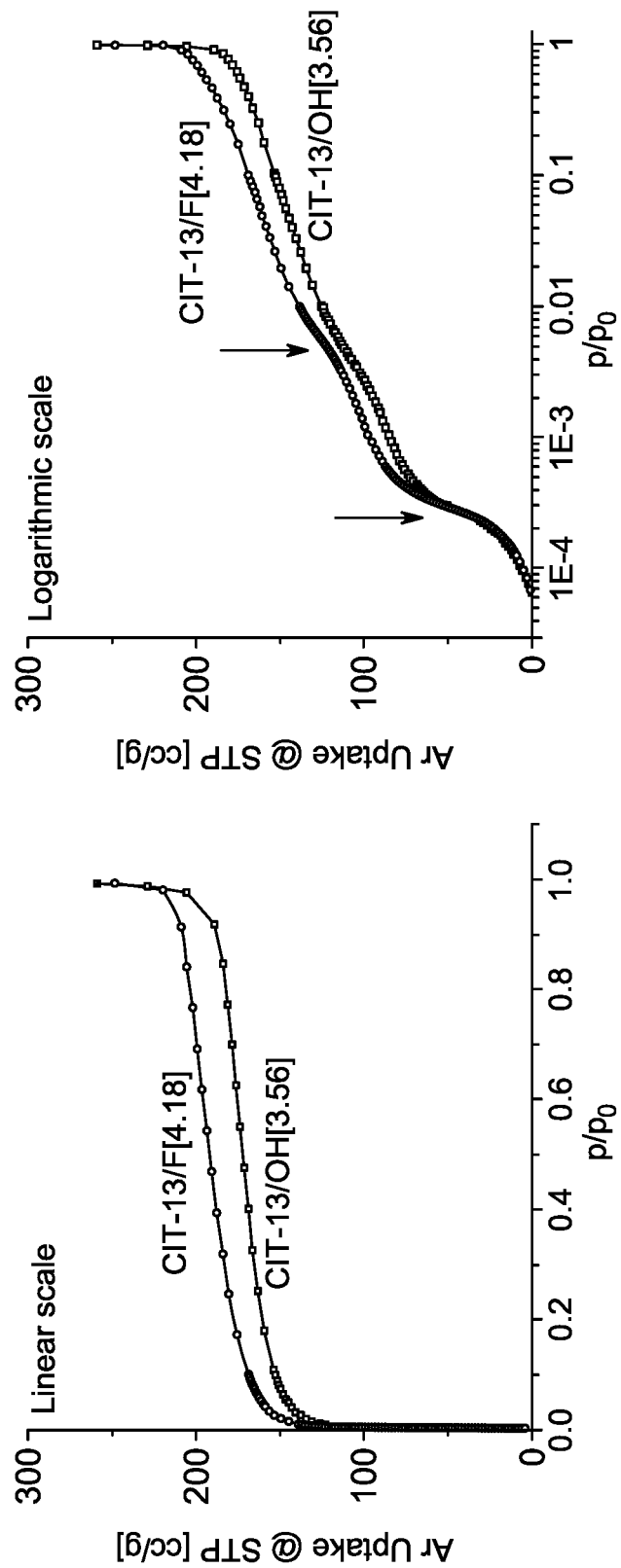
FIG. 8(G): Ar-adsorption isotherms of CIT-13/OH[3.56] and CIT-13/F [4.18] in log scale.
Figure 9:
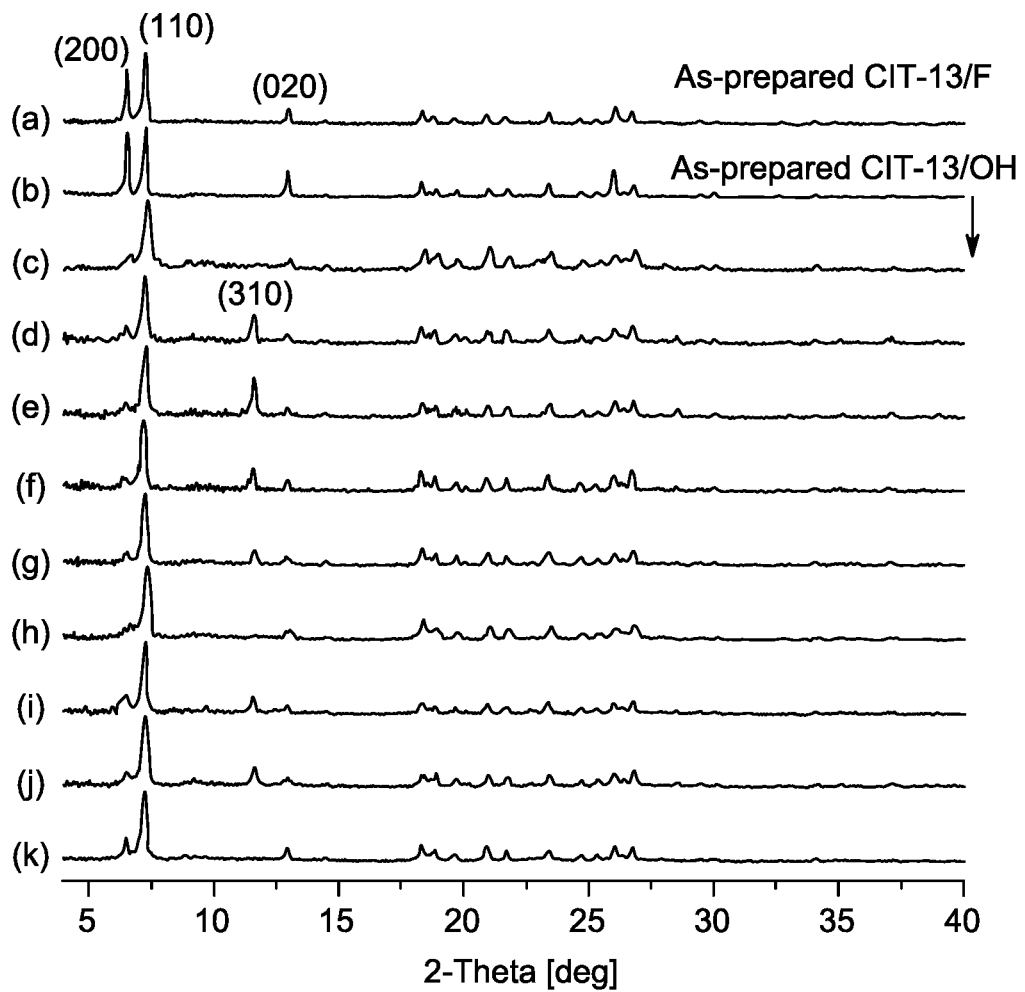
FIGS. 9(A-K) shows PXRD patterns of as-prepared CIT-13/OH samples compared to that of the reference CIT-13/F having Si/Ge=ca. 5.

The argon physisorption isotherms of CIT-13/OH[3.56] obtained at 87.45 K are shown in FIG. 8(G), overlapped with those from CIT-13/F[4.18] for comparison. The micropore volume of CIT-13/OH[3.56] was 0.141 cc/g based on the t-plot method (0.202 cc/g from the Saito-Foley method). This microporosity was slightly lower than that of the reference CIT-13/F[4.18] (de Boer t-plot: 0.172 cc/g; Saito-Foley: 0.223 cc/g). The characteristic two-step adsorption (marked with ↓ in FIG. 8(G)) due to the presence of the 10MR and 14MR of CIT-13 was also observed with CIT-13/OH as expected.

Example 2.2. Discussion of *CTH-to-CFI Transformation

Figures 11A, 11B:
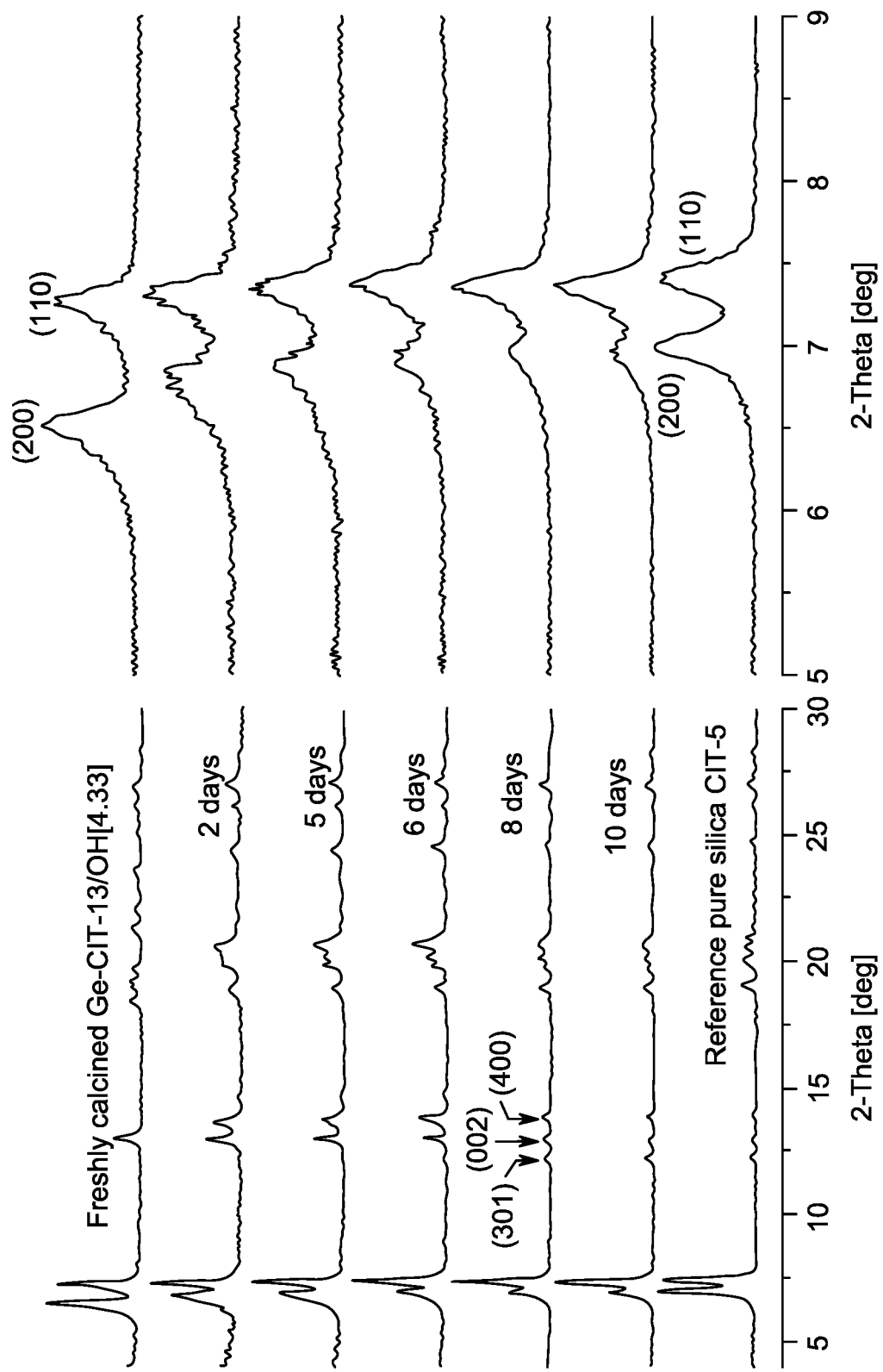

CIT-13-type germanosilicates slowly transformed into CFI-type germanosilicates upon exposure to ambient moisture (*CTH-to-CFI transformation), unlike other d4r-type germanosilicate, such as UTL, IWW, and ITH, that are known not to undergo the analogous transformations. This transformation occurred by the re-arrangement of Ge-rich d4r units into dze units, owing to the instability of the CIT-13 framework induced by the presence of germanium-rich d4r units and the crystallographic nature of the cfi-layers. Interestingly, CIT-13/OH transformed into the corresponding germanosilicate CIT-5 much faster than CIT-13/F having similar germanium contents. CIT-13/OH[4.33] completed the transformation to CFI within 12 days, while CIT-13/F[4.31] took 85 days to completely transformed into a CFI-type germanosilicate. PXRD profiles of calcined CIT-13/OH[4.33] after certain times of exposure to ambient moisture (pH2O=7.1 torr, 30% relative humidity at 25° C.) are shown in FIGS. 11(A) and 11(B). The (400) peak of CIT-13, that was initially overlapping with the (002) diffraction at 2θ=13.07°, was shifted to 2θ=13.69° and separately visible after 2 days. After 8 days, the three characteristic diffractions of the CFI framework—(301), (002), and (400) —began to appear. The PXRD profile after 10 days of ambient exposure matched well that of the reference pure-silica CIT-5. The time-dependent positions of cfi-cfi interlayer distance estimated from the position of (200) diffraction are displayed for CIT-13/OH[4.33] and CIT-13/F[4.31] in FIG. 11(E), and show the faster transformation of CIT-13/OH compared to that of CIT-13/F.

Figures 11C, 11D:
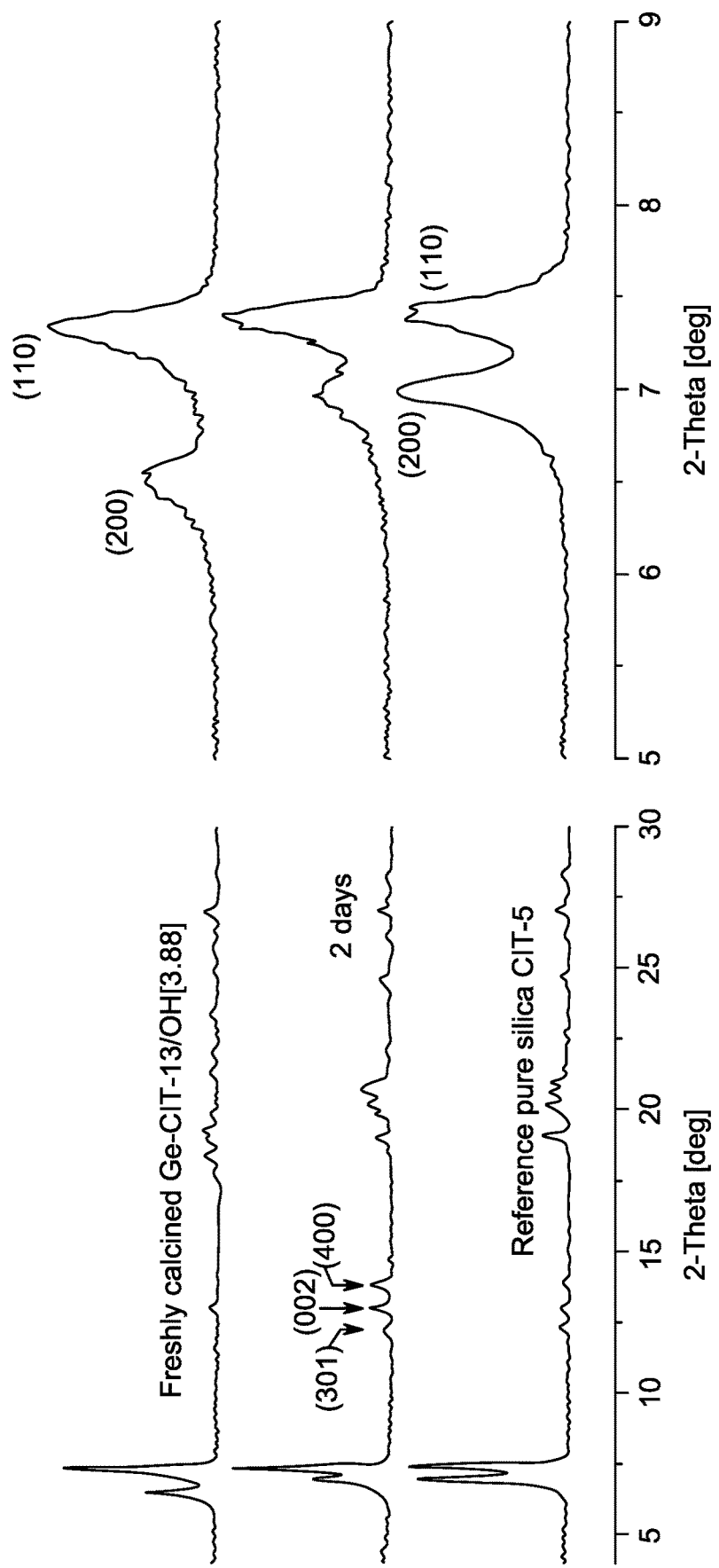
Figure 11E:
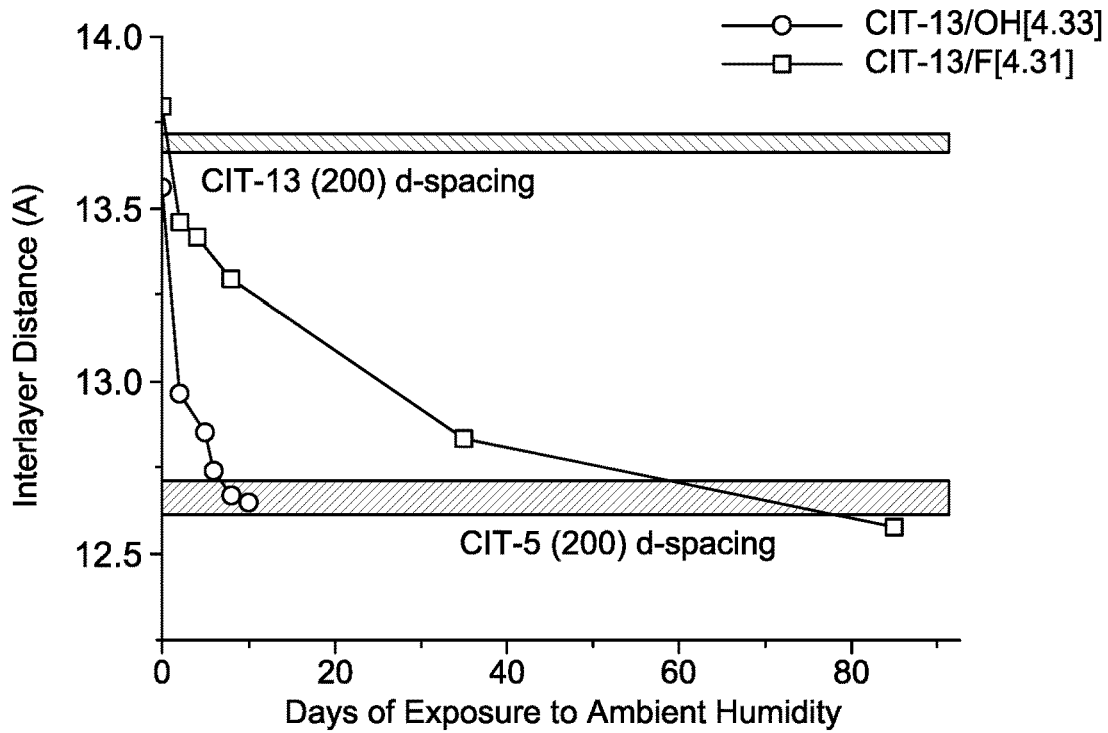

In the case of CIT-13/F, decreasing Si/Ge ratios from 4.31 to 3.87 shortened the time required to accomplish the complete transformation from ca. 4 months to 12 days. This acceleration in transformation speed can be attributed to the increase in germanium sites within d4r units that are the structural building units transforming into the dzc units of the CFI framework. Similar to the case of CIT-13/F, decreasing the Si/Ge ratio of CIT-13/OH further accelerated the *CTH-to-CFI transformation. CIT-13/OH[3.88] transformed to the corresponding CIT-5 type germanosilicate within 2 days, as shown in FIGS. 11(C) and 11(D). This was at least 6 times faster than the same transformation with CIT-13/F[3.87]. The $^{29}$Si NMR spectra of calcined CIT-13/OH[3.88] and the resultant Ge-CIT-S were acquired to study environments of Si-sites within those germanosilicates (FIG. 12). Similar to the case of CIT-13/F, CIT-13/OH showed three groups of signals at −104.2, −109.4, and −113.9 ppm. This spectrum shape was consistent with previously reported CIT-13 (see FIG. 3 above), and related materials synthesized in fluoride media. Unlike the Ge-CIT-5 derived from CIT-13/F that showed a single broad ensemble of signals at −110.61 ppm, Ge-CIT-5 from CIT-13/OH[3.88] displayed two separate groups of peaks at ca. −109.0 and −112.2 ppm. The disappearance of the shoulder at −104.2 ppm in the spectrum of CIT-13 can be attributed to the reassembly of d4r units into dzc bridging units, that was also observed in the transformation of CIT-13/F. Thus, both signals can be assigned to the cfi-layer Si sites, as they share the same origins as the −113 and −115 ppm signals of pure-silica CIT-5.

On the basis of the fact that higher germanium contents in the parent CIT-13's resulted in faster *CTH-to-CFI transformations, it may be speculated that CIT-13/OH crystals have more germanium within its d4r units than with CIT-13/F crystals having similar overall Si/Ge ratios. In CIT-13/F, it was confirmed that the cfi-layers also have non-zero germanium occupancies. It is known that the formation of d4r units was promoted by the presence of fluoride anions and/or high germanium contents that can stabilize low framework T-O-T angles. The formation of d4r-type CIT-13 framework in the absence of fluoride may result in an increased incorporation of germanium within the d4r units. Indeed, CIT-13/OH samples having low Si/Ge ratios underwent the inverse sigma transformation in concentrated acid, yielding "-CIT-14" that is an analog of COK-14 from IM-12. The ability to undergo this type of transformation strongly suggests that there is high contents of clustered germanium sites within the d4r units but also the presence of pure Ge-4-rings.

Example 2.3. Discussion of Topotactic Transformations from CIT-13 to "-CIT-14" and CIT-14/IST The leaching of Ge-4-ring from *CTH-type germanosilicate by strong acid has yet been reported, despite the structural similarity between CIT-13 and IM-12. Unlike IM-12, the Si—O—Si interlayer bridging bonds of the *CTH-type germanosilicates have been suggested as the main obstacle for such transformations. The ADOR-type transformation of SAZ-1 to IPC-16 and the Pawley refinement of the latter have appeared. Very recently, the partial removal of T-sites within d4r units of CIT-13/F based on weak-base treatment yielding ECNU-23 was reported. Nevertheless, the presence of pure Ge-4-ring within d4r units is essential for the true inverse sigma transformation by strong acid, and IM-12 has been the only d4r-type germanosilicate that has such structural and elemental prerequisite.

Figure 13A:
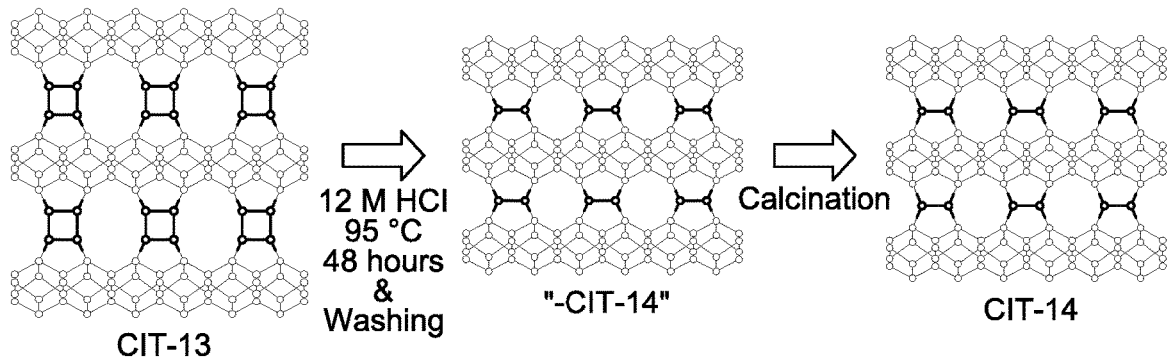
FIGS. 13(A-B) shows inverse sigma transformation of CIT-13 to CIT-14. Schematic illustration of the inverse sigma transformation of CIT-13/OH yielding CIT-14/IST (FIG. 13(A)); PXRD profiles of the parent CIT-13/OH and the corresponding CIT-14/IST samples (FIG. 13(B)).
Figure 13B:
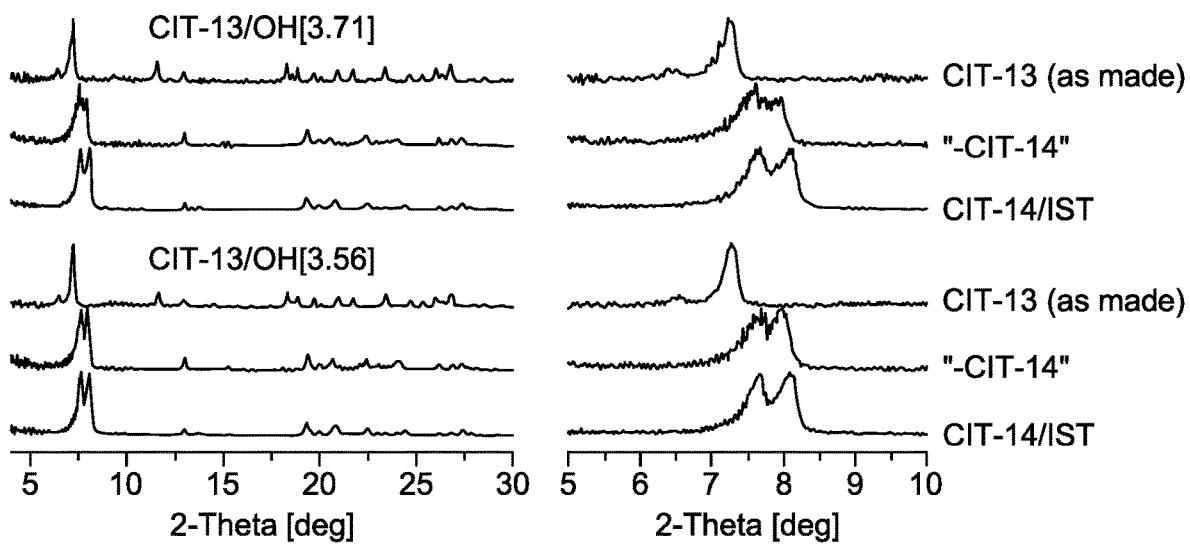
Figures 14A, 14B:
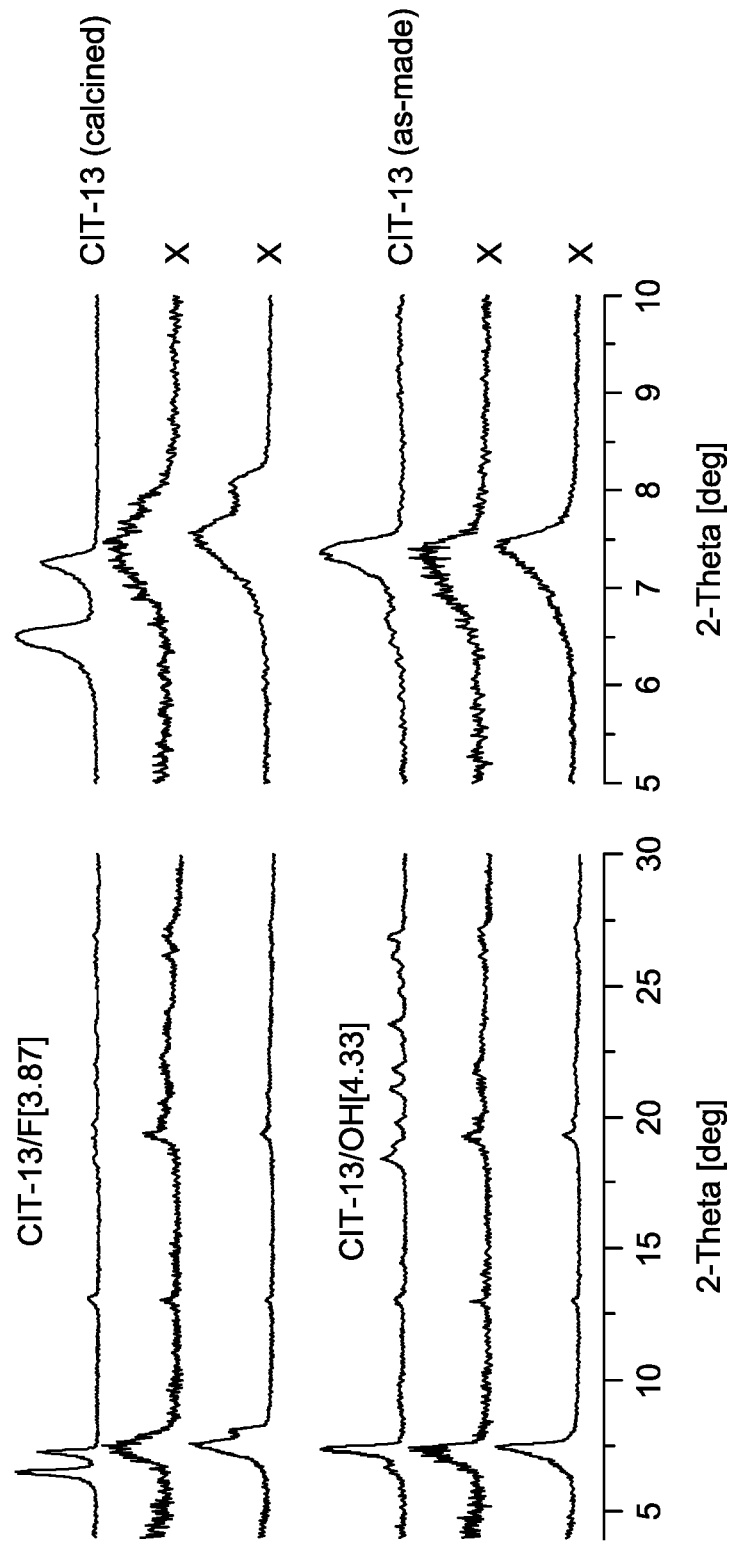
FIGS. 14(A-B) shows PXRD profiles of the parent CIT-13 samples (black), materials right after 12 M HCl treatment (fuchsia), and calcined samples (blue): CIT-13/F[3.87] (FIG. 14(A)) and CIT-13/OH[4.33] (FIG. 14(B)).

Ge-rich CIT-13 crystallized in hydroxide media can undergo a structural transformation that can be explained by the simultaneous dislodging of Ge-4-ring from d4r, the inverse sigma transformation, as schematically illustrated in FIG. 13(A). Two examples (CIT-13/OH[3.71] and CIT-13/OH[3.56]) were demonstrated here on the basis of PXRD profiles that are shown in FIG. 13(B). Following the nomenclature used by Verheyen (*Nat. Mater.* 2012, 11, 1059), the freshly acid-treated materials before calcination are denoted "-CIT-14". Although the Rietveld refinement was not carried out for "-CIT-14," similarly to the condensation of -COK-14 into COK-14, a small reduction in the unit cell parameter along the interlayer direction (i.e., a-direction) was observed after calcination of "-CIT-14". The presence/absence of fluoride and the germanium content were the two most critical synthetic factors for the preparation of CIT-13 germanosilicates that can yield CIT-14 via the inverse sigma transformation. Treating calcined CIT-13/F[3.87] with 12 M HCl did not yielded "-CIT-14" despite its high germanium content. Also, the same treatment on CIT-13/OH[4.33] resulted in a disordered layered material. (FIGS. 14(A-B))

Figure 16A:
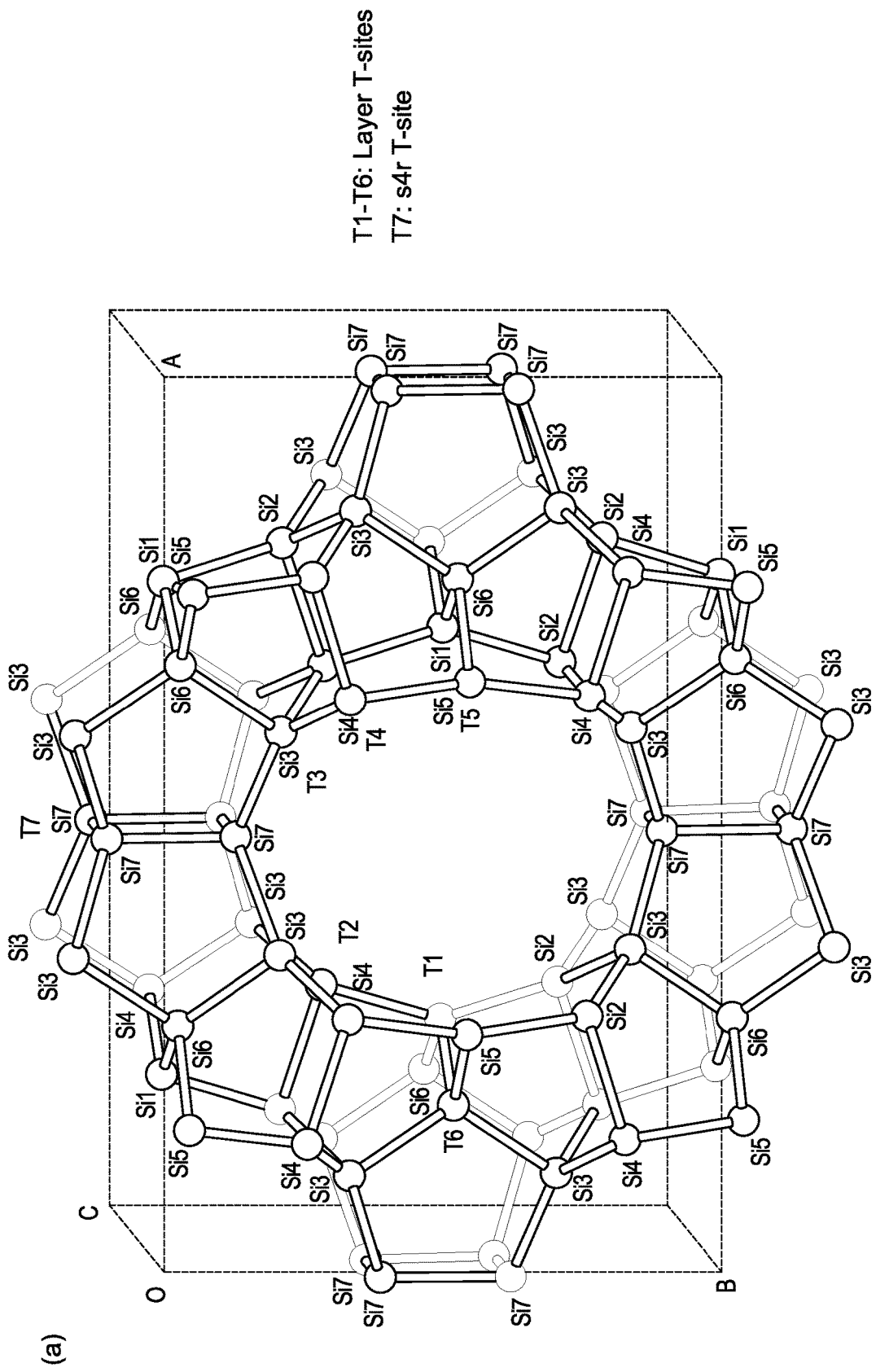
FIG. 16 shows the effects of elemental composition on intensities of PXRD peaks of CIT-14. (a) Seven T-sites of CIT-14 and simulated PXRD profiles of CIT-14 frameworks having 0% (black), 10% (cyan), and 20% (red) of germanium at (b) T1, (c) T2, (d) T3, (e) T4, (f) T5, (g) T6, and (h) T7-sites. Peak-1, Peak-2, and Peak-3 denotes the (110), (200), and (001) diffractions, respectively.

For comparison, an isostructural material was obtained on the basis of the conventional ADOR transformation of CIT-13 that is here denoted CIT-14/ESP. This transformation was analogous to the transformation from SAZ-1 to IPC-16. The PXRD profiles of CIT-14/IST prepared by treating calcined CIT-13/OH[3.56] with 12 M HCl and CIT-14/ESP from the ADOR-type transformation of CIT-13/F[4.33] are displayed in FIGS. 15(A) and 15(B), with that of the reference CIT-14 model based on the GULP structural optimization algorithm. Clearly, the intensity of the (200) interlayer diffraction of CIT-14/IST was stronger than that of CIT-14/ESP. This difference in the diffraction intensity may originate from the elemental composition of the single-4-ring (s4r) bridging units of CIT-14. The influence of germanium occupancy at each of seven T-sites of CIT-14 on intensities of the (110) and (200) diffractions were calculated, and the results are provided in FIG. 16. It was found that germanium occupation of two T-sites (T3 and T7) significantly increase the relative intensity of the (110) diffraction in the PXRD. T7 is the s4r site, and T3 is the site directly neighboring the d4r site. Indeed, the germanium content of 17 was 21% in the Rietveld refinement of CIT-14/IST, which occupies 52% of the total germanium population of the entire framework. (Table 5, vide supra). No significant germanium occupancy was detected for T3. Given that the inverse sigma transformation is dislodging pure Ge-4-rings from d4r units of parent germanosilicates, it may be concluded that the d4r units of CIT-13/OH have more than 4 germanium atoms on average. However, no significant difference was found between the $^1$H-decoupled $^{29}$Si MAS spectra of CIT-14/IST and CIT-14/ESP. (FIG. 15(D). Both CIT-14's show broad envelops of signals centered at ca. −112 ppm. This similarity in spectra was presumably due to the presence of remaining germanium sites within the CIT-14 frameworks. Also, a negligible amount of Q3-type silanol was detected.

As mentioned above, CIT-14/IST had higher germanium content than CIT-14/ESP. The EDS Si/Ge ratios of the two CIT-14/IST samples obtained from CIT-13/OH[3.56] and CIT-13/OH[3.71] were found to be 14.5 and 17.5, respectively. These values are lower than those of CIT-14/ESP samples (Si/Ge=50-253, depending on the extent of degermanation, see FIG. 17) whose preparation procedures involve degermanative delamination using weak acid (0.1 M HCl). The Si/Ge ratios of COK-14 samples prepared here using the same procedure on two IM-12 samples (Si/Ge=3.80 and 4.79) were 17.5 and 29.2 and were much lower than the value (Si/Ge=110) reported by Verheyen et al., presumably due to the lower Si/Ge ratio of the parent IM-12.18 (see FIGS. 18 and 19) These values were also much lower than IPC-2 (reported Si/Ge=97) prepared as the ADOR product from IM-12, which underwent weak-acid delamination just like CIT-14/ESP. These results support that the inverse sigma transformation by strong acid leaves extra germanium sites (other than dislodging Ge-4-ring) within d4r units without being leached.

The microporosity of CIT-14 was investigated using argon adsorption isotherms acquired at 87.45 K. (FIG. 20) While CIT-14/IST showed no adsorption-desorption hysteresis, CIT-14/ESP gave a desorption curve that discernibly deviated from its adsorption curve. A similar hysteresis was observed from IPC-2 formed by the ADOR-type pillaring procedure. This minor mesoporosity is commonly observed after post-synthetic treatments in nitric acid media. Also, the specific micropore volume of CIT-14/IST (0.105 cc/g from t-plot; 0.141 cc/g from Saito-Foley) was higher than that of CIT-14/ESP (0.065 cc/g from t-plot; 102 cc/g from Saito-Foley). A similar tendency has also been observed in the UTL-to-OKO transformations. Also, as clearly seen in FIG. 20(B), CIT-14/IST started to adsorb argon at $p/p_0$=ca. $1\times10^{-4}$ lower than CIT-13 ($p/p_0$~$3\times10^{-4}$). This adsorption onset pressure is very similar to 8MR ring zeolite A (LTA) ($p/p_0$~$1\times10^{-4}$). Thus, the argon uptake of CIT-14 was initiated by the adsorption on its 8MR pores.

The reduction in micropore volume accompanied by the inverse sigma transformation of CIT-13 to "-CIT-14" was investigated both theoretically and experimentally. For the theoretical evaluation, the TOTOPOL utility for topological analysis developed by Treacy and Foster was used to estimate the pore volume reduction. The crystallographic information (cif) files obtained from the Rietveld refinements on CIT-13 and CIT-14/IST (this work, vide infra) were used as framework models for computations. The results were summarized in Table 6. The experimentally observed micropore volume reduction (Saito-Foley: 30.2%; t-plot: 25.5%) was similar to or lower than the value estimated using TOTOPOL (30.2%) although TOTOPOL seems to underestimate the micropore volumes of CIT-13 and CIT-14 when compared to the experimentally obtained values.

TABLE 6

Theoretical and empirical micropore volumes of CIT-13/OH and CIT-14/IST

| | Model | CIT-13/OH (cc/g) | CIT-14/IST (cc/g) | Volume Reduction (%) |
|---|---|---|---|---|
| Theoretical* | TOTOPOL | 0.126 | 0.088 | 30.2 |
| Experimental¶ | Saito-Foley | 0.202 | 0.141 | 30.2 |
| | t-plot | 0.141 | 0.105 | 25.5 |

*The EDS elemental compositions of CIT-13/OH [3.56] and its CIT-14/IST were used to calculate the theoretical unit cells.
¶Estimated directly from the argon physisorption isotherms shown in FIG. 20.

Since the positions of the bridging sites, i.e., layer sites directly connected to d4r or *s*4r units of CIT-13 or CIT-14, respectively, did not change during the inverse sigma transformation, CIT-14/IST must have directly inherited the disorder pattern from its parent CIT-13. Indeed, the (111) and (201) diffraction peaks, estimated to be located at 2θ=11.43° and 11.78° in the disorder-free model based on the GULP algorithm, respectively, were not observed in the actual PXRD pattern of CIT-14/IST. (FIG. 15(C)) These diffractions were not observed in the CIT-14/ESP either, that is consistent with the previously reported ADOR transformation from SAZ-1 to IPC-16. However, in the ADOR transformation, Ge-rich d4r's were completely removed by delamination in weak acid, and bridging s4r's were formed by newly introduced silicon source such as diethoxydimethylsilane. Thus, it is possible that the pattern of disorder in CIT-14/IST is not identical to those of CIT-14/ESP and IPC-16.

Figure 21A:
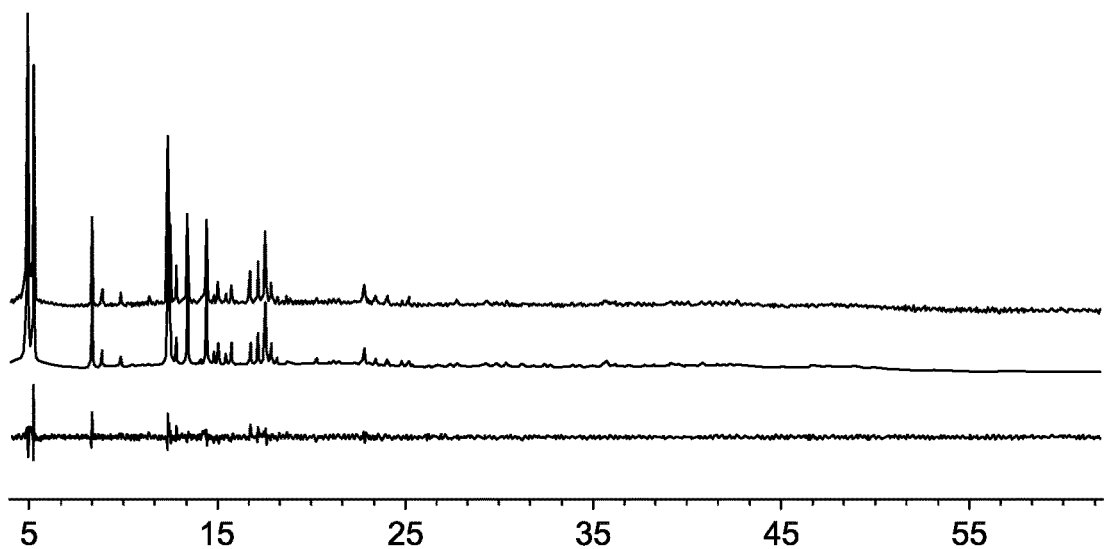
(FIG. 21(A)) Observed (top), calculated (middle), and difference (bottom) profiles for the Rietveld refinement of CIT-14.

The XPD pattern could be indexed with an orthorhombic unit cell (a=21.90 A, b=13.74 A, and c=10.11 A), using the program TREOR35 implemented in the software CMPR.36 The initial CIT-14 framework structure model was derived from the CIT-13 framework structure (assuming all silica)20 through inverse sigma transformation and no disorder from CIT-13 was introduced. The geometry was further optimized using the program DLS-7637 assuming the space group Cmmm, that is the same as that of the parent CIT-13 (*CTH). This then served as a starting point for Rietveld refinement using the program TOPAS. The final structure of CIT-14/IST was obtained based on the Rietveld refinement of the powder pattern with agreement values $R_F$=0.057, $R_{wp}$=0.078, and $R_{exp}$=0.053 (FIG. 21(A)).

Figure 21B:
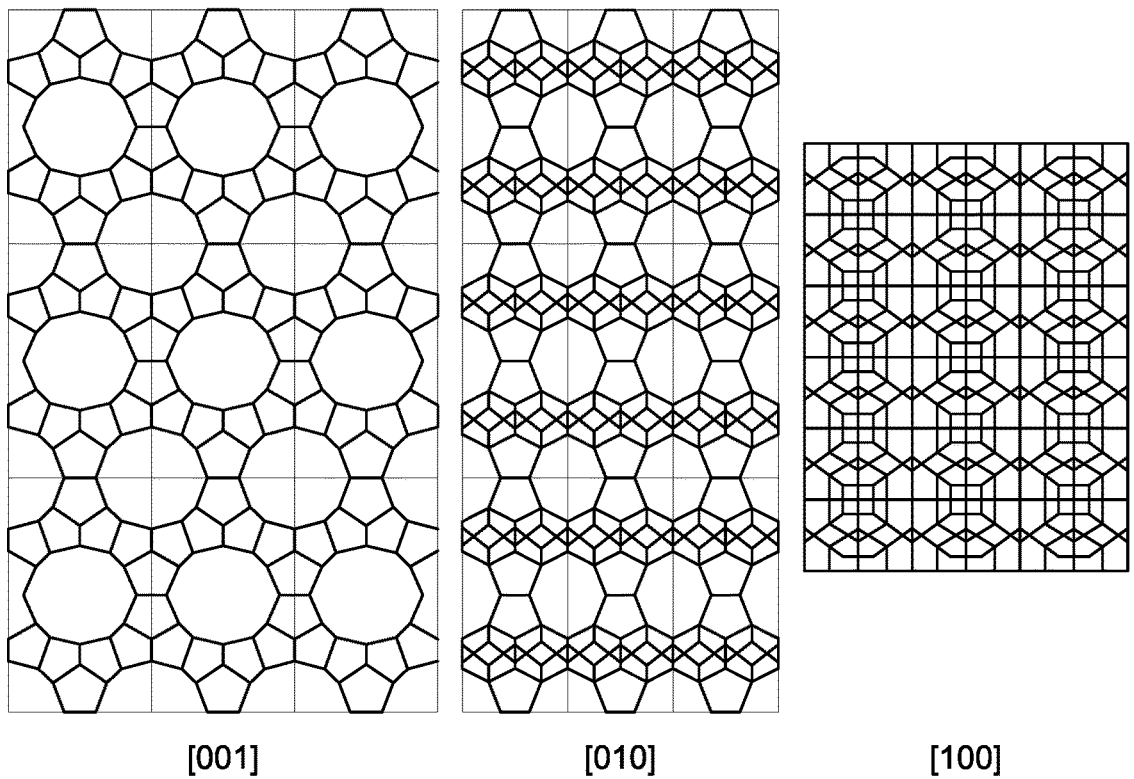
(FIG. 21(B)) Projection view (3×3×3 unit cells) along the main crystallographic axis [001], [010], and [100] of CIT-14.
Figure 21C:
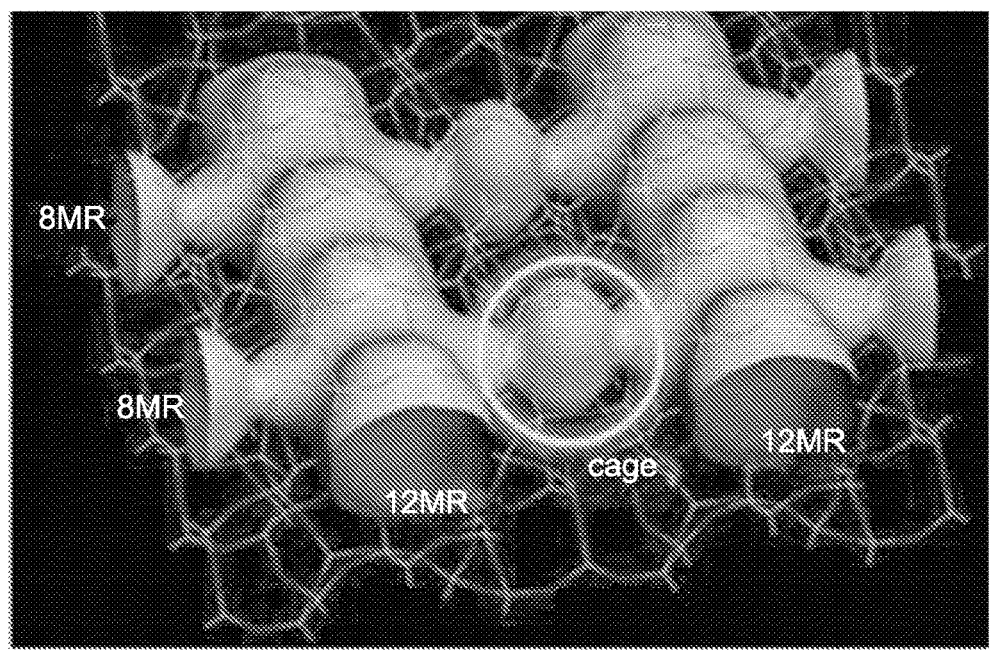
(FIG. 21(C)) The two-dimensional 12-/8-ring channel system in the idealized structure of CIT-14.
Figure 21D:
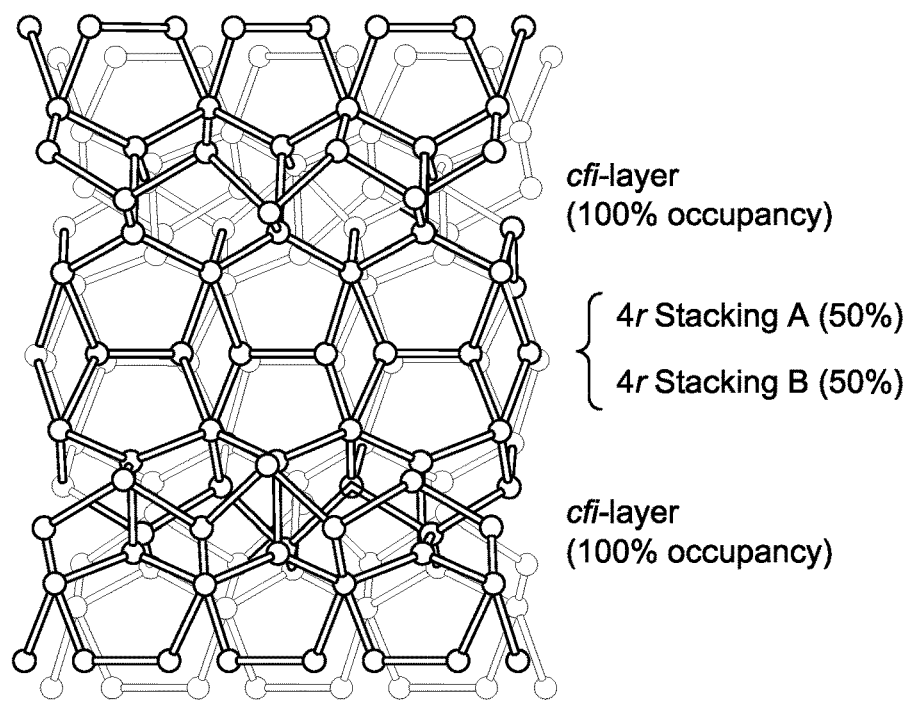
(FIG. 21(D)) Schematic illustration of the disorder in CIT-14.

Since all symmetry elements have been preserved, the inverse sigma transformation satisfies the IUPAC definition of a topotactic transformation. The idealized structure and pore system of CIT-14/IST are displayed in FIGS. 21(B) and 21(C), respectively. CIT-14/IST has a 2-dimensional channel system delimited with 12MR and 8MR pores having limiting dimensions 6.4×4.9 A and 3.9×3.3 A, respectively. Similar to ferrierite (FER), CIT-14/IST has small cages that are connected to two adjacent straight main channels via small-pore openings, while the other two known 2D 12/8MR topologies, EON and MOR, have no such cage structure. Due to the presence of disorder (illustrated in FIG. 21(D)), the 8-MR minor channel is not straight. The unit cell parameter c can be also defined as c'=c/2=5.0569 A as an average structure, however, using the smaller unit cell did not improve the refinement (i.e., the changes in atomic coordinates and profile fit are minimal, but the number of parameters to be refined is increased). Detailed crystallographic information of CIT-14/IST was provided in Tables 5 and 7, and FIG. 22.

TABLE 5

Crystallographic data: The structure solution of CIT-14/OH (*.cif file) from the Rietveld refinement o the synchrotron powder XRD.

```
data_Germanosilicate_CIT-14
_chemical_name_systematic
"CIT-14"
_chemical_formula_structural
"[Si52.77Ge3.23O112]"
_cell_length_a         21.9007(7)
_cell_length_b         13.7360(4)
_cell_length_c         10.1138(2)
_cell_angle_alpha       90.0000(0)
_cell_angle_beta        90.0000(0)
_cell_angle_gamma       90.0000(0)
_symmetry_space_group_name_H-M    'C m m m'
_symmetry_Int_Tables_number       65
_symmetry_cell_setting            orthorhombic
loop_
_symmetry_equiv_pos_as_xyz
'+x,+y,+z'
'1/2+x,1/2+y,+z'
'-x,-y,+z'
'1/2-x,1/2-y,+z'
'-x,+y,-z'
'1/2-x,1/2+y,-z'
'+x,-y,-z'
'1/2+x,1/2-y,-z'
'-x,-y,-z'
'1/2-x,1/2-y,-z'
'+x,+y,-z'
'1/2+x,1/2+y,-z'
'+x,-y,+z'
'1/2+x,1/2-y,+z'
'-x,+y,+z'
'1/2-x,1/2+y,+z'
loop_
_atom_site_label
_atom_site_type_symbol
_atom_site_occupancy
_atom_site_fract_x
_atom_site_fract_y
_atom_site_fract_z
_atom_site_B_iso_or_equiv
```

| | | | | | |
|---|---|---|---|---|---|
| O1  | O | 1 | 0.1726(6)  | 0.0970(9)   | 0          | 3.98(20) |
| O2  | O | 1 | 0.7543(9)  | 0.5         | 0.1259(14) | 3.98(20) |
| O3  | O | 1 | 0.1403(9)  | 0.2482(13)  | 0.1231(3)  | 3.98(20) |
| O4  | O | 1 | 0.25       | 0.25        | 0          | 3.98(20) |
| O5  | O | 1 | 0.1601(4)  | 0.4081(7)   | 0.2448(17) | 3.98(20) |
| O6  | O | 1 | 0.0551(3)  | 0.3329(6)   | 0.2692(21) | 3.98(20) |
| O7  | O | 1 | 0.1468(9)  | 0.2451(13)  | 0.3729(13) | 3.98(20) |
| O8  | O | 1 | 0.1746(6)  | 0.0948(9)   | 0.5        | 3.98(20) |
| O9  | O | 1 | 0.25       | 0.25        | 0.5        | 3.98(20) |
| O10 | O | 1 | 0.7595(10) | 0.5         | 0.3771(15) | 3.98(20) |

TABLE 5-continued

Crystallographic data: The structure solution of CIT-14/OH
(*.cif file) from the Rietveld refinement o the synchrotron powder XRD.

| O11  | O 0.5         | 0         | 0.6359(22) | 0.5        | 3.98(20) |
|------|---------------|-----------|------------|------------|----------|
| O11b | O 0.5         | 0         | 0.6359(22) | 0          | 3.98(20) |
| O12  | O 0.5         | 0         | 0.5        | 0.6829(28) | 3.98(20) |
| O12b | O 0.5         | 0         | 0.5        | 0.1829(28) | 3.98(20) |
| Si1  | Si 1          | 0.7874(5) | 0          | 0          | 2.67(15) |
| Si2  | Si 0.807(16)  | 0.1791(6) | 0.2132(9)  | 0          | 2.67(15) |
| Si2  | Ge 0.193)16)  | 0.1791(6) | 0.2132(9)  | 0          | 2.67(15) |
| Si3  | Si 1          | 0.1254(4) | 0.3085(6)  | 0.2522(14) | 2.67(15) |
| Si4  | Si 1          | 0.1815(7) | 0.2106(10) | 0.5        | 2.67(15) |
| Si5  | Si 1          | 0.7839(5) | 0          | 0.5        | 2.67(15) |
| Si6  | Si 1          | 0.7980(4) | 0.5        | 0.2476(15) | 2.67(15) |
| Si7  | Si 0.395(12)  | 0         | 0.6151(5)  | 0.6568(9)  | 2.67(15) |
| Si7  | Ge 0.105(12)  | 0         | 0.6151(5)  | 0.6568(9)  | 2.67(15) |
| Si7b | Si 0.395(12)  | 0         | 0.6151(5)  | 0.6568(9)  | 2.67(15) |
| Si7b | Ge 0.105(12)  | 0         | 0.6151(5)  | 0.6568(9)  | 2.67(15) |

TABLE 7

Crystallographic data: Structural and
Compositional Analysis of CIT-14/IST

| Chemical composition | $[Si_{52.77}Ge_{1.23}O_{112}]$ |
|---|---|
| Unit cell | |
| a | 21.9007(7) Å |
| b | 13.7360(4) Å |
| c | 10.1138(2) Å |
| Space group | Cmmm |
| Number of observations | 9836 |
| Number of contributing reflections | 1037 |
| Number of geometric restraints | 82 |
| Number of parameters | 103 |
| $R_F$ | 0.057 |
| $R_{wp}$ | 0.078 |
| $R_{exp}$ | 0.053 |
| Selected bond distances (Å) and angles (°) | |
| T—O | min: 1.56   max: 1.63   avg: 1.58 |
| O—T—O | min: 98.8   max: 115.3   avg: 109.4 |
| T—O—T | min: 139.7   max: 100.0   avg: 158.0 |

Example 2.4. Discussion of Ge-Arrangement within d4r Units

The inverse sigma transformability of d4r-type germanosilicates can indirectly provide evidence for the presence of pure Ge-4-rings (in d4r units) that are parallel to the layers. As discussed in the previous section, Ge-rich CIT-13/OH (Si/Ge ratio <3.7), just like IM-12, underwent an inverse sigma transformation resulting in CIT-14/IST having high crystallinity and a well-defined pore system. Also, the remaining s4r units of CIT-14 have germanium sites, based on the PXRD and structural refinement. Thus, it can be deduced that the elemental composition of the d4r units of CIT-13/OH is $[Si_nGe_{8-n}]$-d4r (n<4) with four Ge occupying a complete side of the d4r, when the Si/Ge ratio is low. Although CIT-13/F could be transformed into CIT-14/ESP using the ADOR strategy, the inventors have not been able to achieve an inverse sigma transformation using it. Furthermore, as mentioned above, CIT-13/OH showed a much higher rate of *CTH-to-CFI transformation than CIT-13/F samples having similar germanium contents. These results indicate that the presence/absence of fluoride, which also can structure-direct and stabilize d4r units, plays a significant role in the organizing elemental compositions and distributions within d4r units of the extra-large pore germanosilicate CIT-13.

The $^{19}$F NMR spectroscopy can be used as a tool to unveil the elemental composition of small-ring building units such as d4r units. Germanosilicates that do not have incorporated fluoride anion from direct synthesis, can be modified via postsynthetic insertion of fluoride to as-made or degermanated frameworks. F-incorporated d4r-type germanosilicates typically show three signals at ca. −8 ppm (broad), −19 ppm (sharp), and −38 ppm (sharp), that are commonly assigned to $[Si_4Ge_4]$-d4r, $[Si_7Ge]$-d4r, and $[Si_8]$-d4r, respectively. There has been a general agreement about the latter two assignments. However, the nature of the former −8 ppm peak, that is usually broad and sometimes accompanying one or two shoulder signals, is still in question due to a number of possibilities in germanium arrangements.

Figure 10:
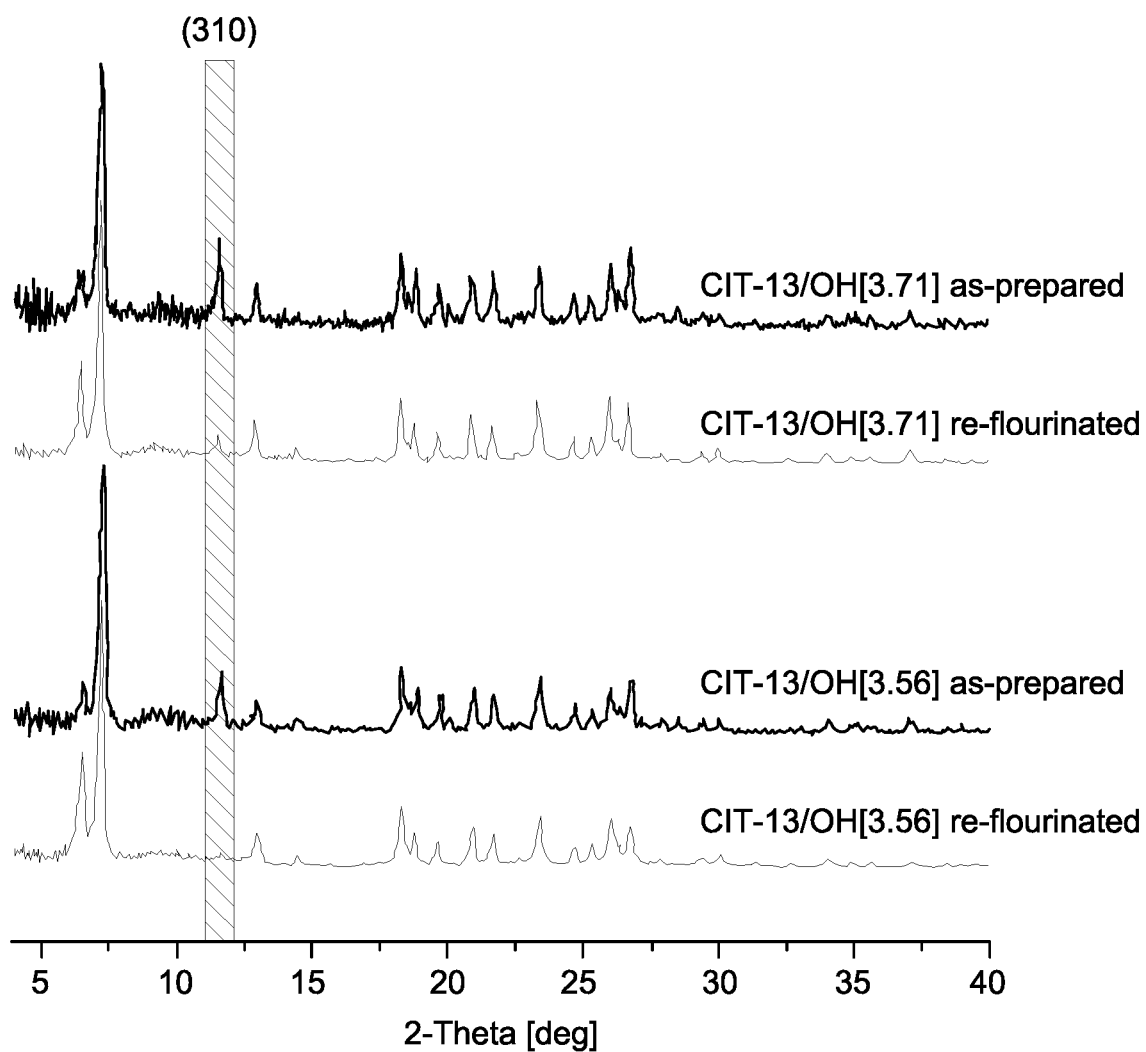
FIG. 10 shows PXRD patterns of as-prepared CIT-13/OH samples and their re-fluorinated versions. The (310) diffractions were highlighted FIGS. 11(A-E) shows structural change during the *CTH-to-CFI transformation observed based on PXRD profiles. PXRD profiles of calcined CIT-13/OH[4.33] (FIGS. 11(A-B)) and CIT-13/OH[3.88] (FIGS. 11(C-D)) after 10 days of exposure to the ambient humidity in the range of (a, c) 4-40° and (b, d) 5-9°. The change of the d200 interlayer distances of CIT-13/OH[4.33] compared to that of CIT-13/F[4.31] (FIG. 11(E)).

The $^{19}$F NMR spectra of as-made CIT-13/F and fluorinated CIT-13/OH samples are shown in FIGS. 23(A-C). All CIT-13 samples show broad peaks centered at around −8 ppm and no signal at −19 and −38 ppm, indicating that the d4r units of these CIT-13 samples were germanium-rich. Post-synthetic fluorination of CIT-13/OH also resulted in the emergence of a sharp signal at −123.7 ppm with multiple spinning sidebands, which presumably originated from surface $^{19}$F—Si species by surface etching. This surface etching did not result in any structural degradation, as supported by the PXRD profiles (FIG. 10). The −8 ppm signals of the CIT-13 samples were broader than that of IM-12, indicating that the germanium arrangement within d4r units of CIT-13 appeared to be less uniform than that of fluorinated IM-12, regardless of the type of mineralizers used. The −8 ppm signals of CIT-13 samples were deconvoluted into two groups of peaks: Line 1 (−7.3 to −8.3 ppm) and Line 2 (−11.0 to −11.7 ppm). Despite the similar germanium contents, CIT-13/OH[4.33](16%) gave a stronger Line 2 signal than CIT-13/F[4.33](1%), as shown in FIGS. 23(A) and 23(B). This result indicated that the absence of fluoride in the CIT-13 synthesis did indeed influence the arrangement of germanium sites within d4r units. It was demonstrated above that CIT-13/OH[4.33] transformed into the corresponding Ge-CIT-5 much faster than CIT-13/F having a similar Si/Ge ratio, and this *CTH-to-CFI transformation was driven by the hydrolysis of T-O—Ge bonds. IM-12 that does possess Ge—O—Ge bonds collapsed very fast (within 1 day) upon exposure to ambient conditions. Kasian et al. showed that fluorinated IM-12 shows a −12 ppm shoulder peak next to the main −8 ppm peak (the −3 ppm shoulder peak observed in fluorinated IM-12 was not detected in CIT-13's). Thus, it is believed that the origin of Line 2 signal of CIT-13/OH can be attributed to highly clustered germanium site arrangements within d4r units such as Ge-4-rings.

The contribution of Line 2 further increased in the 19F spectrum of CIT-13/OH[3.56] (23%), which underwent the inverse sigma transformation into CIT-14/IST (as shown in FIG. 23(C)). Others have investigated the 19F NMR spectra of a series of STW-type germanosilicate from pure-silica to pure-germania, and reported the shift of the main 19F signal from −7.5 ppm to −10.5 ppm as a result of the decrease in Si/Ge ratio from 5 to 0.42 Still others have also reported the presence of a high-field signal at −14 ppm in the $^{19}$F NMR spectrum of Ge-rich ITQ-21 material. Using these results as guidance, the present inventors believe an upfield signal such as Line 2 can be attributed to high germanium contents within d4r units.

Figure 24:
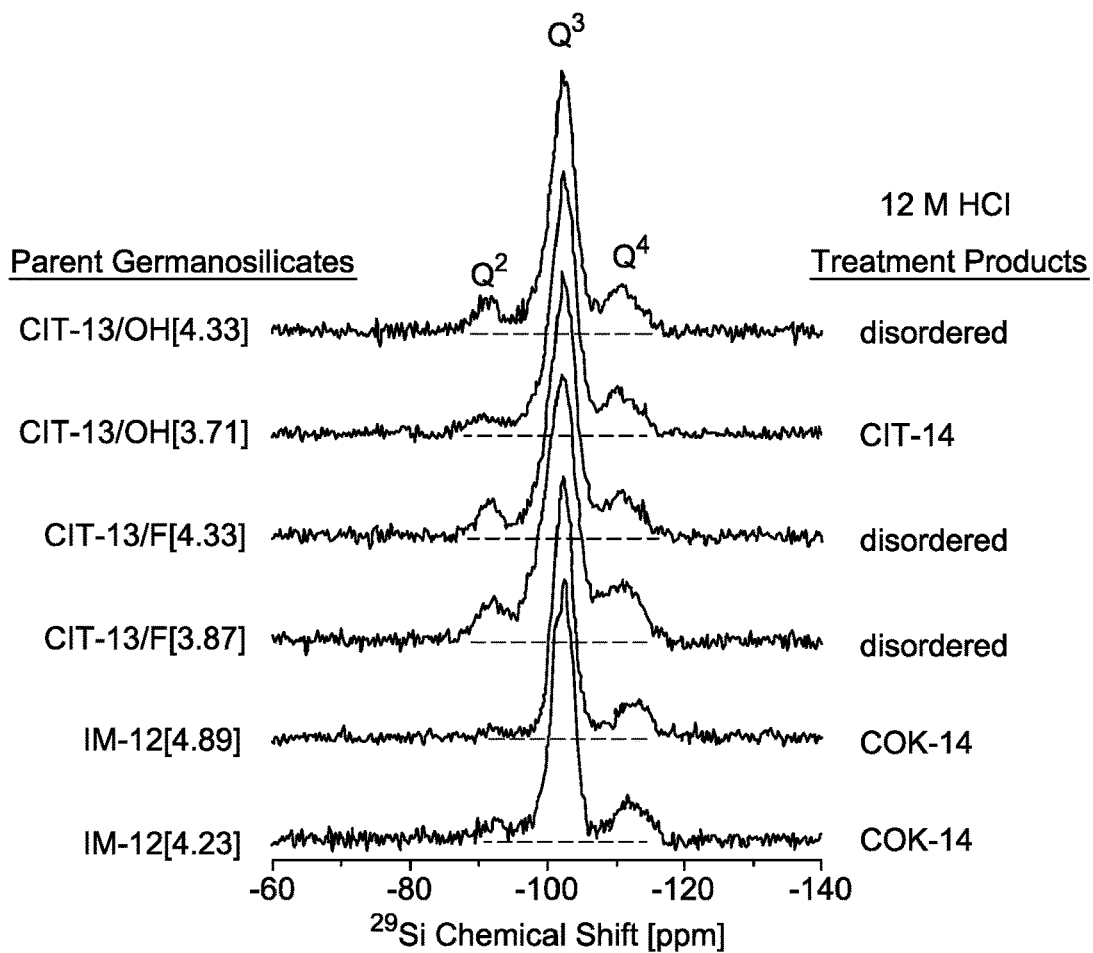
FIG. 24 shows $^1$H-$^{29}$Si CPMAS spectra of water-degermanated CIT-13/OH, CIT-13/F, and IM-12 samples having different germanium contents. Parent germanosilicate samples and their acid-leaching products were denoted on the left and right sides of the spectra, respectively.

The arrangement of germanium sites within d4r units of CIT-13/OH was further investigated on the basis of $^{1}$H-$^{29}$Si CPMAS NMR spectra of related germanosilicates that are degermanated using distilled water (FIG. 24). Using this type of treatment, it has been assumed that most of germanium sites are removed from d4r units and that neighboring silicon sites become silanol sites accordingly. The water-degermanated CIT-13 and IM-12 samples commonly show strong Q3 signals other than fully connected Q4 signals. The major difference among the samples was the intensity of Q2-type (geminal) silanol signals. The degermanated IM-12 samples (Si/Ge=4.89 and 4.23) showed the weakest Q2 signals among the studied degermanated materials, which was consistent with the previous observation by others. These IM-12 samples were more Ge-rich than the IM-12 (Si/Ge=5.3) that was verified to undergo the inverse sigma transformation. The traces of Q2 signals in their $^{1}$H-$^{29}$Si CPMAS spectra may be due to excessive degermanation. Unlike IM-12 samples, the four CIT-13 samples shown in FIG. 24 gave moderate-intensity Q2 signals. Among the four studied CIT-13 samples, only CIT-13/OH[3.71] underwent the inverse sigma transformation resulting in CIT-14/IST, which showed the weakest Q2 signal among the CIT-13's. The two CIT-13/F samples gave stronger Q2 signals than CIT-13/OH[4.33], regardless of Si/Ge ratios. These CIT-13/F samples did not transform to CIT-14 via the inverse sigma transformation, as shown above. Also, the $^{1}$H-$^{29}$Si CPMAS spectra of their degermanated forms resembled those of ITH and IWW, in terms of their strong Q2 signals. This observation further supports the premise that the presence/absence of fluoride in synthesis gels for CIT-13 influenced the arrangements of germanium within d4r bridging units.

Figure 25:
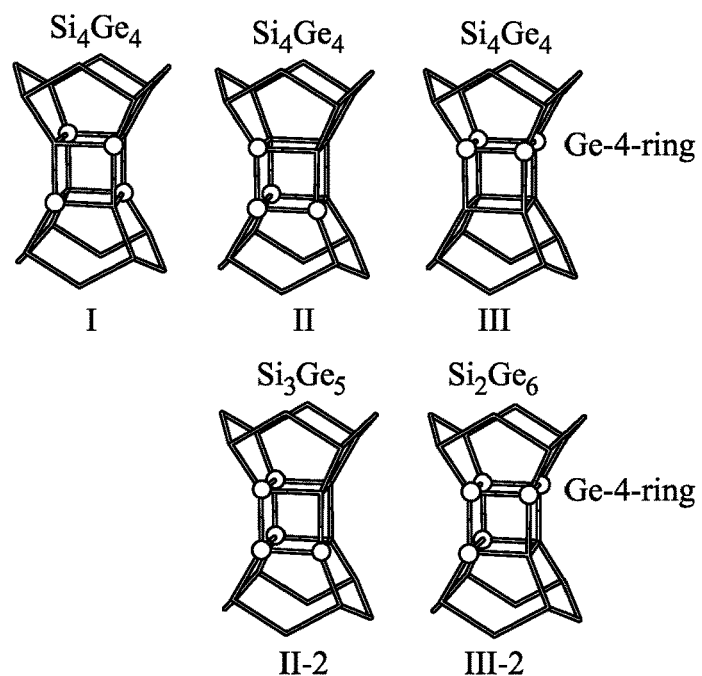
FIG. 25 shows a schematic representation of possible germanium arrangements within d4r units. (Not all possibilities are shown.) Green balls and silver nodes denote germanium and silicon sites, respectively.

Three example types (I, II, and III) of germanium arrangement within [Si$_4$Ge$_4$]-d4r units and two Ge-richer arrangements (II-2 and III-2 having 5 and 6 Ge sites, respectively) are illustrated in FIG. 25. Corma et al. showed that the alternating arrangement of Si and Ge sites within d4r units (i.e., the Type I arrangement) is the most energetically favorable among possible [Si4Ge4]-d4r arrangements in AST-type germanosilicates on the basis of their computation results. This arrangement of germanium was also suggested to be present in as-made CIT-13/F by Liu et al. Type II and III are the [Si$_4$Ge$_4$]-d4r arrangements that are suggested to be present in ITH/IWW and UTL, respectively, based on the $^{19}$F MAS and $^{1}$H-$^{29}$Si CPMAS spectra of fluorinated and degermanated ITQ-13, ITQ-22, and IM-12 germanosilicates.28 Most importantly, Type III arrangement can explain the extraction of Ge-4-ring during the inverse sigma transformation of IM-12, and the high Si/Ge ratio of the resultant COK-14 material.

For CIT-13/F, it has been pointed out that the presence of Si—O—Si bridges may hamper the complete delamination under acidic media into cfi-type layered materials. Also, CIT-13/F did not transformed to CIT-14 via strong acid treatment as shown above. This result implies that there was no pure Ge-4-ring within the d4r units of that CIT-13/F sample. Although very slow, CIT-13/F was completely transformed into Ge-CIT-5 when it was exposed to ambient moisture. This transformation mechanistically accompanies the hydrolytic dissociation of T-O-T bonds that are parallel to the main 14MR channel within d4r units. Therefore, it is unlikely for CIT-13/F to have Si—O—Si bonds along the main channel direction in d4r. Thus, Type I or Type II-2 (if Ge-rich) arrangements may explain all transformation behaviors shown by CIT-13/F. However, according to the DFT-based computations by Camblor et al., highly clustered germanium sites such as Type II-2 may result in a large contribution of Line 2 signal in its $^{19}$F NMR, which is not observed for CIT-13/F (FIG. 23(A)). Thus, CIT-13/F may have Type I or other possible arrangements that can explain its transformation behaviors.

As illustrated in FIGS. 23(B) and 23(C), fluorinated forms of CIT-13/OH samples showed a −8 ppm signal (Line 1) broader than that of IM-12,28 and a 16 to 23% contribution of the extra upfield signal (Line 2). These data implied that there are highly clustered germanium sites within d4r units such as Type II-2 and Type III-2. The Ge—O—Ge bonds parallel to the main channel direction can also explain the fast *CTH-to-CFI transformation rate of CIT-13/OH. A Type III-2 arrangement is also consistent with the presence of pure Ge-4-rings and the high germanium contents within the s4r sites of the resultant CIT-14/IST. Indeed, the present refined structure solution obtained from the synchrotron PXRD confirmed that the Si/Ge ratio of bridging s4r units was approximately four, that implies that one or two additional germanium substitutions on the top of pure Ge-4-ring within d4r units of CIT-13/OH. Thus, the inventors suggest that the absence of fluoride in synthesis gels for CIT-13 can result in clustered germanium sites such as Type II-2 or Type III-2.

As those skilled in the art will appreciate, numerous modifications and variations of the present invention are possible in light of these teachings, and all such are contemplated hereby. All references cited herein are incorporated by reference herein, at least for their teachings in the context presented.

What is claimed:

1. A crystalline microporous germanosilicate composition, designated CIT-14/IST, having 8- and 12-membered ring channels, characterized by a powder X-ray diffraction (XRD) pattern having at least characteristic peaks at 7.59±0.5, 8.07±0.5, 12.88±0.3, 19.12±0.3, 19.32±0.3, 20.73±0.3, 22.33±0.3, 24.37±0.3, 27.19±0.3, and 27.69±0.3 degrees 2-θ.

2. The crystalline microporous germanosilicate CIT-14/IST composition of claim 1, having a Si:Ge ratio in a range of from 12:1 to 20:1.

3. The crystalline microporous germanosilicate CIT-14/IST composition of claim 1, comprising orthorhombic crystals.

4. The crystalline microporous germanosilicate CIT-14/IST composition of claim 3, characterized by a Cmmm space group, or a Cmcm space group, or an intracrystal mixture (disorder) of the two domains.

5. The crystalline microporous germanosilicate CIT-14/IST composition of claim 3, whose crystals have unit cell parameters according to:

| Crystal system | Orthorhombic |
|---|---|
| a (Å) | 21.9 ± 0.2 |
| b (Å) | 13.7 ± 0.2 |
| c (Å) | 10.1 ± 0.2 |
| α = β = γ | 90°. |

6. The crystalline microporous germanosilicate CIT-14/IST composition of claim 1, wherein the 8-membered ring channels have pore dimensions of about 3.3 Å×3.9 Å and 12-membered ring channels have pore dimensions of about 4.9 Å×6.4 Å.

7. The crystalline microporous germanosilicate CIT-14/IST composition of claim 1 that is substantially fluoride-free.

8. The crystalline microporous germanosilicate CIT-14/IST composition of claim 1 having containing micropores that optionally contain an alkali metal cation salt, an alkaline earth metal salt, a transition metal, a transition metal oxide, a transition metal salt, or a combination thereof.

9. A method of preparing the crystalline microporous germanosilicate CIT-14/IST of claim 1, the method comprising contacting the crystalline microporous germanosilicate CIT-13/OH with concentrated strong aqueous mineral acid at an elevated temperature and for a time sufficient to form an intermediate microporous germanosilicate "-CIT-14", wherein the crystalline microporous germanosilicate designated CIT-13/OH is fluoride-free and has a three-dimensional framework having pores defined by 10- and 14-membered rings, and exhibits a powder X-ray diffraction (XRD) pattern having at least five peaks at 6.45±0.2, 7.18±0.2, 12.85±0.2, 20.78±0.2, 26.01±0.2, and 26.68±0.2 degrees 2-θ.

10. The method of claim 9, wherein (a) the mineral acid is aqueous HCl or HNO3; (b) the concentration of the strong aqueous mineral acid is in a range of from 6 to 12 M; (c) the elevated temperature is a temperature in a range of from 80° C. to 1200 C; and/or (d) the time sufficient is in a range of from 4 to 24 hours.

11. The method of claim 9, further comprising isolating the intermediate microporous germanosilicate "-CIT-14," washing the "-CIT-14" material with water until the washes are pH neutral, then heating this isolated and washed "-CIT-14" material at a temperature in a range of from about 450° C. to 650° C. for a time in a range of from 2 to 12 hours.

12. A process comprising:
(a) carbonylating dimethyl ether (DME) with CO at low temperatures;
(b) reducing NOx with methane:
(c) cracking, hydrocracking, or dehydrogenating a hydrocarbon;
(d) dewaxing a hydrocarbon feedstock;
(e) converting paraffins to aromatics:
(f) isomerizing or disproportionating an aromatic feedstock;
(g) alkylating an aromatic hydrocarbon;
(h) oligomerizing an alkene;
(i) aminating a lower alcohol;
(k) separating and sorbing a lower alkane from a hydrocarbon feedstock;
(k) isomerizing an olefin;
(l) producing a higher molecular weight hydrocarbon from lower molecular weight hydrocarbon;
(m) reforming a hydrocarbon
(n) converting a lower alcohol or other oxygenated hydrocarbon to produce an olefin product (including a methanol to-olefin process);
(o) epoxiding olefins with hydrogen peroxide;
(p) reducing the content of an oxide of nitrogen contained in a gas stream in the presence of oxygen;
(q) separating nitrogen from a nitrogen-containing gas mixture; or
(r) converting synthesis gas containing hydrogen and carbon monoxide to a hydrocarbon stream; or
(s) reducing the concentration of an organic halide in an initial hydrocarbon product; by contacting the respective feedstock with the crystalline microporous germanosilicate CIT-14/IST composition of claim 8.

13. A crystalline microporous germanosilicate composition, designated CIT-14/IST, having 8- and 12-membered ring channels, characterized by a powder X-ray diffraction (XRD) pattern having at least five of the characteristic peaks at 7.59±0.5, 8.07±0.5, 12.88±0.3, 19.12±0.3, 19.32±0.3, 20.73±0.3, 22.33±0.3, 24.37±0.3, 27.19±0.3, and 27.69±0.3 degrees 2-θ, wherein the crystalline microporous germanosilicate CIT-14/IST composition has a Si:Ge ratio in a range of from 12:1 to 20:1.

14. The crystalline microporous germanosilicate CIT-14/IST composition of claim 13, wherein the crystalline microporous germanosilicate CIT-14/IST composition has a Si:Ge ratio in a range of from 14:1 to 18:1.

15. The crystalline microporous germanosilicate CIT-14/IST composition of claim 13, comprising orthorhombic crystals.

16. The crystalline microporous germanosilicate CIT-14/IST composition of claim 15, characterized by a Cmmm space group, or a Cmcm space group, or an intracrystal mixture (disorder) of the two domains.

17. The crystalline microporous germanosilicate CIT-14/IST composition of claim 15, whose crystals have unit cell parameters according to:

| Crystal system | Orthorhombic |
|---|---|
| a (Å) | 21.9 ± 0.2 |
| b (Å) | 13.7 ± 0.2 |
| c (Å) | 10.1 ± 0.2 |
| α = β = γ | 90°. |

* * * * *